US006529206B1

(12) United States Patent
Ohki et al.

(10) Patent No.: US 6,529,206 B1
(45) Date of Patent: Mar. 4, 2003

(54) IMAGE PROCESSING APPARATUS AND METHOD, AND MEDIUM THEREFOR

(75) Inventors: Mitsuharu Ohki, Tokyo (JP); Takashi Totsuka, Chiba (JP); Rui Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/350,789

(22) Filed: Jul. 9, 1999

(30) Foreign Application Priority Data

Jul. 13, 1998 (JP) ............................................ 10-197392
May 27, 1999 (JP) ............................................ 11-148755

(51) Int. Cl.[7] .......................... G09G 5/00; G06T 15/20; G06K 9/36
(52) U.S. Cl. ......................... 345/619; 345/427; 382/276
(58) Field of Search ................................. 345/619, 427, 345/650, 582–588; 382/276, 190

(56) References Cited

U.S. PATENT DOCUMENTS

| 5,592,599 | A | * | 1/1997 | Lindholm | 345/427 |
|---|---|---|---|---|---|
| 5,742,295 | A | * | 4/1998 | Lindholm | 345/427 |
| 5,748,192 | A | * | 5/1998 | Lindholm | 345/425 |
| 5,798,770 | A | | 8/1998 | Baldwin | 345/506 |
| 5,896,322 | A | | 4/1999 | Ishii | 365/201 |
| 5,943,057 | A | * | 8/1999 | Ohba | 345/419 |
| 6,064,393 | A | * | 5/2000 | Lengyel et al. | 345/427 |
| 6,289,135 | B1 | * | 9/2001 | DeClerck et al. | 382/276 |
| 6,342,884 | B1 | * | 1/2002 | Kamen et al. | 345/423 |
| 6,411,298 | B1 | * | 6/2002 | Goto et al. | 345/419 |

FOREIGN PATENT DOCUMENTS

JP            07083552    *   3/1995

* cited by examiner

Primary Examiner—Matthew C. Bella
Assistant Examiner—A Blackman
(74) Attorney, Agent, or Firm—Frommer Lawrence & Haug LLP; William S. Frommer; Dennis M. Smid

(57) ABSTRACT

A projected image of a three-dimensional object is displayed in a frame which is a constituent of a moving picture. Shape information concerning the shape of a surface of the three-dimensional object and a characteristic point on the projected image of the surface are designated. The projected image of the surface of the three-dimensional object is transformed into a corresponding two-dimensionally developed expanded image. Rendering is effected on an overall expanded image storage area that stores the entire part of the expanded image of the surface. A predetermined cut-out region is cut out of the overall expanded image storage area, and a retouching work such as an editorial work is effected on the expanded image, based on the content of the cut-out region. The retouched expanded image is then re-transformed back to the projected image on the frame. Three-dimensional retouching such as a three-dimensional editorial work can therefore easily be effected on a two-dimensional moving picture.

12 Claims, 49 Drawing Sheets

BUFFER WINDOW $x_p$, $y_p$, CONTOUR LINE, BUFFER OF INTEREST, PROJECTED IMAGE, $P_A$, $P_B$, $n_f(x_p, y_p)$

THREE-DIMENSIONAL OBJECT

CHARACTERISTIC POINT
PROJECTED IMAGE
IMAGE BUFFER

PASTE BUFFER
EXPANDED IMAGE $$D_1 = R\sin\frac{\lambda_1 + \lambda_2}{2}$$

$$D_2 = R\cos\frac{\lambda_1 + \lambda_2}{2}\tan\lambda_3$$

$$D_3 = \sqrt{D_1^2 - D_2^2}$$

$$= R\sqrt{\sin^2\frac{\lambda_1 + \lambda_2}{2} - \cos^2\frac{\lambda_1 + \lambda_2}{2}\tan^2\lambda_3}$$

$$\sin \frac{\mu}{2} = \sqrt{\sin^2 \frac{\lambda_1 + \lambda_2}{2} - \cos^2 \frac{\lambda_1 + \lambda_2}{2} \tan^2 \lambda_3}$$

$$= \sqrt{\sin^2 \frac{\lambda_1 + \lambda_2}{2} - \cos^2 \frac{\lambda_1 + \lambda_2}{2} \tan^2 \frac{\lambda_2 - \lambda_1}{2}}$$

THREE-DIMENSIONAL OBJECT (SPHERE)

IMAGE BUFFER

PROJECTED IMAGE

PASTE BUFFER

EXPANDED IMAGE

REGION HAVING PIXELS 1.0
REGION HAVING PIXELS 0

ENTIRE ILLUMINATION IS APPLIED BECAUSE OF DIFFUSED REFLECTIVE ELEMENTS

ONLY PART IS BRIGHT AS A RESLUT OF NON-LINEAR TRANSFORMATION OF SPECULAR REFLECTIVE ELEMENTS

IMAGE PROCESSING APPARATUS AND METHOD, AND MEDIUM THEREFOR

BACKGROUND OF THE INVENTION

1. Field of the Invention

The present invention relates to a method of and an apparatus for processing image, as well as to a medium which provided a program implementing the image processing method. More specifically, the present invention pertains to an image processing apparatus and method, as well as a medium, which permit easy retouching such as three-dimensional editorial modification on the image of a three-dimensional object that is contained in a two-dimensional displayed image.

2. Description of the Related Art

Various methods have been proposed that implement various processes on a two-dimensional image and extract information necessary for the processes from the two-dimensional image. Documents describing the methods include James D. Foley, Andries van Dam, Steven K. Feiner, and John F. Hughes, "Computer Graphics, principles and practice", ADDISON-WESLEY PUBLISHING COMPANY, 1996 (hereinafter referred to as "Document 1"), Paul E. Debevec, Camillo J. Taylor, and Jitendra Malik, "Modeling and Rendering Architecture from Photographs: A hybrid geometry-and-image-based approach", proceedings of SIGGRAPH 96, pp. 11–20 (hereinafter referred to as "Document 2"), Oliver Faugeras, "Three-dimensional computer version", The MIT press (hereinafter referred to as "Document 3"), Kenneth P. Fishin, and Brian A. Barsky, "Family of New Algorithms for Soft Filling", proceedings of SIGGRAPH 84, pp. 235–244 (hereinafter referred to as "Document 4"), Pat Hanrahan and Paul Haeberli, "Direct WYSIWYG Painting and Texuturing on 3D Shapes", proceedings of SIGGRAPH 90, pp. 215–233 (hereinafter referred to as "Document 5"), Youichi Horry, Ken-ichi Anjyo, and Kiyoshi Arai, "Tour Into the Picture: Using a Spidery Mesh Interface to Make Animation from a Single Image", proceedings of SIGGRAPH 97, pp. 225–232 (hereinafter referred to as "Document 6"), and Michael Gleicher, "Image Snapping", proceedings of SIGGRAPH 95, pp. 183–190 (hereinafter referred to as "Document 7").

In Document 1, image processing called "two-dimensional paint" is described in which a computer is used to perform processing in the same way as a designer or the like draws a picture on paper using a paintbrush or airbrushing (a technique that draws a picture by spraying paints on paper).

In this type of conventional two-dimensional paint, even when a three-dimensional object is displayed in an image, the image itself is treated on a two-dimensional plane. Accordingly, when characters are rendered irrespective of the direction of the three-dimensional object in a three-dimensional space which is displayed on the two-dimensional plane, or a figure is added, the image looks unnatural.

For example, in the case where a house-shaped three-dimensional object, as shown in FIG. 1A, is displayed, and characters are rendered on walls of the house without the direction of the characters, the characters do not look as if they are written on the walls, as shown in FIG. 1B. For adding a parallelepiped room to a wall of the house, in the case where a rectangle is rendered on the wall without the direction of the rectangle, the image looks unnatural, as shown in FIG. 1C. In the case where a cylinder is displayed in a two-dimensional image as shown in FIG. 2A, when characters are rendered on the side surface without ignoring the curvature of the side surface, the characters do not look as if they are written on the side surface, as shown in FIG. 2B.

Accordingly, in order that an image may not look unnatural in two-dimensional paint, it is required that a character or figure be rendered being transformed so as to match the direction of a three-dimensional object displayed in the two-dimensional image. Performing operations for the rendering requires a degree of experience.

Therefore, there is a method in which a user uses a ten-key pad or graphical user interface (GUI) to input an angle of inclination of the three-dimensional object displayed on the two-dimensional image so that a computer uses the input to transform a new character or figure to be rendered. In this method, the user must adjust the angle of inclination of the three-dimensional object to be input to the computer while viewing the rendered character or figure so that the rendered character or figure does not look unnatural. The adjustment also requires a degree of experience.

As described above, when the user instructs the rendering of a character or figure ignoring the direction of a three-dimensional object displayed on a two-dimensional image, the computer cannot display the character or figure as it looks natural, in other words, an image looking as if the character or figure was originally positioned cannot be obtained. This is due to lack of information on the position of the three-dimensional object displayed in the two-dimensional image and information (a position at which a landscape or the like was observed in the case where the two-dimensional image was obtained by performing image capture on a picture) on the position of image capture for the two-dimensional image.

Accordingly, there is a method that uses computer vision to find, from a two-dimensional image, the position of a three-dimensional object in a three-dimensional space displayed in the two-dimensional image, and the image capture position of the three-dimensional object.

In other words, in Document 2, a method is disclosed in which a three-dimensional shape such as a parallelepiped is correlated using a GUI with a structure in a plurality of photographs, and the size of the structure and the photographing position are found. In Document 3, other various methods for finding the position of a three-dimensional object and an image capture position on the object are disclosed.

In the above-described methods using the computer vision to compute a three-dimensional object position and an image capture position on the object, the principles of triangulation are used. This requires a plurality of images obtained by performing image capture on the same three-dimensional object from plurality of image capture positions. However, when two-dimensional paint is performed, the images are not always prepared, and when the two-dimensional images are photographs of a picture, the plurality of images is not used in general.

If the plurality of images obtained by performing image capture on the same three-dimensional object from the plurality of image capture positions can be prepared, the corresponding positions (e.g., vertices of the roof, etc., of a structure as a three-dimensional object) of the same three-dimensional object displayed on the images must be designated in order for the computer to compute the position of the three-dimensional object and the image capture position. The operation of designation for the images is complicated, and requires a time. In addition, in the case where based on the position (in the three-dimensional space) of the three-dimensional object displayed in the two-dimensional image and the image capture position, three-dimensionally natural rendering is performed, three-dimensional data, such as three-dimensional coordinates generated when the three-dimensional object is viewed from the image capture position, must be processed, which requires a great amount of operations for the processing.

In Document 4, a method for color processing for two-dimensional paint is disclosed.

In two-dimensional paint, the user uses a GUI to select a color for rendering and to perform rendering using the selected color. The color and brightness of a three-dimensional object displayed in the two-dimensional image vary depending on the positional relationship between the direction of the object surface and illumination. For example, painting an entire surface of the three-dimensional object in the same color (the same RGB levels) causes an unnatural rendering result. Accordingly, for obtaining a natural rendering result, a painting color must be gradationally changed considering the positional relationship between the direction of a surface to be painted and illumination. In particular, in the case where a surface to be painted is curved, pixel levels needs to be sequentially changed so that the rendering result is natural. Thus, a painting color must be selected for, for example, several pixels, which requires a great amount of operations.

Accordingly, in Document 4, a method called "tint fill" is disclosed in which in the case where a pixel color is a mixture of two colors and the two colors are known, either color can be changed into another color. The use of tint fill can efficiently cope with an area in which a foreground and a background are mixed, but cannot cope with object shading and light reflected by the object.

In Document 5, a method that transforms and pastes a character or handwritten figure input by operating a tablet or mouse along the surface of a three-dimensional object displayed in a two-dimensional image is disclosed.

Since the method disclosed in Document 5 uses three-dimensional information (e.g., the position of the three-dimensional object in a three-dimensional space, an image capture position, size, inclination, etc.) on the three-dimensional object displayed in the two-dimensional image, the method in Document 5 needs to recognize the three-dimensional information by using computer vision. However, when computer vision is used to recognize the three-dimensional information, a plurality of images are required as described above, and an amount of operations greatly increases.

Although the method in Document 5 can also use a three-dimensional model of a three-dimensional object generated in the computer, it must process three-dimensional data and requires a great amount of operations.

Regarding three-dimensional model generating, Document 2 discloses a technique that includes the steps of using computer vision technology to extract an outline of the shape of a three-dimensional object displayed in the two-dimensional image from the two-dimensional image, pasting a captured image onto the shape surface (performing texture mapping), and using these steps to generate a two-dimensional image viewed from a free viewpoint (captured from a free image capture position). Similar to the above-described cases, this technique requires a plurality of images because it uses computer vision technology to extract, from a two-dimensional image, an outline of the shape of a three-dimensional object displayed in the two-dimensional image.

In Document 6, a method is disclosed in which based on a single two-dimensional image, an image viewed from a viewpoint excluding the image capture position of the two-dimensional image is generated. This method only generates an image viewed from a viewpoint excluding the image capture position, and it is based on the assumption that a three-dimensional object displayed in a two-dimensional image or another adjacent object has a very simple shape of a plate. Accordingly, almost no serious problem occurs when an image viewed from another viewpoint is approximately generated. However, when a character or figure is added to the two-dimensional image, it is impossible to make the rendering result natural. For example, in the case where a cylinder is displayed in a two-dimensional image, a natural image formed by adding a character or figure on the side surface of the cylinder cannot be obtained.

In addition, it is required in many cases that when a two-dimensional image is processed, the user designates predetermined characteristic points (e.g., vertices) of a three-dimensional object in the two-dimensional image. The characteristic points are designated by operating a mouse or input pen, but it is difficult to accurately designate vertices of the three-dimensional object in the two-dimensional image. Accordingly, Document 7 discloses a method that includes the steps of extracting an edge (a portion whose brightness and color greatly change) in the two-dimensional image, and moving a cursor on the edge when the cursor is in the vicinity of the edge. Since all edges in the two-dimensional image are detected in the method in Document 7, sensitive response to noise or a texture in the two-dimensional image occurs, and the cursor may be moved to an unnecessary position.

Although many image processing techniques have been proposed heretofore as described above, these techniques require certain levels of skill and experience, as well as time, or necessitates a plurality of images of an object as viewed in different directions. These techniques therefore cannot suitably be used for the purpose of effecting three-dimensional edition or other retouching on the images of characters and patterns which are contained in a two-dimensional displayed image.

Thus, no image processing technique has heretofore been proposed which would enable easy three-dimensional edition or retouching on characters or patterns in a two-dimensional displayed image.

SUMMARY OF THE INVENTION

Accordingly, it is a primary object of the present invention to provide an image processing technique which permits a user to easily effect three-dimensional editorial work or other retouching on a two-dimensional displayed image.

To this end, according to one aspect of the present invention, there is provided an image processing apparatus for processing a two-dimensional moving picture, comprising: operating means operable to enable designation of shape information concerning the shape of a surface that forms part of a three-dimensional object displayed in the moving picture and designation of a characteristic point which is located on the moving picture; computing means for determining, based on the shape information and the characteristic point, a correlation equation expressing the correlation between a projected image which is obtained by projecting the surface constituting part of the three-dimensional object and an expanded image which is obtained by developing the surface into two-dimensional surface; first transforming means for transforming, based on the correlation equation, the projected image of the surface constituting part of the three-dimensional object in the moving picture into the expanded image; storing means for storing the expanded image; retouching means for effecting retouching on the expanded image stored in the storing means; and second transforming means for transforming, based on the correlation equation, the retouched expanded image back to the projected image in the moving picture.

According to another aspect of the present invention, there is provided an image processing method for processing a two-dimensional moving picture, comprising the steps of: preparing operating means operable to enable designation of shape information concerning the shape of a surface that forms part of a three-dimensional object displayed in the moving picture and designation of a characteristic point which is located on the moving picture; computing, in response to the designation of the shape information and the characteristic point by the operating means, a correlation equation expressing the correlation between a projected image which is obtained by projecting the surface constituting part of the three-dimensional object and an expanded image which is obtained by developing the surface into two-dimensional surface, based on the shape information and the characteristic point; executing first transformation for transforming, based on the correlation equation, the projected image of the surface constituting part of the three-dimensional object in the moving picture into the expanded image; storing the expanded image; retouching the expanded image stored in the storing step; and executing a second transformation for transforming, based on the correlation equation, the retouched expanded image back to the projected image in the moving picture.

According to still another aspect of the present invention, there is provided a medium for enabling a computer to execute a computer program for conducting image processing on a two-dimensional moving picture, the program comprising the steps of: computing, in response to designation of shape information concerning the shape of a surface that forms part of a three-dimensional object displayed in the moving picture and designation of a characteristic point which is located on the moving picture, the designation being made through operation of operating means that enables designation of the shape information and the characteristic point, a correlation equation expressing the correlation between a projected image which is obtained by projecting the surface constituting part of the three-dimensional object and an expanded image which is obtained by developing the surface into two-dimensional surface, based on the shape information and the characteristic point; executing first transformation for transforming, based on the correlation equation, the projected image of the surface constituting part of the three-dimensional object in the moving picture into the expanded image; storing the expanded image; retouching the expanded image stored in the storing step; and executing a second transformation for transforming, based on the correlation equation, the retouched expanded image back to the projected image in the moving picture.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1A:
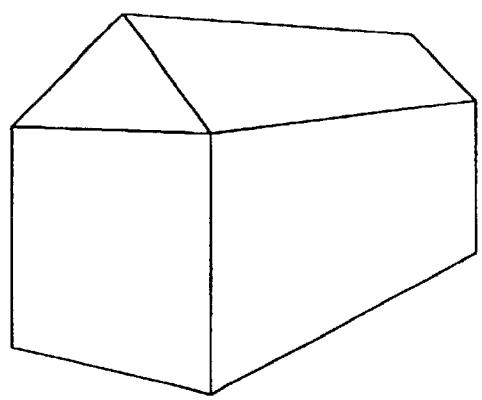
FIGS. 1A, 1B, and 1C are illustrations of rendering results using a conventional paint tool.
Figure 1B:
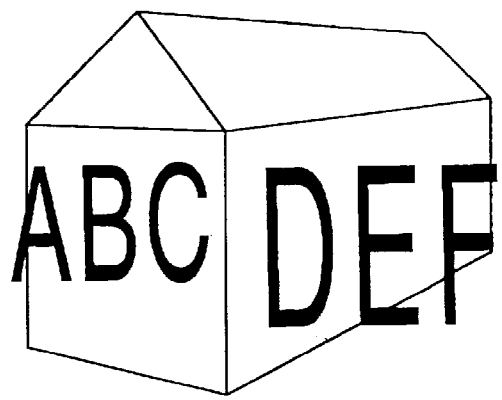
Figure 1C:
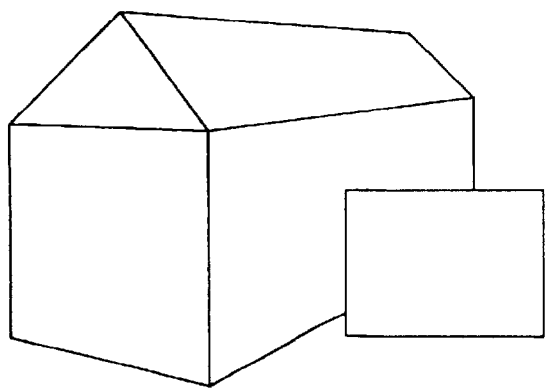
Figure 2A:
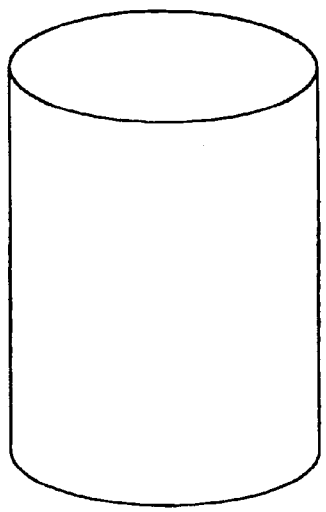
FIGS. 2A and 2B are illustrations of rendering results using a conventional paint tool.
Figure 2B:
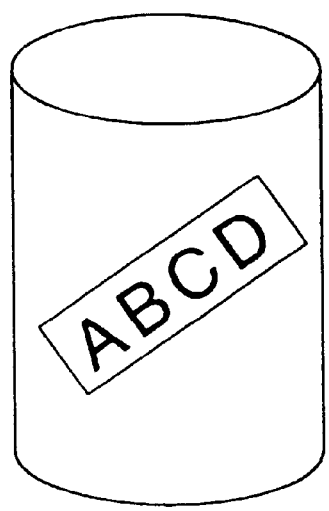
Figure 3:
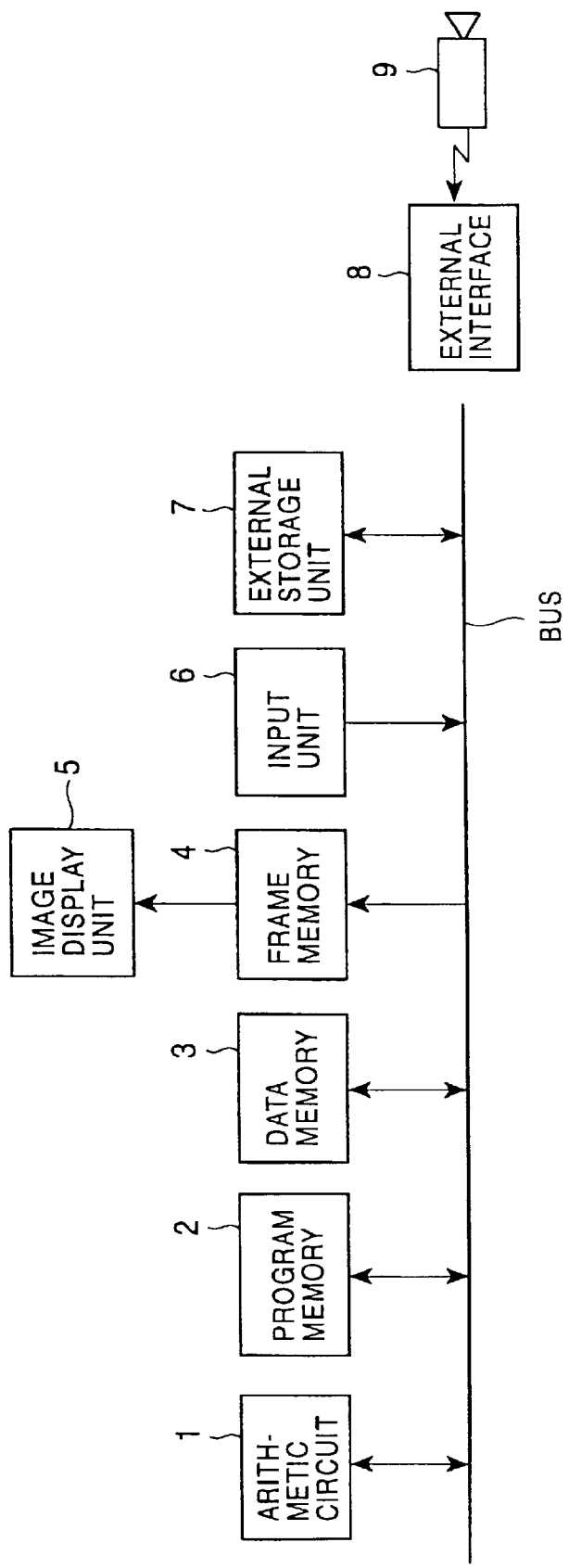
FIG. 3 is a block diagram showing an image processing apparatus according to an embodiment of the present invention.

FIG. 3 shows an image processing apparatus according to an embodiment of the present invention. The image processing apparatus has a computer as a base, and can easily perform three-dimensional editing, etc., on a two-dimensional image.

An arithmetic circuit 1 consists of a central processing unit (CPU) or the like, and executes an application program stored in a program memory 2 under the control of an operating system (OS) loaded into the program memory 2, whereby performing various processes (described below) on a two-dimensional image. The program memory 2 consists of a random access memory (RAM), and temporarily stores the OS and the application program stored (recorded) in an external storage unit 7. A data memory 3 consists of a RAM, and temporarily stores data necessary for processing in the arithmetic circuit 1. A frame memory 4 consists of a RAM, and stores image data to be displayed on an image display unit 5. The image display unit 5 consists of, for example, a cathode-ray tube or liquid crystal display, and displays the image data stored in the frame memory 4. An input unit 6 consists of, for example, a combination of a mouse and a tablet, or a keyboard. The input unit 6 is operated to input a necessary command or data or to designate a predetermined position on the screen of the image display unit 5. The external storage unit 7 consists of, for example, a hard disk, a floppy disk, a compact disk ROM, or a magnetooptical disk, and stores the OS and the application program. The external storage unit 7 also stores data necessary for the operation of the arithmetic circuit and two-dimensional images (digital data) to be processed. An external interface 8 functions as an interface for receiving externally supplied data such as two-dimensional images captured by a camera 9 and data transmitted via a communication link (not shown).

The arithmetic circuit 1, the program memory 2, the data memory 3, the frame memory 4, the external storage unit 7, and the external interface 8 are connected by a bus, and programs and data are transmitted and received via the bus.

When main power is supplied to the image processing apparatus, the OS stored in the external storage unit 7 is read and loaded into the program memory 2, and it is executed by the arithmetic circuit 1. By operating the input unit 6 so that the application program is executed, the OS controls the arithmetic circuit 1 to read the application program from the external storage unit 7, and the read application program is executed after being loaded into the program memory 2. Thereby, for two-dimensional images that were captured by the camera 9 and stored in the external storage unit 7, various processes are described.

Figure 4:
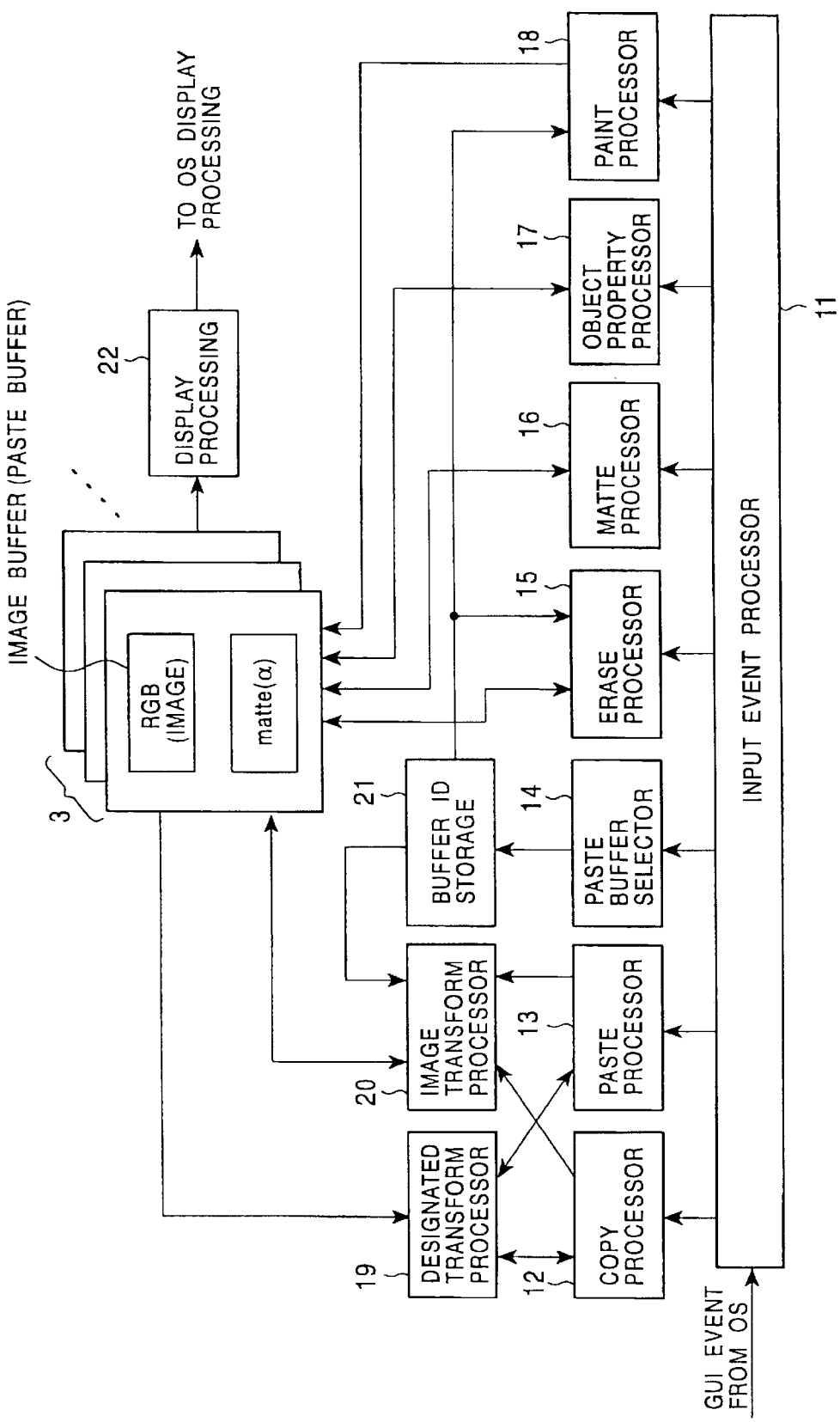
FIG. 4 is a block diagram showing the functions of the image processing apparatus shown in FIG. 3.

FIG. 4 shows the functions of the image processing apparatus (shown in FIG. 3) that are realized such that the arithmetic circuit 1 executes the application program.

A GUI event is supplied from the OS to an input event processor 11. The input event processor 11 analyzes the GUI event, and activates, in accordance with the analysis, a copy processor 12, a paste processor 13, a paste buffer selector 14, an erase processor 15, a matte processor 16, an object property processor 17, and a paint processor 18 so that processing is performed.

The types of the GUI event include, for example, a movement of a mouse cursor, mouse clicking (mouse button pressing and unpressing), selection from a menu on the GUI, and button operation. The GUI event is defined in a window system such as "X-Window".

The copy processor 12 performs a copy operation for storing an image in a paste buffer (described below). The paste processor 13 performs a paste operation for pasting the image stored in the paste buffer on a two-dimensional image stored in an image buffer (described below). A paste buffer selector 14 performs a paste buffer selecting operation for selecting, from the image buffer, a buffer used as the paste buffer, and storing its buffer identification (ID) in buffer ID storage 21.

In the data memory 3, regions in which image pixel levels are stored in units of screens are reserved as image buffers. The image buffers are provided with buffer IDs so that each image buffer is identified. Among the image buffers, an image buffer whose ID is stored in the buffer storage 21 is particularly called a "paste buffer". In each image buffer, the pixel levels (e.g., RGB values) of a two-dimensional image can be stored, and also a matte on an object displayed in the two-dimensional image can be stored. The matte is described below.

The erase processor 15 performs an erase operation for deleting part of an image stored in the paste buffer. The matte processor 16 performs for generating a matte for a three-dimensional object displayed in the two-dimensional image stored in the image buffer. The object property operator 17 performs object property processing for changing so-called "material properties" such as the color and material of the three-dimensional object displayed in the two-dimensional image stored in the image buffer, and illumination processing for changing illumination (changing the condition of illumination to the three-dimensional object in the two-dimensional image stored in the image buffer). The paint processor 18 performs a paint operation for painting two-dimensional paint on the image stored in the paste buffer.

A designated transform processor 19 corrects, in accordance with instructions from the copy processor 12 and the paste processor 13, the positions of characteristic points on the two-dimensional image stored in the image buffer, which are designated by the user by operating the input unit 6. The designated transform processor 19 sends the position-corrected characteristic points back to the copy processor 12 and the paste processor 13. An image transform processor 20 transforms, in accordance with instructions from the copy processor 12 and the paste processor 13, the image stored in the image buffer or the paste buffer. The buffer ID storage 21 stores the buffer ID of the image buffer selected as the paste buffer by the paste buffer selector. The buffer ID stored in the buffer ID storage 21 is supplied to the erase processor 15, the paint processor 18, and the image transform processor 20. Accordingly, the erase processor 15, the paint processor 18, and the image transform processor 20 recognize the image buffer as the paste buffer.

The display processor 22 performs processing necessary for displaying the two-dimensional image stored in the image buffer on the image display unit 5. Image data output from the display processor 22 are sent to the display processing by the OS, whereby the image data are written in the frame memory 4 so as to be displayed on the image display unit 5.

In FIG. 4, the blocks excluding the data memory 3 and the buffer ID storage 21 are realized such that the arithmetic circuit 1 executes the application program. Program components corresponding to the blocks are formed as modules.

Figure 5A:
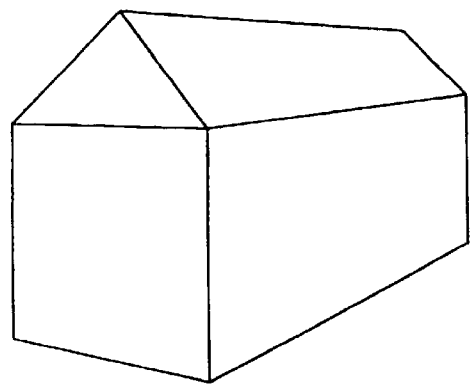
FIGS. 5A, 5B, and 5C are drawings showing the results of processing a two-dimensional image by the image processing apparatus shown in FIG. 4.
Figure 5B:
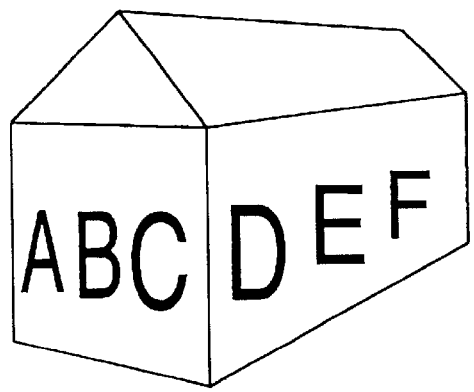
Figure 5C:
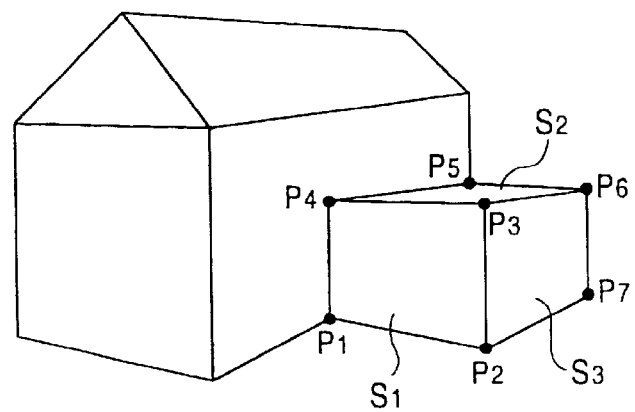
Figure 6A:
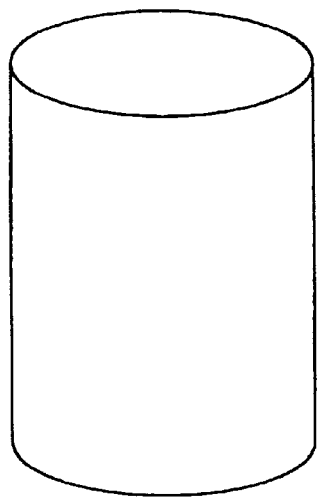
FIG. 6 is a drawing showing the results of processing a two-dimensional image by the image processing apparatus shown in FIG. 4.
Figure 6B:
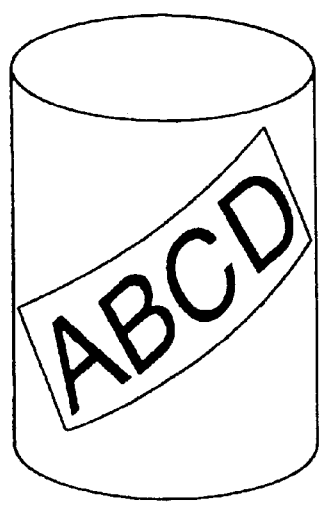

According to the above-described image processing apparatus, for example, in the case where a two-dimensional image on which a house-shaped three-dimensional object is displayed is stored in the image buffer as shown in FIG. 5A, when characters are written ignoring the direction of walls of the house, a two-dimensional image that looks as if the characters were written along the walls can be obtained as shown in FIG. 5B. When a rectangle is drawn ignoring the direction of the walls of the house, a two-dimensional image in which a parallelepiped room is added to the walls can be obtained as shown in FIG. 5C. In addition, in the case where a two-dimensional image on which a cylinder as shown in FIG. 6A is displayed is stored in the image buffer, even when characters are written ignoring the direction of the side surface of the cylinder, a two-dimensional image that looks as if the characters were written along the side surface can be obtained as shown in FIG. 6B.

In other words, when the image of a character-written three-dimensional object is not actually captured by the camera 9, by implementing three-dimensional operations on the two-dimensional image captured by the camera 9, a two-dimensional image that looks as if the image of the character-written three-dimensional object was actually captured can be easily obtained.

Processing by the image processing apparatus shown in FIG. 4 is described with reference to the flowchart shown in FIG. 7.

Figure 8:
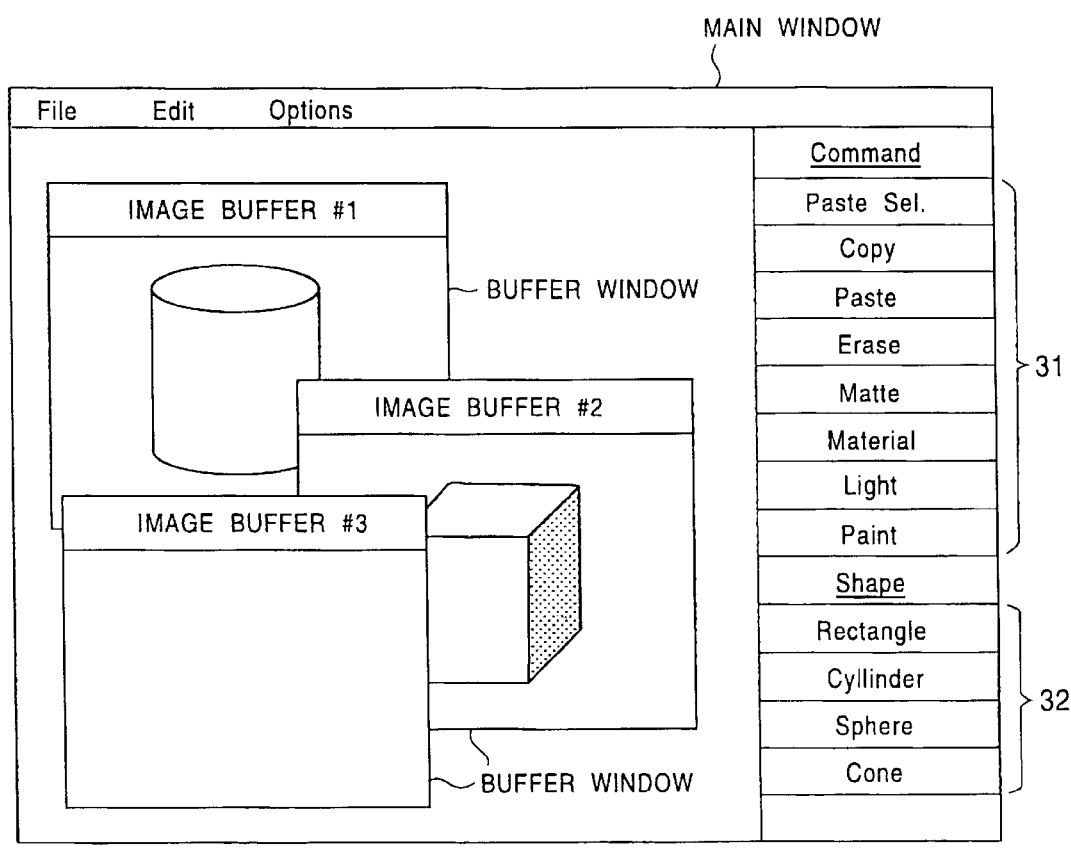
FIG. 8 is an illustration of a main window displayed when the image processing apparatus is activated.

When the application program is executed by the arithmetic circuit 1 (shown in FIG. 3), the image display unit 5 displays, for example, a main window as shown in FIG. 8. Command buttons 31 and Shape buttons 32 are displayed to the right of the main window, and three windows (hereinafter referred to as "buffer windows") displaying two-dimensional images stored in the image buffer are displayed to the left of the window.

Each Command button is operated when a command is input. In the main window shown in FIG. 8, the Command buttons 31 consist of a Paste Select button that is operated when a paste buffer selection is performed, a Copy button that is operated when copying is performed, a Paste button that is operated when pasting is performed, an Erase button that is operated when erasing is performed, a Matte button that is operated when a matte operation is performed, a Material button that is operated when object property processing is performed, a Light button that is operated when illumination changing is performed, and a Paint button that is operated when painting is performed.

Each Shape button 32 is operated when the shape (shape information) of the surface of a three-dimensional object is input. In the main window shown in FIG. 8, the Shape buttons 32 consist of a Rectangle button, a Cylinder button, a Sphere button, and a Cone button that designate a rectangle, a cylindrical side surface, a sphere, and a conical surface, respectively.

In the main window shown in FIG. 8, the three buffer windows respectively display contents stored in image buffers #1, #2, and #3 among the image buffers (where the suffix i of image buffer #i represents, for example, a buffer ID). When a plurality of buffer windows are displayed, among the plurality of buffer windows, a buffer window displaying the content of a buffer of interest (described below) is displayed as a foreground (set to be active).

The operation of the main window is basically unified into a user interface in which an image buffer for processing is selected and a type of processing is subsequently selected. Accordingly, the user initially operates the input unit 6 to click any one of the buffer windows displayed in the main window, whereby an image buffer for processing is selected.

Specifically, when the user clicks any one of the buffer windows, in step S1, the input event processor 11 selects, as a buffer of interest, an image buffer whose storage content is displayed on the buffer window.

After that, the user clicks any one of the Command buttons 31. At this time, in step S2, the input event processor 11 recognizes which of the Command buttons 11 is clicked. The input event processor 11 proceeds to step S3, and determines which type of processing (operation) is designated, based on the recognition. In step S3, when the input event processor 11 has determined that paste buffer selection has been designated, in other words, when the Paste Selection button among the Command buttons 31 has been operated (clicked), the input event processor 11 proceeds to step S4, and activates the paste buffer selector 14 to perform paste buffer selection. In other words, the paste buffer selector 14 overwrites the buffer ID storage 21 with the buffer ID of the buffer of interest. Thereby, the image buffer corresponding to the present buffer of interest is used as a paste buffer, and the input event processor 11 proceeds back to step S1.

If the input event processor 11 has determined in step S3 that either copying or pasting has been instructed, in other words, when the Copy button or the Paste button among the Command buttons 31 has been operated, the input event processor 11 proceeds to step S5 at the time of the operation of the Shape button. Copying is a process that consists of generating an expanded image formed by expanding, on a two-dimensional plane, planes constituting a three-dimensional object displayed in a two-dimensional image stored in the buffer of interest, and storing the expanded image in the paste buffer. Pasting is a process that consists of pasting the image on the two-dimensional plane, which is stored in the paste buffer, on the planes constituting the three-dimensional object so that a projected image on the screen is generated, and pasting the projected image on the two-dimensional image stored in the buffer of interest. In either process, the planes constituting the three-dimensional object are processed. Accordingly, when the user operates the Copy button or the Paste button, the user designates (inputs) shape information on the planes constituting the three-dimensional object by successively operating any one of the Shape buttons 32.

In step S5, based on the operation of any one of the Shape buttons 32, the shape (shape information) of the planes constituting the three-dimensional object, which are copied or pasted, is recognized. When characteristic points are input, the input event processor 11 proceeds to step S6. In other words, in copying, it is required that portions (planes) generating the expanded image be specified by designating some of the points constituting the planes of the three-dimensional object displayed in the two-dimensional image stored in the buffer of interest. In pasting, in order that the projected image of the image stored in the paste buffer may be pasted on the planes constituting the three-dimensional object displayed on, for example, the two-dimensional image stored in the buffer of interest, the projected image needs to be specified by designating some of the points constituting the projected image. Accordingly, the user operates the Copy button or the Paste button, and operates any of the Shape buttons 32 to successively designate the shape of the three-dimensional object to be copied or pasted. After that, the user operates the input unit 6 to designate, as characteristic points, some of the points constituting the planes (to be processed) of the three-dimensional object in the two-dimensional image stored in the buffer of interest.

In step S6, the coordinates of the characteristic points designated as described above are recognized.

In the above-described case, the characteristic points are designated after designating the shape of the three-dimensional object. However, the shape of the three-dimensional object may be designated after designating the characteristic points. When copying is instructed, the copy processor 12 performs steps S5 and S6, and when pasting is instructed, the paste processor 13 performs steps S5 and S6.

In step S6, the copy processor 12 or the paste processor 13, which has recognized the characteristic points designated by the user, supplies the characteristic points to the designated transform processor 19. When the designated transform processor 19 receives the characteristic points, in step S7, it corrects their positions, and supplies the corrected points to the copy processor 12 or the paste processor 13, which supplied the characteristic points.

In step S8, the input event processor 11 determines whether either the Copy button or the Paste button has been operated. If the input event processor 11 has determined in step 8 that the Copy button has been operated, the copy processor 12 performs copying. At this time, the input event processor 11 proceeds from step S8 to S9, and the copy processor 12 computes a transform expression (hereinafter referred to as a "inverse transform expression") for transforming, based on the shape information and the characteristic points, the planes of the three-dimensional object in the two-dimensional image stored in the buffer of interest into an expanded image. The copy processor 12 supplies it to the image transform processor 20. In step S10, the image transform processor 20 transforms, based on the inverse transform expression, the planes (specified by the characteristic points) of the three-dimensional object in the two-dimensional image stored in the buffer of interest into an expanded image. In step S11, the image transform processor 20 copies (performs overwriting with) the expanded image in the image buffer whose buffer ID is stored in the buffer ID storage 21, that is, in the paste buffer. After that, the input event processor 11 returns to step S1.

Figure 9A:
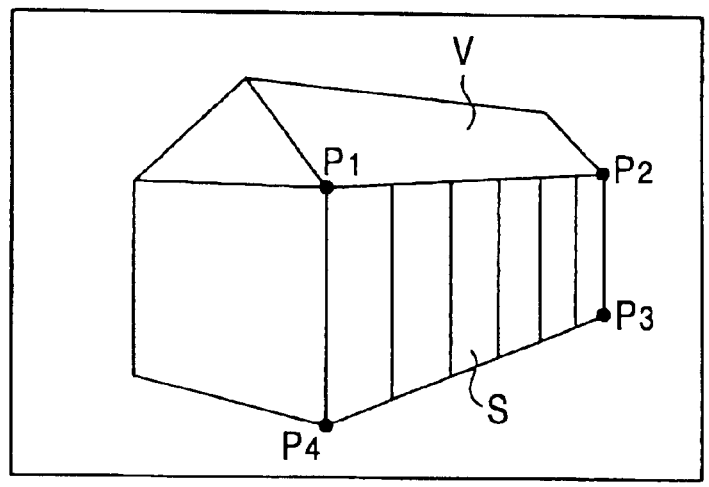
FIGS. 9A and 9B are drawings illustrating copying.
Figure 9B:
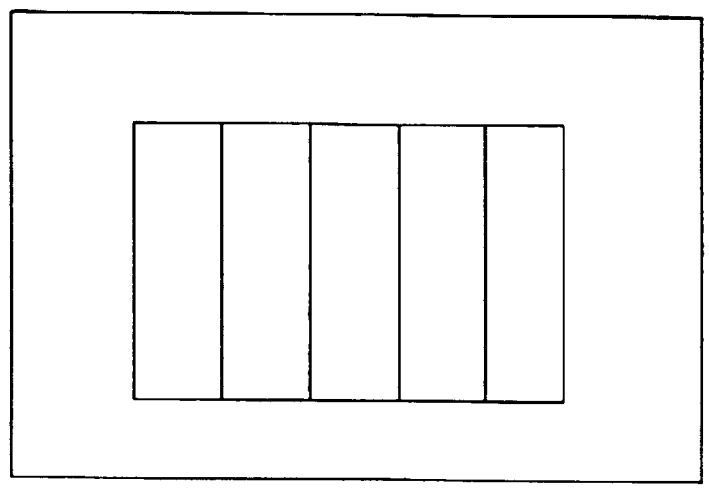

According to the above-described copying, when a two-dimensional image on which a house-shaped three-dimensional object V is displayed as shown in FIG. 9A is stored in the buffer of interest, by designating, as shape information, a rectangle that is the shape of a wall S with vertical lines, and designating, as characteristic points, four vertices $P_1$, $P_2$, $P_3$, and $P_4$ on the wall S, the two-dimensional image (expanded image) of the wall S with vertical lines, obtained by expanding the three-dimensional object V on the two-dimensional plane, is generated as shown in FIG. 9B and stored in the paste buffer.

Therefore, when the two-dimensional image (as shown in FIG. 9A) on which the three-dimensional object V is displayed is stored in the image buffer, in order that an expanded image of the wall S with vertical lines may be obtained, the user needs to perform the following operations. First, the user sets, as a buffer of interest, the image buffer storing the two-dimensional image on which the three-dimensional object V is displayed. Second, the user operates the Copy button instructing copying. Third, the user operates the Rectangle button designating the shape of the wall S. Fourth, the user designates, as characteristic points, four vertices $P_1$, $P_2$, $P_3$, and $P_4$ of the rectangle forming the wall S with vertical lines in the two-dimensional image.

In step S8, if the input event processor 11 has determined that the Paste button has been operated, the paste processor 13 performs pasting. In this case, the input event processor 11 proceeds from step S8 to S12, and the paste processor 13 computes a transform expression for transforming, based on the shape information and the characteristic points, the image on the two-dimensional plane stored in the paste buffer into a projected image. The paste processor 13 supplies it to the image transform processor 20. In step S13, the image transform processor 20 transforms, based on the transform expression, the image stored in the paste buffer into a projected image. In step S14, the image transform processor 20 pastes the projected image on the plane (specified by characteristic points) of the three-dimensional object displayed in the two-dimensional image stored in the buffer of interest. After that, the input event processor 11 returns to step S1.

According to the above-described pasting, when the image on the two-dimensional plane (shown in FIG. 10A) is stored in the paste buffer by the copying described with reference to FIGS. 9A and 9B, and the two-dimensional image on which the house-shaped three-dimensional object V is stored in the buffer of interest, by designating, as shape information, a rectangle that is the shape of an unfigured wall S', and designating, as characteristic points, four vertices $P_1'$, $P_2'$, $P_3'$, and $P_4'$ of the unfigured wall S', an expanded image of the wall S', formed in the case where the three-dimensional object V is projected on the screen when the image stored in the paste buffer is pasted on the wall S' of the three-dimensional object V, is generated and pasted on the wall S' specified by the characteristic points $P_1'$, $P_2'$, $P_3'$, and $P_4'$ of the three-dimensional object V displayed on the two-dimensional image stored in the buffer of interest.

Figure 10A:
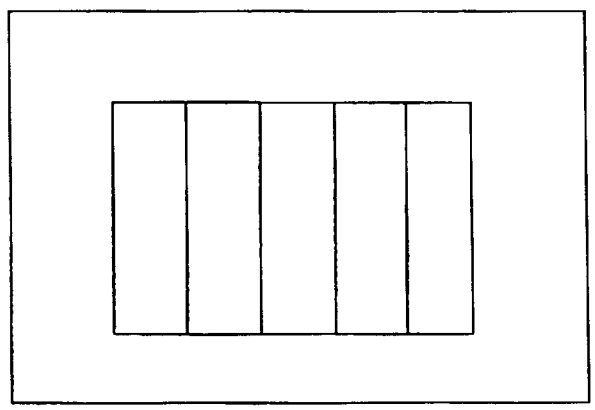
FIGS. 10A, 10B, and 10C are drawings illustrating pasting.

Therefore, when the image shown in FIG. 10A is stored in the paste buffer, and the two-dimensional image (shown in FIG. 10B) on which the house-shaped three-dimensional object V is displayed is stored, in order that a two-dimensional image in which the image stored in the paste buffer is pasted on the wall S' of the three-dimensional object V may be obtained, the user needs to perform the following operations. First, the user sets, as a buffer of interest, the image buffer storing the two-dimensional image on which the three-dimensional object V is displayed. Second, the user operates the Paste button for instructing pasting. Third, the user operates the Rectangle button for designating the shape of the wall S'. Fourth, the user designates, as characteristic points, four vertices $P_1$, $P_2$, $P_3$, and $P_4$ of the rectangle forming the wall S' in the two-dimensional image.

Figure 10B:
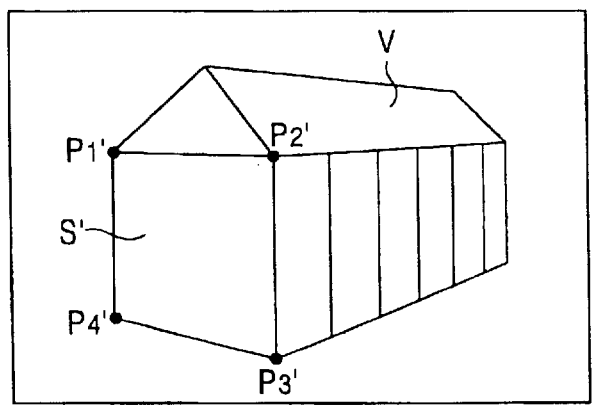
Figure 10C:
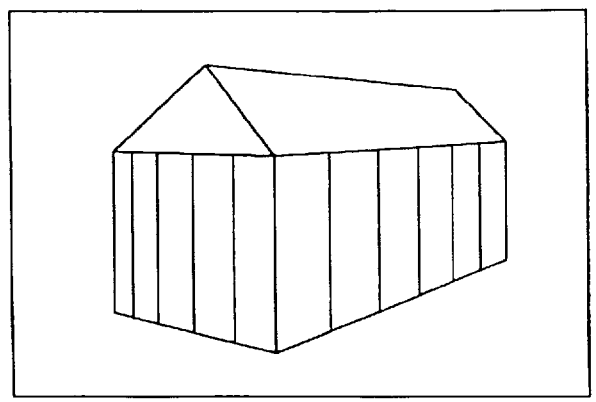

As is clear from the above-described descriptions, by performing the copying described with FIGS. 9A and 9B while using, as a buffer of interest, an image buffer storing a two-dimensional image on which the three-dimensional object V is displayed, and performing the pasting described with FIGS. 10A, 10B, and 10C, the texture of the wall S can be copied on another wall S'. In other words, the user can copy the texture of the wall S in the two-dimensional image on another wall S by only performing the above-described copying and pasting without paying attention to the directions of the walls S and S'.

In addition, by using conventional two-dimensional paint, or the like, to write the characters "ABC" or "DEF" in the paste buffer, similar to the writing of characters on a plane, and using pasting to paste the characters on the wall of the house shown in FIG. 5A, a natural two-dimensional image as shown in FIG. 5B can be obtained. In other words, it is not necessary to write the characters along the wall.

By performing copying so that an expanded image is stored in the paste buffer, or selecting, as the paste buffer, an image buffer storing a texture, and performing pasting three times after designating, as characteristic points, vertices $p_1$, $p_2$, $p_3$, and $p_4$ constituting the plane $S_1$ (shown in FIG. 5C), vertices $p_3$, $p_4$, $p_5$, and $p_6$ constituting the plane $S_2$ (shown in FIG. 5C), and vertices $P_2$, $P_3$, $P_6$, and $p_7$ constituting the plane $S_3$ (shown in FIG. 5C), a two-dimensional image in which a parallelepiped room is added to the wall of the house can be easily created (In this case, rectangles are designated for pieces of shape information of planes $S_1$, $S_2$, and $S_3$).

As is understood from FIGS. 5A to 5C, a three-dimensional object for pasting may be displayed or may not be displayed in the two-dimensional image stored in the buffer of interest. In other words, FIG. 5B shows that a three-dimensional object for pasting (three-dimensional object on which characters are pasted) is displayed on the original two-dimensional image (the two-dimensional image shown in FIG. 5A. FIG. 5C shows that a three-dimensional object (parallelepiped defined by the planes $S_1$, $S_2$, and $S_3$ shown in FIG. 5C) for pasting is not displayed on the original two-dimensional image. In the case where a three-dimensional object for pasting is not on the original two-dimensional image, correction of characteristic points designated by the user, which are points of the three-dimensional object, that is, step S7 shown in FIG. 7, is skipped. This is because user-designated characteristic points are corrected to be positioned on the contour line of the three-dimensional object in step 7 as described below, but when the three-dimensional object is not displayed on the original two-dimensional image, its contour line does not exist.

Figure 11:
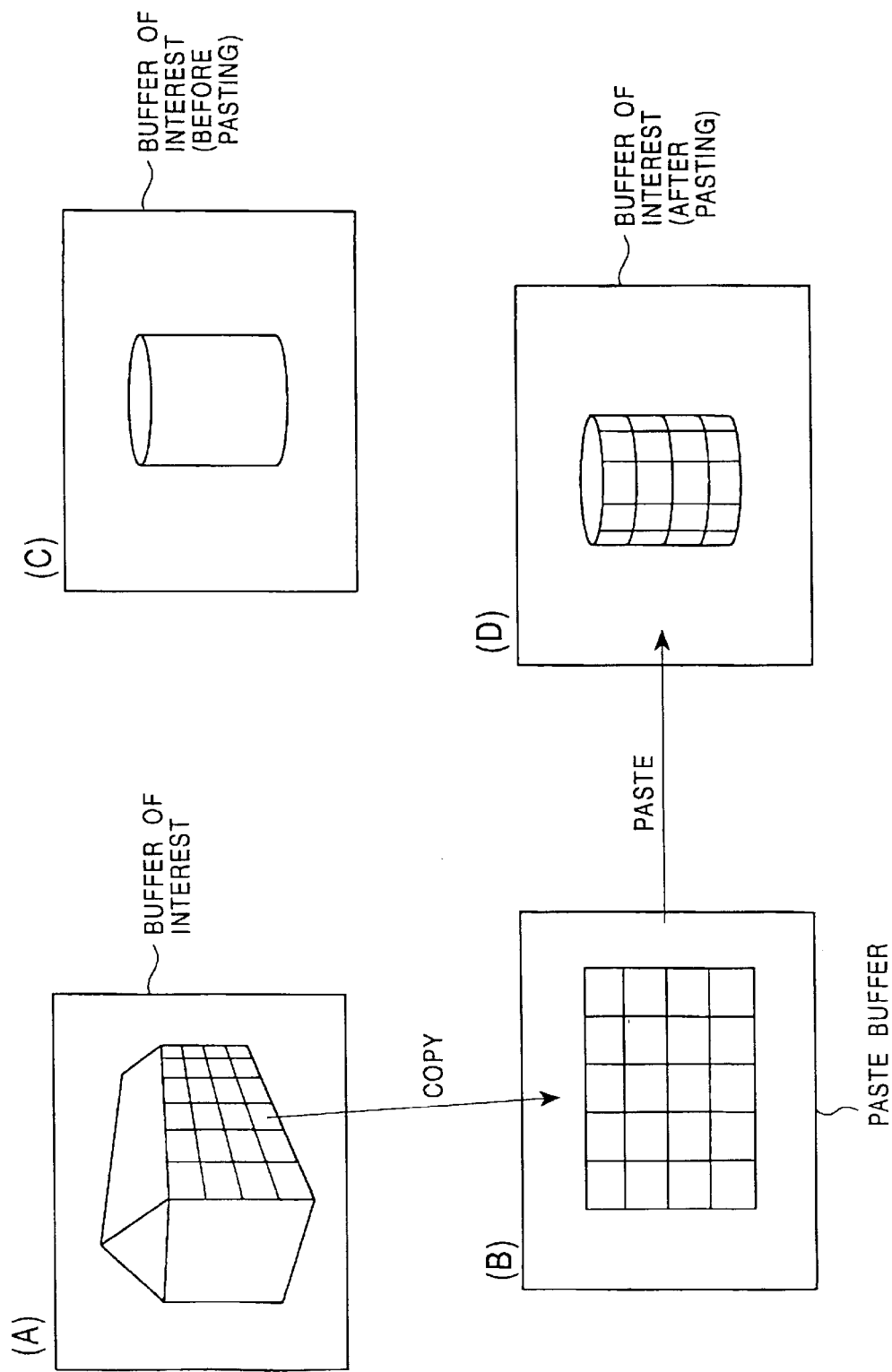
FIG. 11 consists of drawings (A), (B), (C), and (D) illustrating texture copying by using a combination of copying and pasting.

An expanded image obtained by copying based on a two-dimensional image may be pasted on a two-dimensional image excluding the original two-dimensional image. The plane of a three-dimensional object on which the expanded image is pasted may not have the same shape as the plane of the original three-dimensional object for generating the expanded image. For example, by performing copying on a latticed wall of a three-dimensional object displayed in a two-dimensional image as shown in FIG. 11A, storing the expanded image in the paste buffer as shown in FIG. 11B, and performing pasting on the side plane of a cylinder displayed in a two-dimensional image as shown in FIG. 11C, the latticed expanded image can be pasted along the side plane of the cylinder. In other words, the texture of a three-dimensional object can be pasted as the texture of another three-dimensional object.

In the paste buffer, not only images obtained by copying, but also arbitrary images can be stored. According to pasting, an arbitrary image can be pasted on a three-dimensional object displayed in a two-dimensional image (As described above, the three-dimensional object does not need to be displayed on the two-dimensional image).

According to copying and pasting, in addition to the above-described operations, various three-dimensional operations on a two-dimensional image can be performed. For example, in the case where the plane of a three-dimensional object displayed in the two-dimensional image is irregular, by storing an expanded image of the plane in the paste buffer, deleting the irregularity in the paste buffer, and using pasting to paste the irregularity-deleted image on the original three-dimensional object, a two-dimensional image on which the irregularity-deleted three-dimensional object is displayed can be obtained. In addition, for example, when copying and pasting on the same three-dimensional object is performed, by replacing characteristic points to be designated for pasting by characteristic points to be designated for pasting, movement, enlargement, reduction, and other non-linear transformation (e.g., transformation producing virtual effects of image capture using a lens having optical characteristics, such as a so-called "fish-eye lens", etc.) on a three-dimensional object can be performed.

Referring back to FIG. 7, if the input event processor 11 has determined in step S3 that the matte operation has been instructed, in other words, when among the Command buttons 31, the Matte button has been operated, the input event processor 11 proceeds to step S15, and activates the matte processor 16 to perform the matte operation. At this time, the mate processor 16 generates and stores, in the buffer of interest, the matte of the three-dimensional object displayed in the two-dimensional image stored in the buffer of interest, and returns to step S1. The details of the matte operation are described below.

If the input event processor 11 has determined in step S3 that object property processing or illumination change has been instructed, in other words, among the Command buttons 31, the Material button or the Light button has been operated, the input event processor 11 proceeds to step S16. In step S16, the input event processor 11 activates the object property processor 17 to perform the object property processing or illumination change (object property/illumination change processing), and returns to step S1. The details of the object property processing or illumination change are described below.

If the input event processor 11 has determined in step S3 that erasing has been instructed, in other words, when among the Command buttons 31, the Erase button has been operated, the input event processor 11 proceeds to step S17. In step 17, the input event processor 11 activates the erase processor 17 to perform erasing, and returns to step S1. The details of erasing are described below.

If the input event processor 11 has determined in step S3 that painting has been instructed, in other words, when among the Command buttons 31, the Paint button has been operated, the input event processor 11 proceeds to step S18. In step S18, the input event processor 11 activates the paint processor 18 to perform painting, and return to step S1. In painting, by using, for example, a paint tool performing two-dimensional paint similar to conventional one, part of an image stored in the paste buffer is erased or another image is added in accordance with user operations from the input unit 6.

As described above, in the case where the plane of a three-dimensional object displayed in the two-dimensional image is irregular, by storing an expanded image of the plane in the paste buffer, deleting the irregularity in the paste buffer, and using pasting to paste the irregularity-deleted image on the original three-dimensional object, a two-dimensional image on which the irregularity-deleted three-dimensional object is displayed can be obtained.

By performing copying on a two-dimensional image on which the three-dimensional object is displayed as shown in FIG. 5A, storing an expanded image of the walls in the paste buffer, using painting to write the characters "ABC" or "DEF" on the image stored in the paste buffer, and using pasting to paste the character-written image on the original walls, a natural two-dimensional image can be obtained as shown in FIG. 5B. In other words, two-dimensional paint enables facile three-dimensional rendering.

Figure 12:
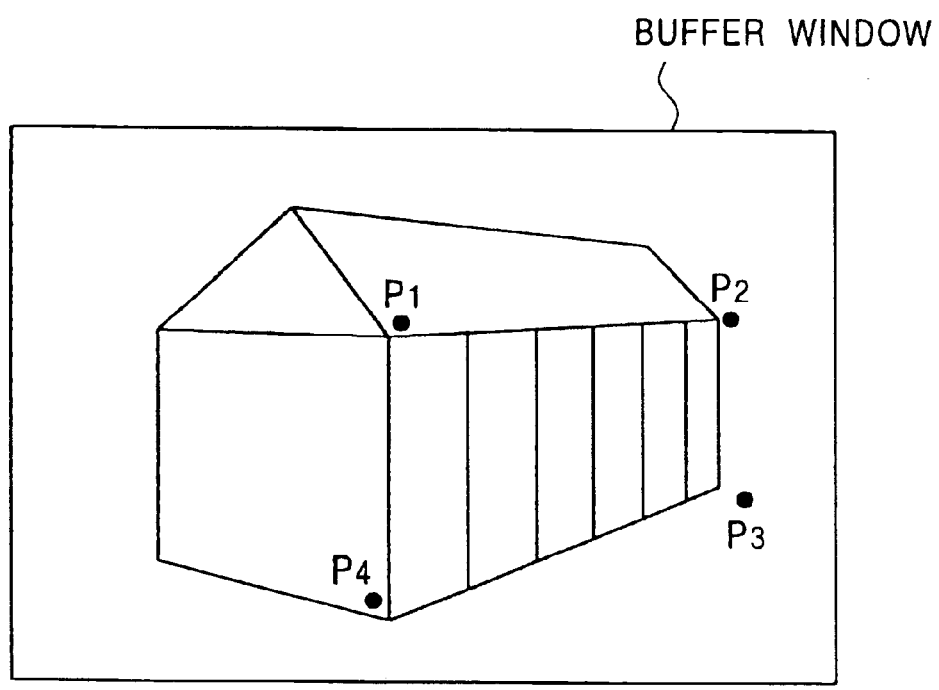
FIG. 12 is an illustration of characteristic points designated by a user.

When copying described with reference to FIGS. 9A and 9B, or pasting described with reference to FIGS. 10A to 10C, is performed, it is difficult for an operation-experienced user to accurately designate the positions of vertices $P_1$ to $P_4$ or vertices $P_1'$ to $P_4'$ as characteristic points. In other words, when copying described with reference to FIGS. 9A and 9B is performed, the user-designated characteristic points $P_1$ to $P_4$ shift from the positions of vertices to be essentially designated, as shown in FIG. 12. When the two-dimensional image defocuses or is blurred, it is impossible for even the experienced user to accurately designate, as characteristic points, the positions of vertices to be essentially designated.

Figure 7:
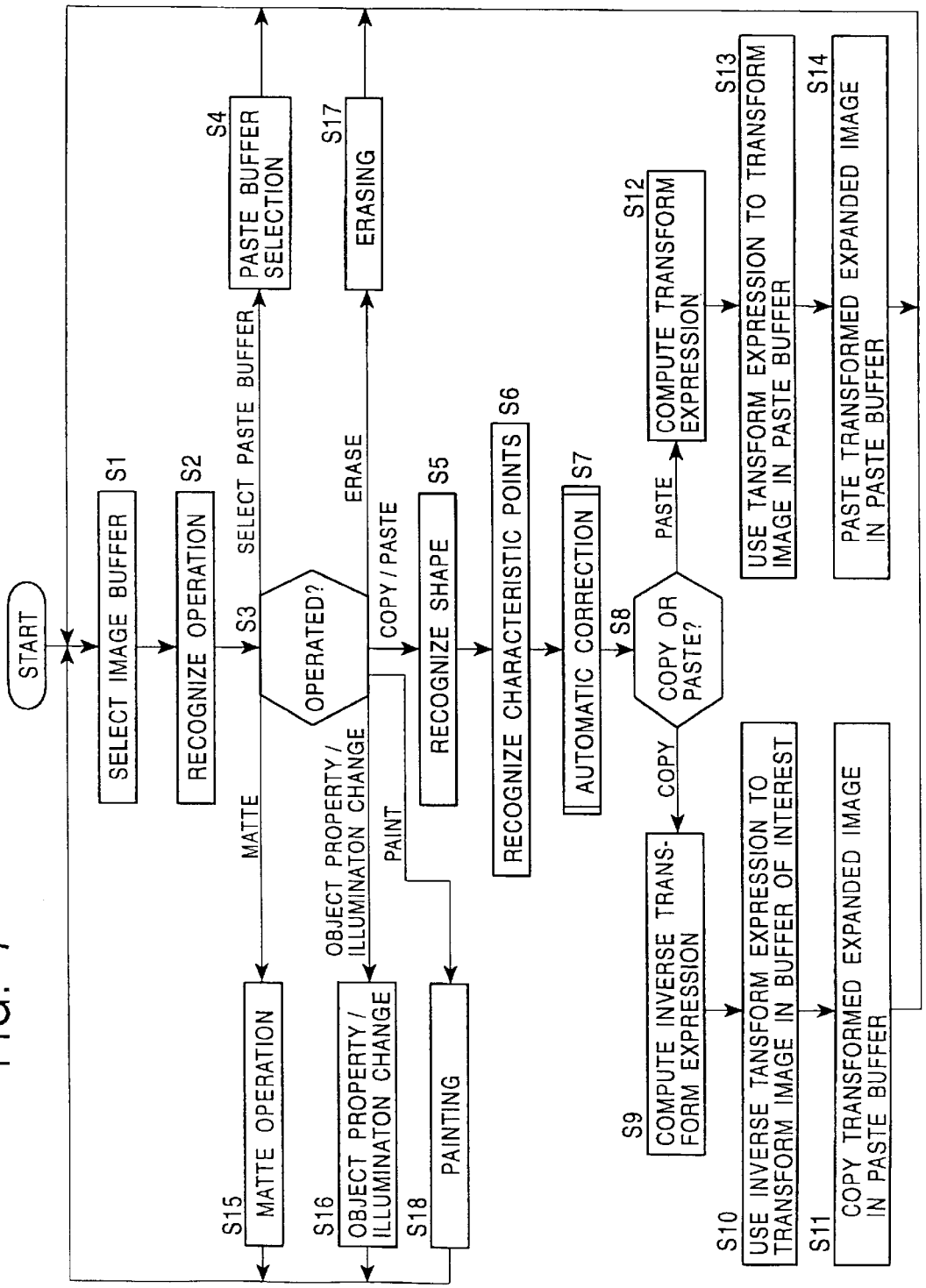
FIG. 7 is a flowchart illustrating a process performed by the image processing apparatus shown in FIG. 4.

Accordingly, in step S7 in FIG. 7, automatic correction is performed so that the positions of the characteristic points designated by the user are corrected to the positions to be essentially designated.

In other words, in step S7, the copy processor 12 or the paste processor 13 activates the designated transform processor 19 to supply shape information and characteristic points designated from the input unit 6 operated by the user.

When the designated transform processor 19 receives the shape information and the characteristic points, it performs the automatic correction for correcting the characteristic points.

The points to be designated are basically points on the contour line (borderline) of planes of a three-dimensional shape used for copying or pasting, as described below. Accordingly, the designated transform processor 19 extracts the contour line of the three-dimensional shape (plane) used for copying or pasting, and corrects the characteristic points so as to be positioned on the contour line.

Figure 13:
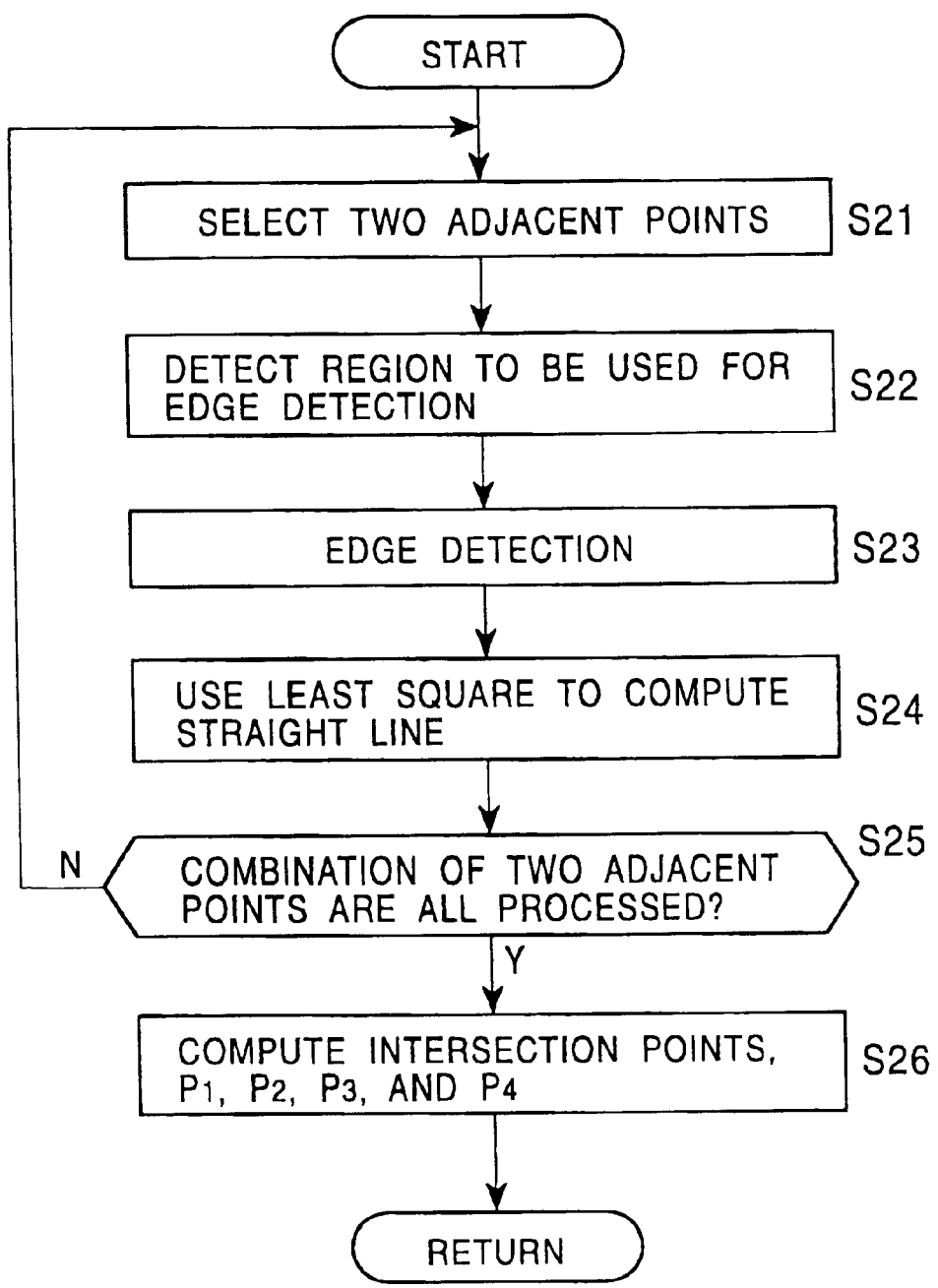
FIG. 13 is a flowchart illustrating the details of automatic correction in step S7 shown in FIG. 7.

FIG. 13 shows a flowchart describing automatic correction performed by the designated transform processor 19. To make description simpler, an example is given hereinafter wherein a plane of a three-dimensional object displayed on a two-dimensional image, which is used for the copying or pasting, is a quadrangle as shown in FIG. 12. Therefore, as illustrated in FIG. 12, four vertices of the quadrangle should be designated as characteristic points.

In the designated transform processor 19, firstly in step 21, a combination of two adjacent points is selected from characteristic points inputted (designated) by the user. Specifically, points that should be designated as characteristic points are, as described above, basically on a contour line of a plane of the three-dimensional object displayed on the two-dimensional image, which is used for the copying or pasting. Also it is determined in advance, according to a shape of the three-dimensional object, which points on the contour line the user should designate as characteristic points, as described in the following. Since two adjacent characteristic points on the contour line can be recognized from the characteristic points inputted by the user based on the shape information, the designated transform processor 19 selects one of the combinations of two characteristic points recognized in such a manner.

In step S22, a region to be used for edge detection, performed in step S23 described below, (hereinafter referred to as an edge candidate region) is detected. Specifically, in step S22, for example, a line segment connecting two characteristic points selected in step S21 (hereinafter referred to as selected characteristic points) is obtained, and pixels within a range of a predetermined distance (a distance of five-pixels, for example) from the line segment are detected. Such detected pixels form an edge candidate region.

Figure 14:
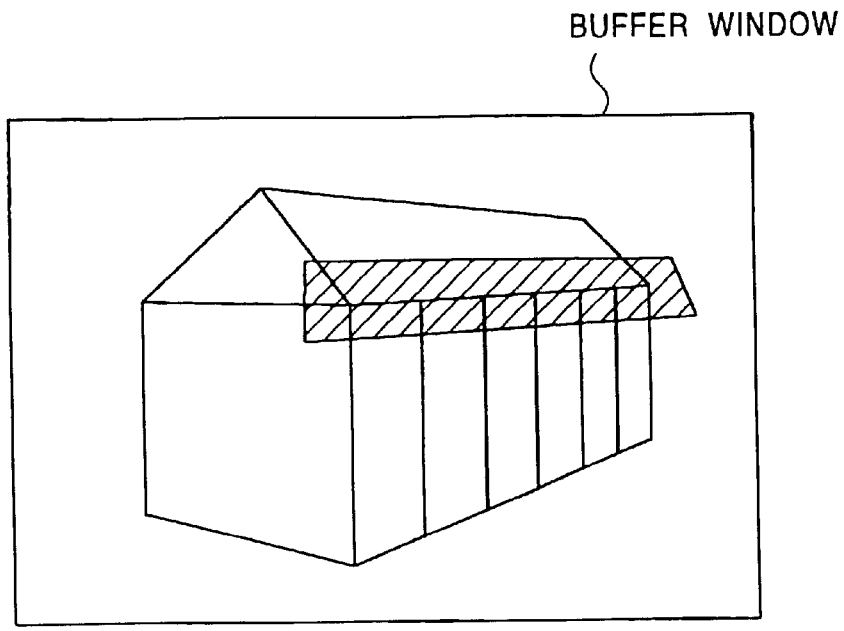
FIG. 14 is a drawing illustrating step S22 shown in FIG. 13.

Specifically, given that the characteristic points $P_1$ to $P_4$ are designated, for example, as shown in FIG. 12, when the characteristic points $P_1$ and $P_2$ are selected as the selected characteristic points, a shaded region shown in FIG. 14 is detected as the edge candidate region.

As well as allowing the user to input a desired distance by operating the input unit 6, it is possible to preset a distance range from the line segment connecting two selected characteristic points, wherein pixels are detected.

After the edge candidate region is detected, the process proceeds to step S23 wherein edge detection is performed using the edge candidate region.

Various types of conventional methods are proposed heretofore as edge detection methods, all of which are applicable here. In this embodiment, the following method, for example, is taken.

Specifically, pixels within the edge candidate region are filtered by an edge detection filter called a Sobel operator, and a gradient (gradient vector) in each pixel is obtained. It is conventionally known in the art to detect pixels having a greater gradient. In this embodiment, however, an inner product of a unit vector meeting at right angles with the line segment connecting the two selected characteristic points, namely, a normal vector, and a gradient in each pixel within the edge candidate region is computed, and a pixel having an inner product not smaller than a predetermined threshold level is detected as a pixel forming an edge (hereinafter referred to as an edge pixel).

As indicated in FIG. 12, the characteristic points are designated such that they do not exactly coincide with, but are in the vicinity of, the vertices of the quadrangle which form the plane of the three-dimensional object used for the copying or pasting. Therefore, the line segment connecting two selected characteristic points approximately coincides with a contour line of the quadrangle which forms the plane of the three-dimensional object used for the copying or pasting. As a result, an inner product of a normal vector and a gradient represents a gradient's component in the normal vector's direction, or in the direction approximately perpendicular to the contour line. Hence, edge detection using values of the inner products reduces adverse effects, compared with edge detection using values of gradients. In other words, it is possible to perform edge detection unaffected by noise or texture such as a moire pattern of a two-dimensional image.

After the edge pixels are detected, the process proceeds to step S24 wherein a straight line crossing the edge pixels is obtained, using, for example, the least squares method. Specifically, in step S24, a line minimizing the sum of the squares of the distances from the edge pixels detected in step S23 (hereinafter referred to as an edge straight line) is obtained.

In step S25, it is determined whether edge straight lines are obtained for all combinations of two adjacent characteristic points inputted by the user. If the result is negative, the process returns to step S21, and two adjacent characteristic points for which an edge straight line is not yet obtained are selected as selected characteristic points and a similar processing is repeated.

If it is determined that edge straight lines are obtained for all combinations of two adjacent points, i.e., edge straight lines are obtained respectively for a combination of characteristic points $P_1$ and $P_2$, a combination of $P_2$ and $P_3$, a combination of $P_3$ and $P_4$, and a combination of $P_4$ and $P_1$ as in FIG. 12, intersection points of four edge straight lines obtained for the four combinations are computed in step S26. Specifically, an intersection point of the edge straight line obtained for the combination of the characteristic points $P_4$ and $P_1$ and the edge straight line obtained for the combination of the characteristic points $P_1$ and $P_2$ (hereinafter referred to as a first intersection point), an intersection point of the edge straight line obtained for the combination of the characteristic points $P_1$ and $P_2$ and the edge straight line obtained for the combination of the characteristic points $P_2$ and $P_3$ (hereinafter referred to as a second intersection point), an intersection point of the edge straight line obtained for the combination of the characteristic points $P_2$ and $P_3$ and the edge straight line obtained for the combination of the characteristic points $P_3$ and $P_4$ (hereinafter referred to as a third intersection point), and an intersection point of the edge straight line obtained for the combination of the characteristic points $P_3$ and $P_4$ and the edge straight line obtained for the combination of the characteristic points $P_4$ and $P_1$ (hereinafter referred to as a fourth intersection point) are computed. Further in step S26, the characteristic point closest to each intersection point is corrected and adjusted to the intersection point, i.e. the characteristic points $P_1$ to $P_4$ are corrected to the positions of first to fourth intersection points, and the process returns.

The above described automatic correction enables the characteristic points $P_1$ to $P_4$ designated by the user to be moved to the vertices of the quadrangle, freeing the user from designating accurate positions of characteristic points. Specifically, the user should only designate points in the vicinity of the positions that should be designated as characteristic points.

In the process shown in FIG. 7, the automatic correction of characteristic points is set to operate every time. However it is possible to set the automatic correction such that it operates only when the user gives an instruction. Also it is possible to allow the user to further correct characteristic points after being corrected by the automatic correction.

Next, the automatic correction can be operated using the edge pixel detection method illustrated in FIG. 13, for example, as described below.

Figure 15:
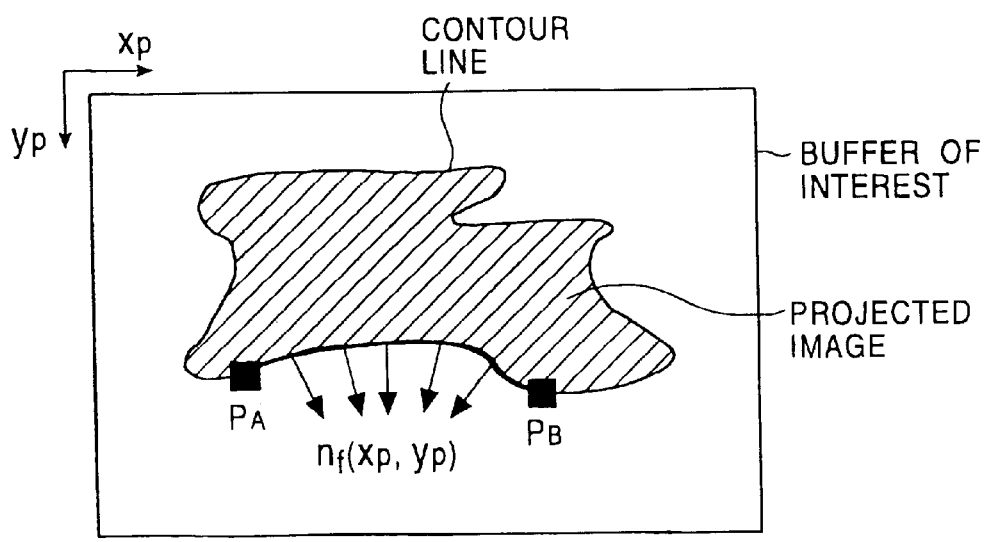
FIG. 15 is a drawing illustrating a method of extracting the contour line of three-dimensional object displayed in a two-dimensional image.

Specifically, it is assumed that a two-dimensional image, such as that shown in FIG. 15, is stored in a buffer of interest. A shaded part in FIG. 15 indicates a three-dimensional object displayed on a two-dimensional image (hereinafter referred to as a projected image hereinafter, since it is the three-dimensional object in three-dimensional space projected onto a screen).

In FIG. 15, points $P_A$ and $P_B$ of the two-dimensional image are designated as characteristic points of the projected image of the three-dimensional object. The points $P_A$ and $P_B$ are adjacent to each other on a contour line of the projected image of the three-dimensional object.

For the two-dimensional image stored in the buffer of interest, a two-dimensional coordinate system having a horizontal $x_p$ axis and a vertical $y_p$ axis is defined as shown in FIG. 15. The form of the three-dimensional object displayed on the two-dimensional image is recognizable from shape information. Once the shape of the three-dimensional object is recognized, a contour line between the characteristic points $P_A$ and $P_B$ of the projected image (since a contour line of the projected image basically forms a closed loop, there are two contour lines between the characteristic points $P_A$ and $P_B$; here, a contour line having no other characteristic point (indicated by a bold line in FIG. 15) is selected from the two contour lines (indicated by bold and thin lines in FIG. 15)) can generally be defined as a function f of variables $x_p$ and $y_p$, f=0, expressed with a plurality of parameters. (The function f has a different type (a package in the field of programming) according to the form of the three-dimensional object.)

Specifically, expressing the parameters by $C_1, C_2, \ldots, C_N$ (N is an integer not smaller than 1), a contour line between the characteristic points $P_A$ and $P_B$ is defined as:

$$f(x_p, y_p, C_1, C_2, \ldots, C_N)=0 \qquad (1)$$

In the meantime, pixels forming the true contour line generally have a component of the pixel level which suddenly varies in the direction perpendicular to the contour line. Hence, when the parameters $C_1, C_2, \ldots, C_N$ that maximize the component in the direction of the normal vector (perpendicular to the contour line) in the pixel, out of a differential value of the pixel level of pixels on the screen coordinate system expressed by the expression (1), are computed, a line defined by the expression (1) using the parameters represents the true contour line.

Then, energy $E_f$ of a line corresponding to the contour line between the characteristic points $P_A$ and $P_B$ defined by the expression (1) (as described above, there are two lines between the characteristic points $P_A$ and $P_B$ which correspond to the contour line of the projected image; here, it is the line having no other characteristic point) is defined as:

$$E_f = \frac{\sum_{\{(x_p,y_p)|f(x_p,y_p,P_1,\ldots,P_N)=0\}} ||\nabla B(x_p, y_p) \cdot n_f(x_p, y_p)|}{K} \quad (2)$$

In the expression (2), $\Sigma$ indicates summation for all pixels on the line expressed by the expression (1). Also $\nabla$ represents the nabla operator and $B(x_P, y_P)$ represents a pixel level of a pixel at a position $(x_P, y_P)$ on the screen coordinate system. A vector $n_f(x_P, y_P)$ represents a normal vector at a pixel at a position $(x_P, y_P)$ (a unit vector at a position $(x_P, y_P)$ of a vector (here, e.g., an outward vector in a region enclosed by the contour line) perpendicular to the line expressed by the expression (1)). Also $|x|$ represents a norm of a vector x and $\cdot$ represents an inner product. In addition, K represents the total of pixels on the line expressed by the expression (1).

$\nabla B(x_P, y_P)$ in the expression (2) represents a differential value of a pixel level of a pixel on the line expressed by the expression (1), namely, a gradient, which can be computed using the Sobel operator. Specifically, $\nabla B(x_P, y_P)$ can be computed using the following expression:

$$\nabla B(x_p, y_p) = (\Delta_x B(x_p, y_p), \Delta_y B(x_p, y_p))$$

$$\Delta_x B(x_p, y_p) = B(x_p + 1, y_p - 1) + 2B(x_p + 1, y_p) + \\ B(x_p + 1, y_p + 1) - (B(x_p - 1, y_p - 1) + \\ 2B(x_p - 1, y_p) + B(x_p - 1, y_p + 1)) \quad (3)$$

$$\Delta_x B(x_p, y_p) = B(x_p - 1, y_p + 1) + 2B(x_p, y_p + 1) + \\ B(x_p + 1, y_p + 1) - (B(x_p - 1, y_p - 1) + \\ 2B(x_p, y_p - 1) + B(x_p + 1, y_p - 1))$$

In addition, a parameter $C_n$ (n=1, 2, ..., N) maximizing energy $E_f$ can be obtained as follows. Expressing the initial value of the parameter $C_n$ by $C_n'$ for example, the expression (2) is computed using the parameter $C_n$ being varied within a range of from $C_n'-\epsilon_n$ to $C_n'+\epsilon_n$ to obtain the parameter $C_n$ when the value is a maximum. ($\epsilon_n$ n is a predetermined infinitesimal value.) Specifically, given that the contour line between the characteristic points $P_A$ and $P_B$ is a line segment L, for example, the expression (2) can be expressed as:

$$E_f = \frac{\sum_{(x_p,y_p) \in L} |\nabla B(x_p, y_p) \cdot n_L|}{K} \quad (4)$$

Here, $\Sigma$ represents, as described above, the line expressed by the expression (1), namely, summation of all pixels on the line segment L. Also a vector $n_L$ corresponds to the vector $n_f(x_P, y_P)$ in the expression (2), which is a normal vector of the line segment L. In the expression (4), K represents the total of pixels on the line segment L.

Meanwhile, if the contour line between the characteristic points $P_A$ and $P_B$ is a line segment, the expression (1) can be expressed using three parameters $C_1$, $C_2$, and $C_3$, for example, as:

$$f(x_P, y_P, C_1, C_2, C_3) = C_1 x_P + C_2 y_P + C_3 \quad (5)$$

Given that the coordinates of the characteristic points $P_A$ and $P_B$ are $(x_1, y_1)$ and $(x_2, y_2)$, respectively, the parameters $C_1$, $C_2$, and $C_3$ in the expression (5) can be expressed as:

$$C_1 = y_1 - y_2, \; C_2 = -x_1 + x_2, \; C_3 = x_1 y_2 - x_2 y_1 \quad (6)$$

Therefore in this case, the values expressed by the expression (6) are used as the initial values $C_1'$, $C_2'$, and $C_3'$ of the parameters $C_1$, $C_2$, and $C_3$ for computing energy $E_f$ expressed by the expression (4) while varying each value, and the parameters $C_1$, $C_2$, and $C_3$ that maximize the energy $E_f$ are obtained. The expression (5) using these parameters $C_1$, $C_2$, and $C_3$ represents the true contour line between the characteristic points $P_A$ and $P_B$. Thus, moving the characteristic points $P_A$ and $P_B$ onto the line expressed by the expression (5) means that they are moved onto the true contour line.

Provided that the contour line between the characteristic points $P_A$ and $P_B$ is a line segment, varying the parameters $C_1$, $C_2$, and $C_3$ corresponds to varying the coordinates of each characteristic point $P_A$ and $P_B$, being $(x_1, y_1)$ and $(x_2, y_2)$, respectively. Accordingly, the coordinates $x_1$, $y_1$, $x_2$, and $y_2$ are the parameters of the function f.

When the contour line between the characteristic points $P_A$ and $P_B$ is a line segment, the initial values are provided for three parameters of the function f in the expression (5) by the characteristic points $P_A$ and $P_B$. Meanwhile, when the contour line between the characteristic points $P_A$ and $P_B$ is a curve, the initial values are not necessarily provided for all the parameters of the function f. In the latter case, a predetermined value may be given as an initial value, or the user may input a desired initial value.

In the above description, only two adjacent characteristic points are used so that the description is simpler to understand. However, a problem such as in the following may occur in actual processing. Given that three characteristic points, namely, a characteristic point #1, a characteristic point #2 adjacent to #1, and a characteristic point #3 adjacent to #2, are designated on a contour line, when the above automatic correction first using the characteristic points #1 and #2, and then using the characteristic points #2 and #3 are processed, the position of the characteristic point #2 after being corrected by the automatic correction using the characteristic points #1 and #2, and the position of the characteristic point #2 after being corrected by the automatic correction using the characteristic points #2 and #3 may not meet each other.

Therefore in the actual processing, parameters of the expression (1) defining the contour line between the characteristic points #1 and #2 (hereinafter referred to as first parameters) and parameters of the expression (1) defining the contour line between the characteristic points #2 and #3 (hereinafter referred to as second parameters) may preferably be altered so that such a deviation of corrected positions of the characteristic point #2 does not occur. In this case, the first and second parameters are not independent; their relationship is restricted by a condition that the corrected positions of the characteristic point #2 do not deviate from each other. Consequently, the relationship between the first parameters maximizing the energy $E_f$ of the expression (2) using the characteristic points #1 and #2, and the second parameters maximizing the energy $E_f$ of the expression (2) using the characteristic points #2 and #3 may not satisfy the condition that the corrected positions of the characteristic point #2 do not deviate from each other. In such a case, the first and second parameters that maximize the sum of the energy $E_f$ of the expression (2) using the characteristic points #1 and #2, and the energy $E_f$ of the expression (2) using the characteristic points #2 and #3 can be obtained.

To make the description simpler, an example is considered in which the deviation of one characteristic point #2 occurs. However, such a deviation may occur in all the characteristic points on the same contour line. Thus, it is preferred to compute parameters of the expression (1) defining a contour line between a combination of adjacent points for all the combinations using the above method. Specifically, it is preferred to compute the total energies $E_f$ of combinations of adjacent characteristic points and obtain parameters that maximize the total.

Figure 16:
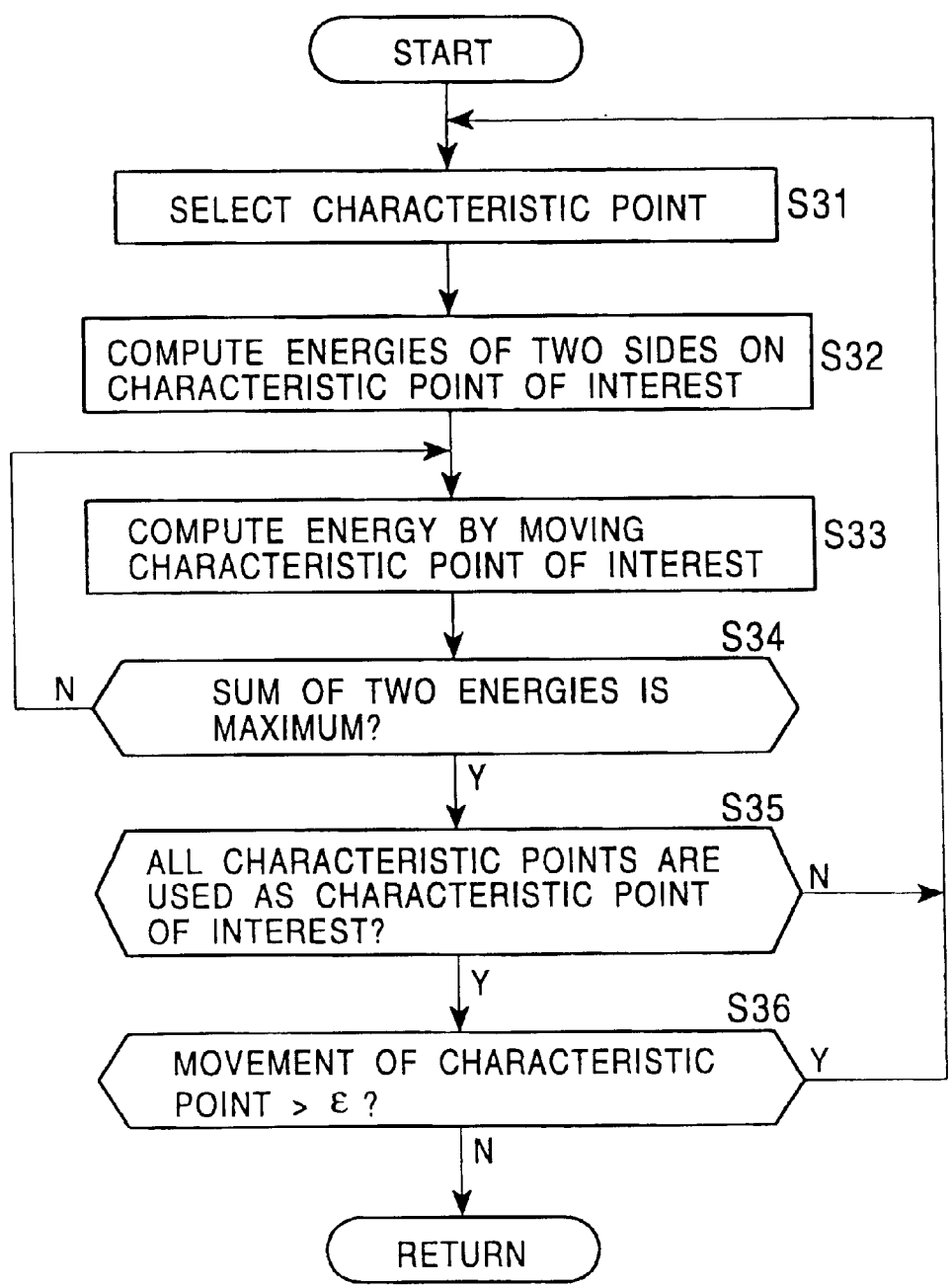
FIG. 16 is a flowchart illustrating the details of step S7 shown in FIG. 7.
Figure 17:
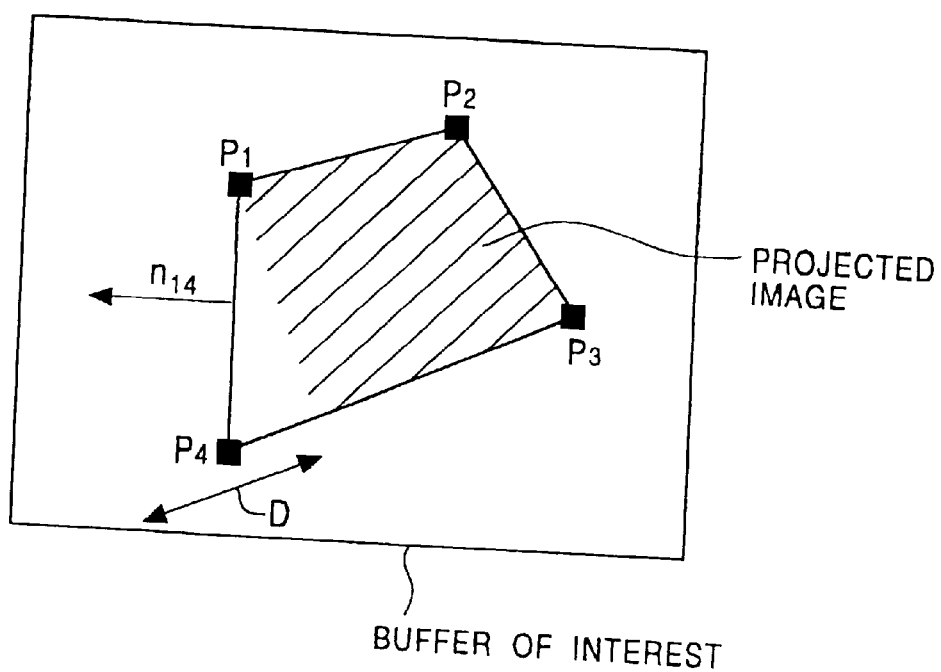
FIG. 17 is a drawing illustrating correction of characteristic points.

Now referring to a flowchart in FIG. 16 and to FIG. 17, the above automatic correction processed in step S7 in FIG. 7 is described.

To make the description simpler, it is assumed that a projected image is a quadrangle and four vertices of the quadrangle are designated as characteristic points $P_1$ to $P_4$.

Also in this case, energy $E_f$ expressed by the expression (4) is computed by varying three parameters $C_1$, $C_2$, and $C_3$ in the expression (5), i.e. x-coordinates $x_1$ and $x_2$ and y-coordinates $y_1$ and $y_2$ of two characteristic points in the expression (6), and $x_1$, $x_2$, $y_1$, and $y_2$ maximizing the energy $E_f$ are obtained. Since such computation is quite complex, a simplified method is used here to reduce the computational complexity.

Specifically at first in step S31, one of four characteristic points $P_1$ to $P_4$ is selected as a characteristic point of interest. In step S32, energies $E_f$ of two sides of the quadrangle crossing the characteristic point of interest (connecting the characteristic point of interest and other characteristic points) are computed. For example, given that the points $P_1$ to $P_4$ are designated as characteristic points of a shaded projected image, as in FIG. 17, and the characteristic point $P_4$ is selected as a characteristic point of interest, energies $E_f$ of sides $P_4P_1$ and $P_3P_4$, which cross the characteristic point of interest $P_4$, among four sides of a quadrangle $P_1P_2P_3P_4$, are obtained in step S32.

In step S33, one of the two sides, for which the energies $E_f$ are computed in step S32, having a greater energy $E_f$ is selected as a line closer to a contour line of the projected image. The characteristic point of interest is shifted along a straight line extending that selected side (occasionally referred also as an edge straight line). Then energies $E_f$ of two sides formed by the shifted characteristic point of interest and two characteristic points adjacent to the shifted characteristic point of interest are computed. Specifically, given that the characteristic point $P_4$ is selected as the characteristic point of interest, as in FIG. 17, when energy $E_f$ of the side $P_3P_4$ is greater than energy $E_f$ of the side $P_4P_1$, the characteristic point of interest $P_4$ is shifted along the straight line $P_3P_4$ as represented by an arrow D in the drawing. Then energy $E_f$ of the side $P_3P_4$ formed by the shifted characteristic point of interest $P_4$ and one characteristic point $P_3$ adjacent to $P_4$, and energy $E_f$ of the side $P_4P_1$ formed by the shifted characteristic point of interest $P_4$ and the other characteristic point $P_1$ adjacent to $P_4$ are computed.

After that, it is determined in step S34 whether the sum of the energies of two sides computed in step S33 is a maximum. If the result is negative, the process returns to step S33 and the characteristic point of interest is shifted again along the edge straight line, and a similar processing is repeated.

On the other hand, when it is determined that the sum of the energies of the two sides computed in step S33 is a maximum, or as described above, when, by shifting the characteristic point $P_4$ along the straight line $P_3P_4$, a normal vector $n_{14}$ of the side $P_4P_1$ approximately meets at right angles with a side connecting two vertices that should originally be designated by the characteristic points $P_1$ and $P_4$, the process proceeds to step S35. In step S35 it is determined whether all characteristic points $P_1$ to $P_4$ have been used as characteristic points of interest. If the result is negative, the process returns to step S31 and the characteristic point that has not yet been used as a characteristic point of interest is selected as a characteristic point of interest, and step S32 and those that follow are repeated.

If it is determined in step S35 that all characteristic points $P_1$ to $P_4$ have been used as characteristic points of interest, the process proceeds to step S36. In step S36, it is determined whether movements of the characteristic points $P_1$ to $P_4$ in the processing of the previous step S33 exceed a predetermined threshold level $\epsilon$. If the result is affirmative, the process returns to step S31 and repeats similar processing. Specifically, each of the characteristic points $P_1$ to $P_4$ is sequentially selected as the characteristic point of interest, of which position is shifted so that the sum of energies of the two sides formed by each characteristic point is a maximum.

In the meantime, when it is determined in step S36 that the movements of the characteristic points $P_1$ to $P_4$ in step S33 do not exceed the predetermined threshold level $\epsilon$, or as described above, when there is almost no movement of the characteristic points $P_1$ to $P_4$ in the processing of the previous step S33, the process returns.

Next in the copy processor 12 or paste processor 13 shown in FIG. 4, the corrected characteristic points and shape information are used to compute the inverse transform expression or transform expression, as described below.

Figure 18A:
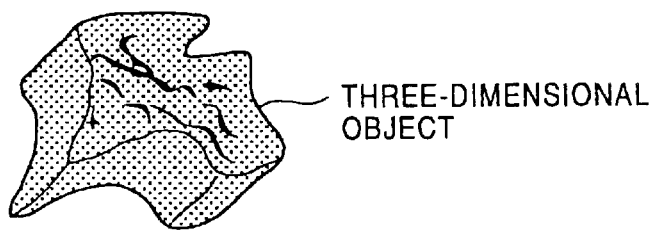
FIGS. 18A, 18B, and 18C are drawings illustrating computation of an inverse transform expression and a right transform expression.
Figure 18B:
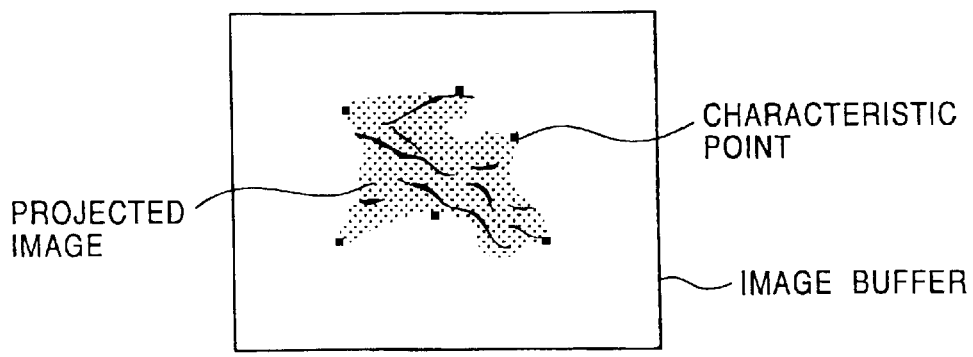

For example, when the camera 9 (FIG. 3) captures the image of a three-dimensional object in three-dimensional space shown in FIG. 18A, a two-dimensional image outputted by the camera 9 displays a projected image (projected picture), as shown in FIG. 18B, which is the three-dimensional object being projected onto a screen. Therefore, a two-dimensional image on which such a projected image is displayed is stored in an image buffer (except for a paste buffer).

Figure 18C:
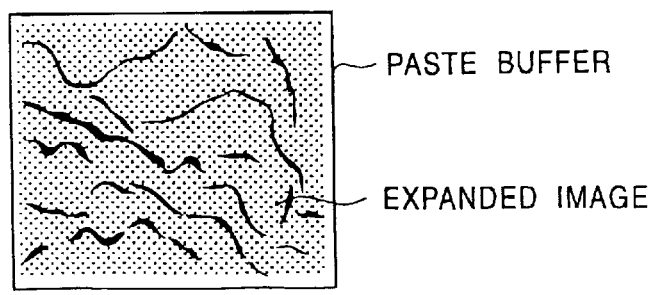

Meanwhile, an expanded image, which is the surface of the three-dimensional object in the three-dimensional space (FIG. 18A) expanded onto a two-dimensional plane, is stored in the paste buffer, as shown in FIG. 18C. Specifically, if the surface of the three-dimensional object is, for example, a plane, a two-dimensional image seeing the plane from the front is stored in the paste buffer. If a plane of the three-dimensional object is a side surface of a cylinder, a two-dimensional image which is the side surface expanded onto a two-dimensional plane as a rectangular shape is stored in the paste buffer. Also if a plane of the three-dimensional object is a sphere, a two-dimensional image which is the sphere expanded onto a two-dimensional plane, using a method such as equidistant cylindrical projection used in cartography or the like, is stored in the paste buffer. If a plane of the three-dimensional object is a three-dimensional curved surface, such as Bezier curved surface expressed by two parameters s and t, a two-dimensional image which is the curved surface expanded onto a two-dimensional plane, using the parameter s and t as a horizontal axis and vertical axis, is stored in the paste buffer. In addition, for example, if the three-dimensional object is a body of revolution, a two-dimensional image which is the body of revolution expanded onto a two-dimensional plane, using the circumference direction or rotation axis as a horizontal axis or vertical axis, is stored in the paste buffer.

In the copying, as shown in FIG. 18B, by designating a few characteristic points on the projected image of (the plane of) the three-dimensional object displayed on the two-dimensional image stored in the buffer of interest (indicated by ■ in FIG. 18B), and shape information of (the plane of) the three-dimensional object, the inverse transform expression is computed. Using the inverse transform expression, the expanded image shown in FIG. 18C is generated from the projected image shown in FIG. 18B, which is stored in the paste buffer. In the pasting, as shown in FIG. 18B, by designating a few characteristic points on a region on which the projected image of (the plane of) the three-dimensional object is pasted (indicated by ■ in FIG. 18B), and shape information (of the plane) of the three-dimensional object, the transform expression is computed. Using the transform expression, the projected image shown in FIG. 18B is generated from the image (expanded image) shown in FIG. 18C, which is pasted on the image buffer.

Therefore, inter-relationship among the three-dimensional object in three-dimensional space, its projected image, and its expanded image becomes important in computing the inverse transform expression and transform expression.

Figure 19:
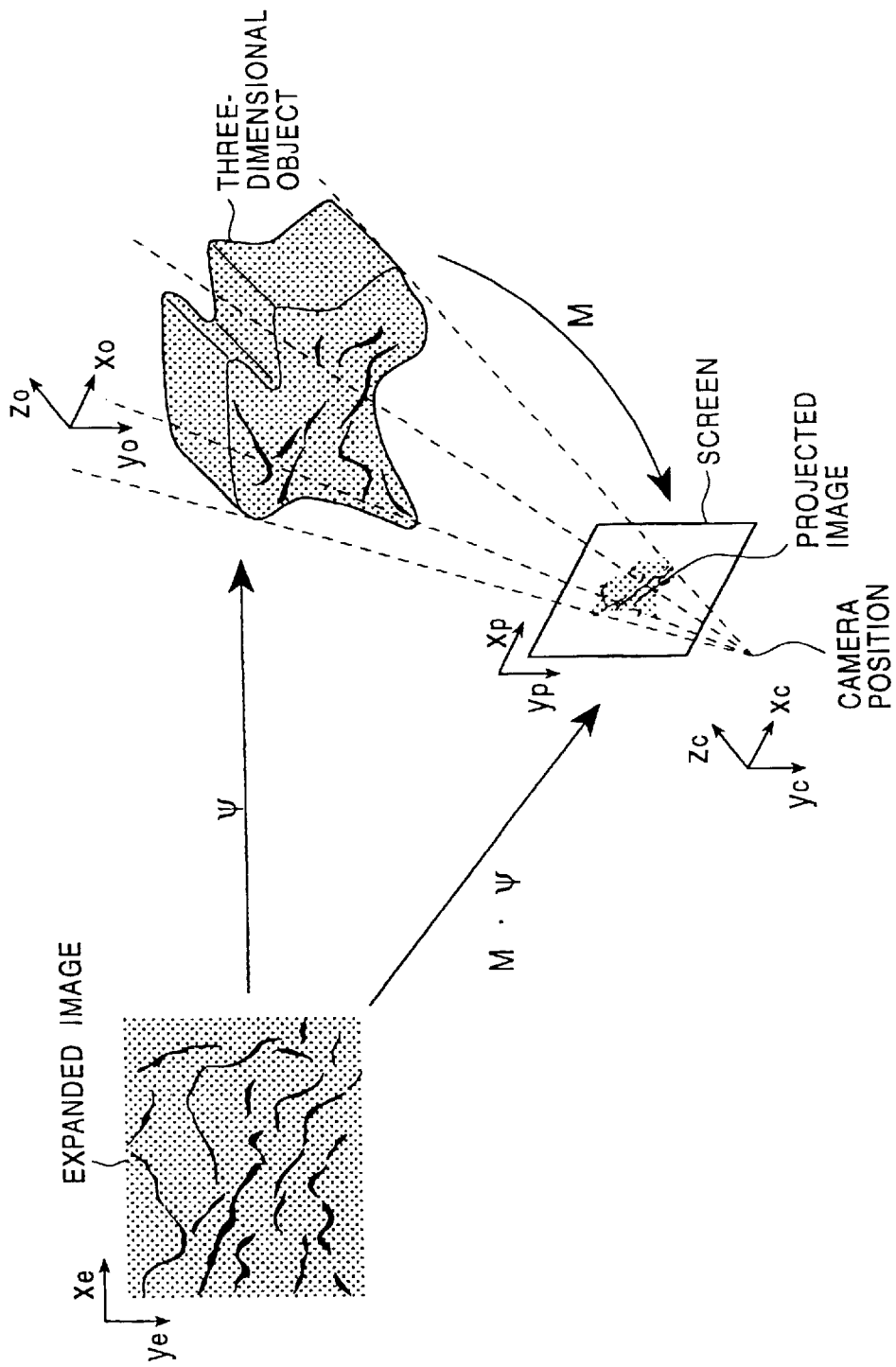
FIG. 19 is a drawing showing the relationship among a three-dimensional object in a three-dimensional space, an expanded image, and a projected image.

Now referring to FIG. 19, a two-dimensional coordinate system for the expanded image, a three-dimensional coordinate system for the three-dimensional object, and a two-dimensional coordinate system for the projected image are considered. The x and y coordinates in the two-dimensional coordinate system for the expanded image are expressed by $x_e$ and $y_e$; the x, y, and z coordinates in the three-dimensional coordinate system for the three-dimensional object are expressed by $x_0$, $y_0$, and $z_0$; and the x and y coordinates in the two-dimensional coordinate system for the projected image are expressed by $x_p$ and $y_p$. Also the pixel level of the projected image at the point $(x_p, y_p)$ is expressed by $B(x_p, y_p)$, and the pixel level of the expanded image at the point $(x_e, y_e)$ is expressed by $C(x_e, y_e)$. Finally the mapping, wherein the expanded image is pasted onto the surface of the three-dimensional object, is expressed by $\psi$, and the mapping, wherein the three-dimensional object is transformed into the projected image, is expressed by M.

Here, the two-dimensional coordinate system for the expanded image, the three-dimensional coordinate system for the three-dimensional object, and the two-dimensional coordinate system for the projected image can be selected in an arbitrary manner. Specifically, the three-dimensional coordinate system for the three-dimensional object, for example, is selected suitably for expressing the three-dimensional object. Taking a concrete example, when the three-dimensional object is a cylinder, let the origin (0, 0) be the center of a circle of either of two bottom surfaces, and a rotation axis (a straight line connecting the centers of circles of two bottom surfaces) be coincident with the $y_0$ axis. When the three-dimensional object is a rectangle, for example, let the origin (0, 0, 0) be the lower left vertex of four vertices of the rectangle, and a horizontal axis or vertical axis be coincident with either the $x_0$ axis or $y_0$ axis.

The point $(x_0, y_0, z_0)$ on the three-dimensional object has a one-to-one correspondence to the point $(x_e, y_e)$ on the expanded image. The relationship between them, namely, the mapping $\psi$ (or $\psi^{-1}$), is obtainable by geometric computation. Accordingly, when the relationship between the point $(x_0, y_0, z_0)$ on the three-dimensional object and the point $(x_e, y_e)$ on the expanded image, namely, the mapping M (or $M^{-1}$), is given, the mapping M which transforms the point $(x_e, y_e)$ on the expanded image into the point $(x_p, y_p)$ can be computed.

Nevertheless, when only the three-dimensional object and the projected image are considered, the mapping M cannot be computed unless it is known which point $(x_0, y_0, z_0)$ on the three-dimensional object is projected onto which point $(x_e, y_e)$ on the projected image. Computing from the projected image on which point $(x_e, y_e)$ the point $(x_0, y_0, z_0)$ on the three-dimensional object is projected basically needs preparation of a plurality of two-dimensional images for using a triangulation principle, as described above. Also expressing a three-dimensional model of the three-dimensional object requires a memory for storing three-dimensional data as temporary data, which sees the point $(x_0, y_0, z_0)$ on the three-dimensional object from a viewpoint (the origin of camera's coordinates as described below), and computation for working with such three-dimensional data.

Therefore, the mapping $\psi$ is obtained here based on the shape information inputted by the user, and the mapping M is obtained based on the characteristic points inputted by the user. Also the relationship between the expanded image and the projected image, namely, the mapping $M\psi$ which transforms the expanded image into the projected image, is obtained. The mapping $M\psi$ is a transform expression, and the mapping which performs the inverse of the transformation corresponding to the mapping $M\psi$, i.e., $(M\psi)^{-1}$, is an inverse transform expression. Hence, the inverse transform expression is obtainable by computing the inverse matrix of the mapping $M\psi$, using, for example, the Gaussian elimination method.

Since the inverse transform expression $(M\psi)^{-1}$ is easily obtained once the transform expression $M\psi$ is computed, the computation of the transform expression is described hereunder.

As described above, the point $(x_0, y_0, z_0)$ on the three-dimensional object has a one-to-one correspondence to the point $(x_e, y_e)$ on the expanded image. Accordingly, the point $(x_0, y_0, z_0)$ is expressed in an expression (7) using the mapping $\psi$ and the point $(x_e, y_e)$ as:

$$\begin{pmatrix} x_o \\ y_o \\ z_o \end{pmatrix} = \psi(x_e, y_e) = \begin{pmatrix} \psi_1(x_e, y_e) \\ \psi_2(x_e, y_e) \\ \psi_3(x_e, y_e) \end{pmatrix} \qquad (7)$$

When the camera 9 captures the image of the three-dimensional object in the three-dimensional space to output the projected image, three-dimensional coordinates for expressing the position of the camera 9 $(x_c, y_c, z_c)$ (hereinafter referred to as camera's coordinates) may be given. The camera's coordinates $(x_c, y_c, z_c)$ of the point $(x_0, y_0, z_0)$ are expressed in the following expression using nine elements $r_{11}$, $r_{12}$, $r_{13}$, $r_{21}$, $r_{22}$, $r_{23}$, $r_{31}$, $r_{32}$, and $r_{33}$ for representing a rotation in the three-dimensional space, and three elements $t_1$, $t_2$, and $t_3$ for representing a translation as:

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x_o \\ y_o \\ z_o \end{pmatrix} + \begin{pmatrix} t_1 \\ t_2 \\ t_3 \end{pmatrix} \qquad (8)$$

The point $(x_p, y_p)$ on the projected image is the point $(x_c, y_c, z_c)$ on the three-dimensional object in the camera's coordinates projected onto the screen. The transformation is perspective transformation (projection transformation) as described in Document 1. Therefore it can be expressed by a rational formula, wherein both denominator and numerator are a linear expression of one of the x-coordinate, y-coordinate, and z-coordinate (a linear term and constant term of one of x, y, and z). Specifically, letting w be an arbitrary number expressing a homogeneous coordinate, the point $(x_p, y_p)$ of the projected image on the screen is expressed in an expression (9) using the homogeneous coordinate as:

$$\begin{pmatrix} wx_p \\ wy_p \\ w \end{pmatrix} = \begin{pmatrix} f_h & 0 & 0 \\ 0 & f_v & 0 \\ 0 & 0 & 1 \end{pmatrix} \begin{pmatrix} x_c \\ y_c \\ z_c \end{pmatrix} \quad (9)$$

Let f be a focal distance of the camera 9, and h and v be a horizontal length and vertical length, respectively, of one pixel of the screen in the camera's coordinate system. Then, $f_h$ and $f_v$ in the expression (9) represent f×h and f×v, respectively.

It is clear from the expression (9) that the value in which the x-coordinate $wx_p$ or y-coordinate $wy_p$ of the homogeneous coordinate divided by the z-coordinate w is the x-coordinate $x_p$ or y-coordinate $y_p$ of the projected image.

From the expressions (7) to (9), an expression (10) is derived as:

$$\begin{pmatrix} w_1 x_{p1} & w_2 x_{p2} & w_3 x_{p3} & w_4 x_{p4} \\ w_1 y_{p1} & w_2 y_{p2} & w_3 y_{p3} & w_4 y_{p4} \\ w_1 & w_2 & w_3 & w_4 \end{pmatrix} = \quad (10)$$

$$M \begin{pmatrix} \psi_1(0,0) & \psi_1(L_W,0) & \psi_1(L_W,L_H) & \psi_1(0,L_H) \\ \psi_2(0,0) & \psi_2(L_W,0) & \psi_2(L_W,L_H) & \psi_2(0,L_H) \\ 1 & 1 & 1 & 1 \end{pmatrix} =$$

$$M \begin{pmatrix} 0 & L_W & L_W & 0 \\ 0 & 0 & L_H & L_H \\ 1 & 1 & 1 & 1 \end{pmatrix}$$

In the expression (10), as is evident from FIG. 19, M is a matrix which transforms $\psi(x_e, y_e)$, i.e., $(x_0, y_0, z_0)$ into $(x_p, y_p)$, which can be expressed in the following expression as:

$$M = \begin{pmatrix} m_{11} & m_{12} & m_{13} & m_{14} \\ m_{21} & m_{22} & m_{23} & m_{24} \\ m_{31} & m_{32} & m_{33} & 1 \end{pmatrix} = \begin{pmatrix} r_{11}f_h/t_3 & r_{12}f_h/t_3 & r_{13}f_h/t_3 & t_1f_h/t_3 \\ r_{21}f_v/t_3 & r_{22}f_v/t_3 & r_{23}f_v/t_3 & t_2f_v/t_3 \\ r_{31}/t_3 & r_{32}/t_3 & r_{33}/t_3 & 1 \end{pmatrix}$$

$\psi(\psi_1, \psi_2, \psi_3)$ in the expression (10) is obtainable by geometric computation based on the shape information inputted by the user. The matrix M in the expression (10) is also computable based on the characteristic points inputted by the user. The matrix M generally has $m_{11}, m_{12}, m_{13}, m_{14}, m_{21}, m_{22}, m_{23}, m_{24}, m_{31}, m_{32},$ and $m_{33}$ as unknowns, as shown in the expression (11). Accordingly, when a total of six points on the projected image, i.e., five points with 2-degrees of freedom and a point with 1-degree of freedom, are designated as characteristic points, $m_{11}$ to $m_{14}$, $m_{21}$ to $m_{24}$, and $m_{31}$ to $m_{33}$ are computable. When more than six points are designated, eleven elements of $m_{11}$ to $m_{14}$, $m_{21}$ to $m_{24}$, and $m_{31}$ to $m_{33}$ can be computed using, for example, the least squares method.

As described above, the matrix M is computed here based on the characteristic points inputted by the user. Therefore it is not necessary to work with the three-dimensional data of the three-dimensional object in the camera's coordinates, nor computation using the three-dimensional data. It is also unnecessary to use a plurality of two-dimensional images of the same three-dimensional object shot from a plurality of positions. The matrix M is computable using a two-dimensional image of the three-dimensional object shot from one position. As a result, the mapping $M\psi$ (and $(M\psi)^{-1}$) can be obtained without computation using the three-dimensional data in the camera's coordinates, and without using a plurality of two-dimensional images.

Next, computation of $\psi$ and M for three-dimensional objects having primitive shapes is described below.

If the three-dimensional object is, for example, a rectangular parallelepiped, $\psi$ in the expression (7), that is, the relationship between a point $(x_0, y_0, z_0)$ on a plane (rectangle) of the rectangular parallelepiped in three-dimensional space and a point $(x_e, y_e)$ of an expanded image can be given, for example, as follows.

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} x_e \\ y_e \\ 0 \end{pmatrix} \quad (12)$$

where, as the two dimensional coordinates of a projected image (hereinafter referred to as "screen coordinates"), the coordinates of a plane with $z_0=0$ in the three-dimensional coordinate system on the three-dimensional object (hereinafter referred to as "three-dimensional coordinates"), where each x coordinate of the screen coordinates is equal to each x coordinate of the three-dimensional coordinates, and each y coordinate of the screen coordinates is equal to each y coordinate of the three-dimensional coordinates $(x_e=x_0, y_e=y_0)$, that is, the coordinates of the x-y plane in the three-dimensional coordinates are used. Further, as a three-dimensional coordinate system, the coordinates, where one of the vertices of a plane of the rectangular parallelepiped corresponds to the origin and the plane is included in the x-y plane, are used.

Since $z_0=0$ by the expression (12), the need for the elements $m_{13}, m_{23}, m_{33}$ of the third row of the matrix M of the expression (11) is eliminated. In this case, the expression (10) can be given as follows:

$$\begin{pmatrix} wx_p \\ wy_p \\ w \end{pmatrix} = M \begin{pmatrix} x_e \\ y_e \\ 0 \\ 1 \end{pmatrix} = \begin{pmatrix} m_{11} & m_{12} & m_{14} \\ m_{21} & m_{22} & m_{24} \\ m_{31} & m_{32} & 1 \end{pmatrix} \begin{pmatrix} x_e \\ y_e \\ 1 \end{pmatrix} \quad (13)$$

Therefore, since the number of the elements of the matrix M to be computed is the eight elements $m_{11}, m_{12}, m_{14}, m_{21}, m_{22}, m_{24}, m_{31},$ and $m_{32}$, these eight elements can be found by designating, as characteristic points, four points on the projected image corresponding to four points on the expanded image (given the information of eight coordinates in total, that is, $t_p$ and $y_p$ of four characteristic points).

Figure 20A:
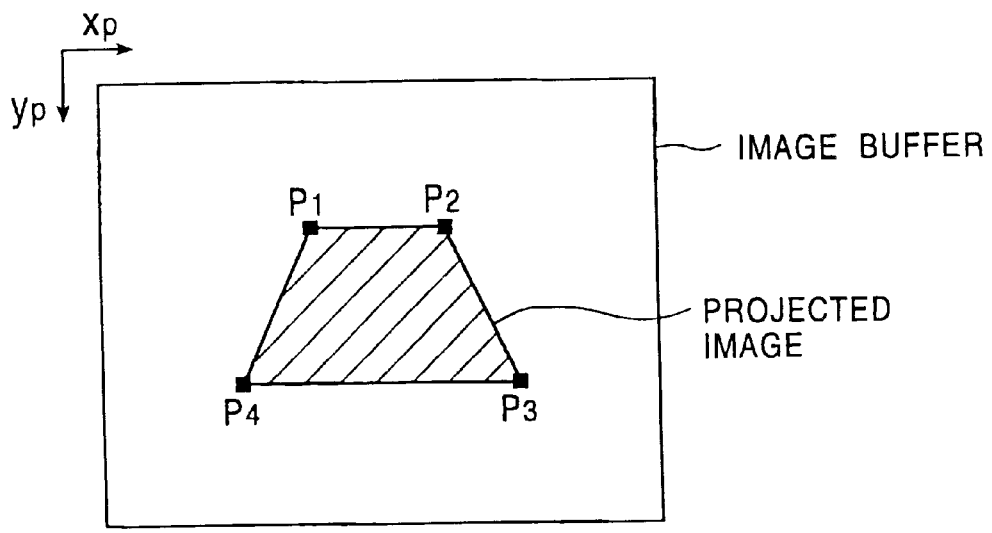
FIGS. 20A and 20B are drawings illustrating computation of an inverse transform expression and a right transform expression in the case where a three-dimensional object is a parallelepiped.
Figure 20B:
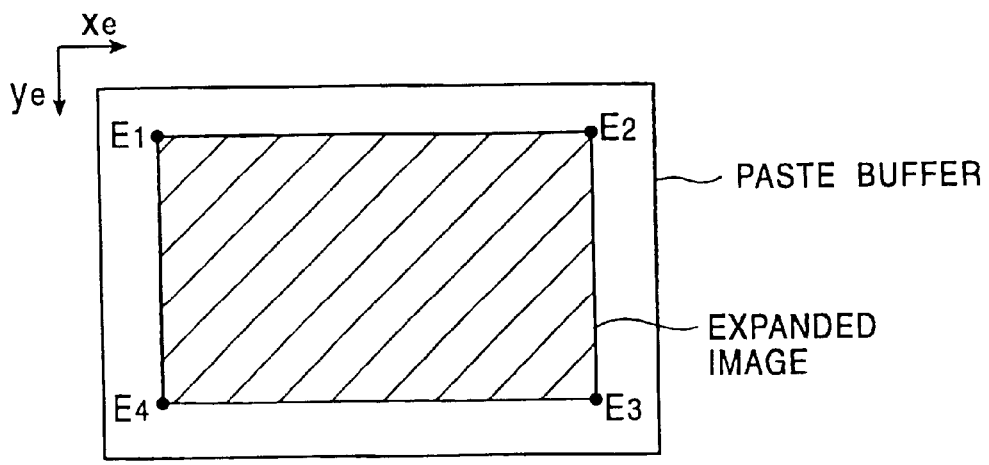

When the three-dimensional object is a rectangular parallelepiped, the projected image of the plane (rectangle) is a quadrangle such as shown in FIG. 20A. Here, suppose that the four vertices of the projected image of the quadrangle are designated as characteristic points by a user. Let the vertices of the projected image of the quadrangle be vertices $P_1, P_2, P_3,$ and $P_4$ clockwise from the top-left vertex, such as shown in FIG. 20A, while letting the vertices of a rectangular expanded image stored in a paste buffer be vertices $E_1, E_2, E_3$ and $E_4$ clockwise from the top-left vertex, such as shown in FIG. 20B so that $P_1, P_2, P_3,$ and $P_4$ correspond to $E_1, E_2, E_3$ and $E_4$, respectively.

Moreover, let the coordinates of points $E_1, E_2, E_3$ and $E_4$ of the two dimensional coordinates of the expanded image (hereinafter referred to as "paste-buffer coordinates") be (0, 0), ($L_W$, 0), ($L_W$, $L_H$), and (0, $L_H$), respectively, where $L_W$ indicates the width of the rectangular expanded image and $L_H$ indicates the height of the rectangular expanded image. The user can input any desired values to those lengths as far as the memory sizes of the paste buffer can hold. Other than the user setting the desired values of $L_W$ and $L_H$, it is also possible that the size of the expanded image is set to a predetermined proportion, for example, 80 percent, of the size (area) of the paste buffer.

By letting the screen coordinates of the points $P_1$, $P_2$, $P_3$, and $P_4$, as characteristic points designated by the user, be ($X_{p1}$, $Y_{p1}$), ($X_{p2}$, $Y_{p2}$), ($X_{p3}$, $Y_{p3}$), and ($X_{p4}$, $Y_{p4}$), respectively, the next expression (14) is obtained from the expression (10).

$$\begin{pmatrix} w_1 x_{p1} & w_2 x_{p2} & w_3 x_{p3} & w_4 x_{p4} \\ w_1 y_{p1} & w_2 y_{p2} & w_3 y_{p3} & w_4 y_{p4} \\ w_1 & w_2 & w_3 & w_4 \end{pmatrix} = M \begin{pmatrix} 0 & L_w & L_w & 0 \\ 0 & 0 & L_H & L_H \\ 1 & 1 & 1 & 1 \end{pmatrix} \quad (14)$$

where $w_1$, $w_2$, $w_3$, and $w_4$ of the expression (14) are arbitrary numbers indicating homogeneous coordinates.

The matrix M of the expression (14) leads the eight elements $m_{11}$, $m_{12}$, $m_{14}$, $m_{21}$, $m_{22}$, $m_{24}$, $m_{31}$, and $m_{32}$ of the expression (13) to be unknowns. Since eight equations can be derived based on the expression (14), the eight unknowns $m_{11}$, $m_{21}$, $m_{14}$, $m_{21}$, $m_{22}$, $m_{24}$, $m_{31}$, and $m_{32}$, that is, the matrix M, can be solved. Incidentally the characteristic points designated by the user and automatically corrected as described above are basically used as the characteristic points for solving the matrix M.

When the three-dimensional object is a rectangular parallelepiped and then either a copying or a pasting is performed on the plane (rectangle), $\psi$ is computed by the expression (12), along with M by the expression (14). The mapping $M\psi$ is directly used as a right transform expression in case of the pasting. For the copying, the mapping obtained by computing the inverse matrix of the mapping $M\psi$ is used as an inverse transform expression. Irrespective of the case where the three-dimensional object is a rectangular parallelepiped, the expression used in the pasting is called the "right transform expression" because the mapping $M\psi$ is directly used, while the expression used in the copying is called the "inverse transform expression" because the inverse mapping of the mapping $M\psi$ is used.

When the copying is performed, in the image transform processor 20, the pixels within the region of the quadrangle $P_1P_2P_3P_4$ as the projected image in the buffer of interest, as shown in FIG. 20A, are written into, in accordance with the inverse transform expression $(M\psi)^{-1}$, the corresponding positions of the quadrangle in the rectangle $E_1E_2E_3E_4$ of the paste buffer, as shown in FIG. 20B.

If one pixel in the buffer of interest corresponds to a plurality of pixels in the paste buffer, the level of the one pixel may be written into all the pixels in the paste buffer. Interpolated values obtained by performing interpolation on the pixels in the buffer of interest may be written into the paste buffer. For example, if a pixel A of the buffer of interest corresponds to two adjacent pixels $a_1$ and $a_2$ of the paste buffer, the level of the pixel A may be written into the pixel $a_1$, and the mean value of the levels of the pixel A and its adjacent pixel in the buffer of interest may be written into the pixel $a_2$.

On the contrary, if a plurality of pixels of the buffer of interest correspond to a single pixel of the paste buffer, for example, the level of any one of the pixels may be written into the paste buffer, or weighted addition value obtained by filtering the pixels may be written into the paste buffer.

The writing of the pixel levels into the paste buffer may be performed by computing the location of a pixel of the paste buffer transformed from a pixel of the projected image in the buffer of interest in accordance with the inverse transform $(M\psi)^{-1}$ as described above, or computing the location of a pixel (of the projected image) transforming into a pixel of the expanded image.

When the pasting is performed, in the image transform processor 20, the pixels within the region of the rectangle $E_1E_2E_3E_4$ as the expanded image (shown in FIG. 20B) in the paste buffer are written into, in accordance with the right transform expression $M\psi$, the corresponding positions in the quadrangle $P_1P_2P_3P_4$ of the projected image (shown in FIG. 20A, in the buffer of interest, whereby the projected image is pasted onto the two dimensional image stored in the buffer of interest.

If one pixel in the paste buffer corresponds to a plurality of pixels in the buffer of interest, the level of one pixel may be written into all the pixels in the buffer of interest, similarly to the copying as described above. Also, interpolated data obtained by performing interpolation on a plurality of pixels in the paste buffer may be written into the plurality of pixels in the buffer of interest.

On the contrary, if a plurality of pixels in the paste buffer corresponds to a single pixel in the buffer of interest, for example, the level of any one of the pixels may be written into the buffer of interest, or weighted addition value obtained by filtering the plurality of pixels may be written into the buffer of interest.

The writing of pixel levels into the buffer of interest may be performed by computing the location of a pixel in the buffer of interest transformed from a pixel of the projected image in the paste buffer in accordance with the right transform $M\psi$ as described above, or computing the location of a pixel (of the expanded image) transforming into each pixel of the projected image.

Next, if the three-dimensional object is, for example, a cylinder, when the copying for creating and storing an expanded image of its side into the paste buffer, or the pasting for pasting the image stored in the paste buffer onto its side is performed, the inverse transform expression or the right transform expression is respectively computed as follows.

Figure 21A:
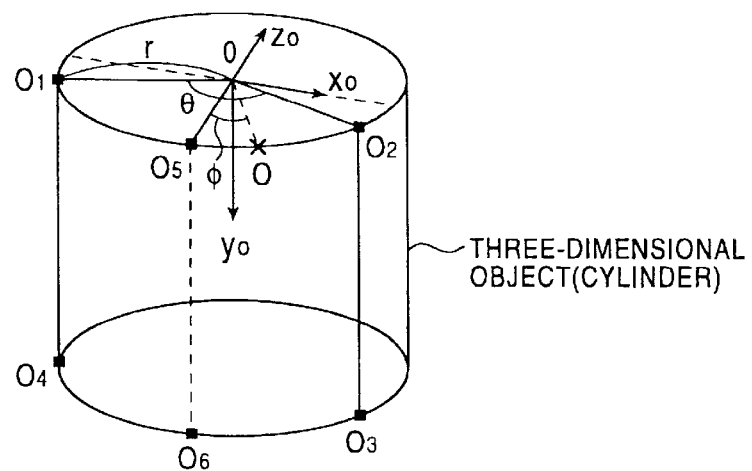
FIGS. 21A, 21B, and 21C are drawings illustrating computation of an inverse transform expression and a right transform expression in the case where a three-dimensional object is a cylinder.

A three-dimensional coordinate system for representing the location of the cylinder in a three-dimensional space is assumed as shown in FIG. 21A. In the three-dimensional coordinate system, the center of either base (circle), for example, the upper base is used as the origin (0, 0, 0), and the direction from the upper base to the lower base and the direction from $O_5$ (described below) to the center of the upper base are respectively used as the $y_0$ axis and the $z_0$ axis. A direction in which a right hand screw advances when being turned from the $y_0$ axis to the $z_0$ axis is used as the $x_0$ axis.

It is assumed that a projected image, obtained by capturing the image of the cylinder in FIG. 21A from an upper front position with respect to a point $O_5$, is displayed in the two dimensional image in the buffer of interest. The projected image of the cylinder is displayed as, for example, the shaded part in FIG. 21B.

Figure 21B:
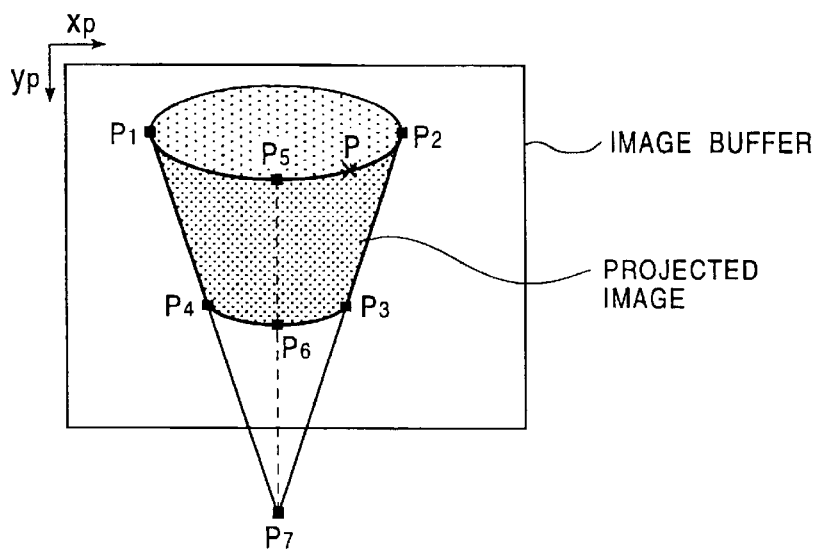

In FIG. 21B, points $P_1$ and $P_2$ or points $P_3$ and $P_4$ indicate the endpoints of the intersections (which are shown as the bold lines in FIG. 21B) where the side of the cylinder on the projected image intersects its upper base or its lower base. Specifically, the point $P_1$ indicates an intersecting point where the left of a contour line of the side of the cylinder in the projected image intersects its upper base. The point $P_2$ indicates an intersecting point where the right of the contour line of the projected image intersects the upper base. The point $P_3$ indicates an intersecting point where the right of the contour line of the projected image intersects the lower base. The point $P_4$ indicates an intersecting point where the left of the contour line of the projected image intersects the lower base.

Points $O_1$, $O_2$, $O_3$, and $O_4$ in FIG. 21A correspond to points $P_1$, $P_2$, $P_3$, and $P_4$ in FIG. 21B, respectively.

The point $O_5$ in FIG. 21A bisects an arc $O_1O_2$ (viewed as a projected image) where the point $O_5$ corresponds to the point $P_5$ in FIG. 21B. Also, a point $O_6$ in FIG. 21A bisects an arc $O_3O_4$ (viewed as a projected image). The point $O_6$ corresponds to the point $P_6$ in FIG. 21B.

As described above, since the z axis is directed from the point $O_5$ to the center of the upper base, and it also goes through the origin at the center of the upper base, the point $O_5$ is included in the $y_0$-$z_0$ plane with $x_0=0$. Therefore the point $O_6$ is included in the $y_0$-$z_0$ plane as well.

In FIG. 21B, a point $P_7$ is a vanishing point on the cylinder, which is a point where lines $P_1P_4$ and $P_2P_3$ meet. Thus, the point $P_6$ is on a straight line between points $P_5$ and $P_7$. Accordingly, the point $P_6$ has one degree of freedom of the point $P_6$ in the direction of a line $P_5P_7$.

An angle $\theta$ (radian) in FIG. 21A is formed between the point $O_1$ as the center (the origin of the three-dimensional coordinates) of the upper base and the point $O_2$ (thus, the angle $\theta$ is also formed between the point $O_3$ as the center of the lower base and the point $O_4$). Here, let "r" be the radius of the base of the cylinder. If the expanded image corresponding to the projected image of the side of the cylinder is stored in the paste buffer, the relationship between the radius r and the angle $\theta$ is given as the following expression (assuming that the circumferential direction of the base of the cylinder corresponds to the horizontal direction of the expanded image for example).

$$r = L_w/\theta \quad (15)$$

where $L_w$ indicates the width (horizontal length) of the expanded image as described above.

Let the angle $\phi$ be as follows $$\phi = \theta(x_e - L_w/2)/L_w \quad (16)$$

where $x_e$ indicates an x coordinate (horizontal coordinate) of the paste buffer coordinate system. It is hereinafter assumed that the top-left vertex of a rectangular expanded image is used as the origin of the coordinates, and the direction from the top to the base, and the direction from the left to the right are respectively used as the $x_e$ axis and the $y_e$ axis.

If the angle $\phi$ is expressed as the expression (16) regarding the cylinder, $\psi$ of the expression (7), that is, the relationship between the point $(x_0, y_0, z_0)$ of its side of three-dimensional space and the point $(x_e, y_e)$ of the expanded image is expressed by the following expression, based on consideration of the expanded image of the cylinder in FIG. 21A.

$$\begin{pmatrix} x_0 \\ y_0 \\ z_0 \end{pmatrix} = \begin{pmatrix} \psi_1(x_e, y_e) \\ \psi_2(x_e, y_e) \\ \psi_3(x_e, y_e) \end{pmatrix} = \begin{pmatrix} r\sin\phi \\ y_e \\ -r\cos\phi \end{pmatrix} \quad (17)$$

Unlike the case described with reference to FIGS. 20A and 20B, there is no unnecessary element of the matrix M. Thus, eleven elements $m_{11}$ to $m_{14}$, $m_{21}$ to $m_{24}$, and $m_{31}$ to $M_{33}$ in the expression (11) must be found. The eleven elements can be computed as described above by designating, as characteristic points, a total of six points (of the projected image) consisting for five predetermined points and a point having one degree of freedom.

Figure 21C:
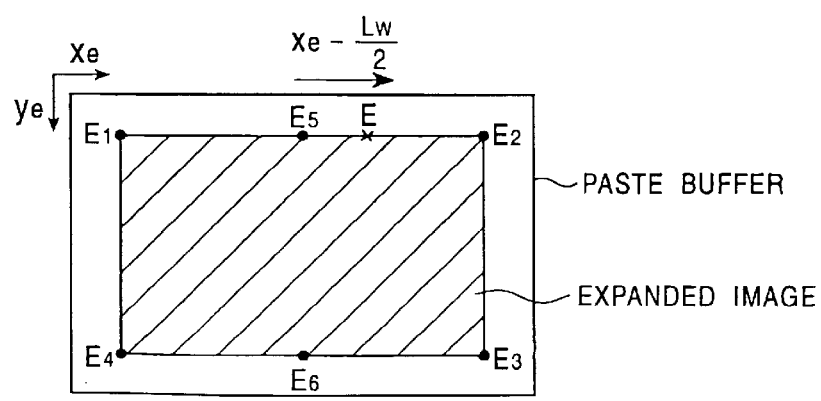

Accordingly, it is assumed that the user designates as characteristic points six points $P_1$ to $P_6$ shown in FIG. 21B. Then, let the vertices of a rectangular expanded image stored in a paste-buffer be vertices $E_1$, $E_2$, $E_3$, and $E_4$, clockwise from the top-left vertex, as shown in FIG. 21C, and let the midpoints of lines $E_1E_2$ and $E_3E_4$ be points $E_5$ and $E_6$ so that the points $P_1$, $P_2$, $P_3$, $P_4$, $P_5$, and $P_6$ correspond to the points $E_1$, $E_2$, $E_3$, $E_4$, $E_5$, and $E_6$, respectively.

In addition, let the coordinates of the points $E_1$, $E_2$, $E_3$, $E_4$, $E_5$, and $E_6$ (in the paste buffer coordinate system) be $(0, 0)$, $(L_W, 0)$, $(L_W, L_H)$, $(0, L_H)$, $(L_W/2, 0)$ and $(L_W/2, L_H)$, respectively.

By establishing and solving equations for the eleven elements $m_{11}$ to $m_{14}$, $m_{21}$ to $m_{24}$ and $m_{31}$ to $m_{33}$ in accordance with the expression (10) using the relationships described above, these eleven elements, that is, the matrix M can be found.

In this case, the characteristic points $P_1$ through $P_6$ for computing the matrix M are automatically corrected. Either characteristic point $P_5$ or $P_6$ is further automatically corrected so as to be positioned on a straight line between the other auto-corrected characteristic point and the vanishing point $P_7$. For example, among the characteristic points $P_5$ and $P_6$, one point $P_6$ is automatically corrected, and is further automatically corrected so as to be positioned on the same straight line between the other automatically corrected characteristic point $P_5$ and the vanishing point $P_7$. This is because the characteristic point $P_6$ is one degree of freedom, as described above.

If the height of the cylinder in FIG. 21A is equal to the height $L_H$ of the expanded image in FIG. 21C, the coordinates of the points $O_1$, $O_2$, $O_3$, $O_4$, $O_5$ and $O_6$ are $(-r\sin(\theta/2), 0, -r\cos(\theta/2))$, $(r\sin(\theta/2), 0, -r\cos(\theta/2))$, $(r\sin(\theta/2), L_H, -r\cos(\theta/2))$, $(-r\sin(\theta/2), L_H, -r\cos(\theta/2))$, $(0, 0, -r)$ and $(0, L_H, -r)$, respectively.

Figure 22:
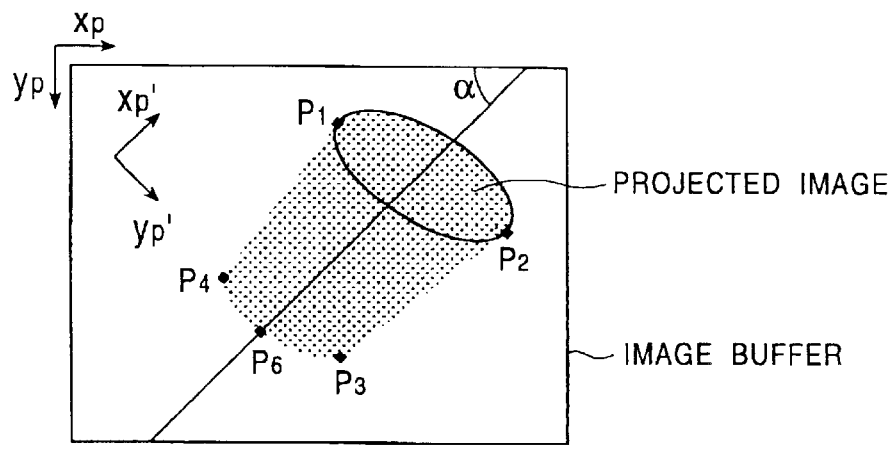
FIG. 22 is a drawing illustrating computation of an inverse transform expression and a right transform expression in the case where a three-dimensional object is a cylinder.

The matrix M found regarding the cylinder, as described above, is a function of the angle $\theta$ in FIG. 21A. Thus, the angle $\theta$ must be found. The two dimensional image displays the projected image of the cylinder in which the straight line connecting the characteristic point $P_5$ and the vanishing point $P_7$ in parallel to the axis $y_p$ in FIG. 21B, but in general, the projected image of the cylinder is likely to be formed as shown in FIG. 22 so that the straight line connecting the characteristic point $P_5$ and the vanishing point $P_7$ is inclined with the axis $y_p$.

Accordingly, when an angle $\alpha$ is formed between the straight line connecting the characteristic point $P_5$ and the vanishing point $P_7$ and the axis $x_p$, a method for finding the angle is described below.

From consideration of the $x_p'$ axis and the $y_p'$ axis obtained by counterclockwise rotating the $x_p$ axis and the $y_p$ axis of the screen coordinate system by the angle $\alpha$, the relationship between these axes and the projected image of the cylinder corresponds to that shown in FIG. 21B. Hence, by assuming a coordinate system defined by the $x_p'$ axis and the $y_p'$ axis obtained by counterclockwise rotating the $x_p$ axis and the yp axis by the angle $\alpha$, the angle $\theta$ is found.

In this case, the relationship between the point $(x_p, y_p)$ and the point $(x_p', y_p')$ can be expressed by the following expression, using homogeneous coordinates.

$$\begin{pmatrix} wx'_p \\ wy'_p \\ w \end{pmatrix} = \begin{pmatrix} \cos\alpha & -\sin\alpha & 0 \\ \sin\alpha & \cos\alpha & 0 \\ 0 & 0 & 1 \end{pmatrix} \begin{pmatrix} wx_p \\ wy_p \\ w \end{pmatrix} \quad (18)$$

The matrix M' be defined by, for example, the following expression.

$$M' = \begin{pmatrix} \cos\alpha & -\sin\alpha & 0 \\ \sin\alpha & \cos\alpha & 0 \\ 0 & 0 & 1 \end{pmatrix} M = \begin{pmatrix} m'_{11} & m'_{12} & m'_{13} & m'_{14} \\ m'_{21} & m'_{22} & m'_{23} & m'_{24} \\ m'_{31} & m'_{32} & m'_{33} & 1 \end{pmatrix} \quad (19)$$

where the matrix M of the expression (19) is given in the expression (11).

Based on the expression (10), and the expressions (15) to (19), the next expressions (20) are derived.

$x_p' = (m_{11}'r \sin\phi + m_{12}'y_e - m_{13}'r \cos\phi + m_{14}')/(m_{31}'r \sin\phi + m_{32}'y_e - m_{33}'r \cos\phi + 1)$ $y_p' = (m_{21}'r \sin\phi + m_{22}'y_e - m_{23}'r \cos\phi + m_{24}')/(m_{31}'r \sin\phi + m_{32}'y_e - m_{33}'r \cos\phi + 1)$ (20)

In other words, regarding the cylinder shown in FIG. 21A as the three-dimensional object, let a point O be on an arc $O_1O_5O_2$ displayed as the projected image, then the point O is projected onto a point P on an arc $P_1P_5P_2$ on the projected image in FIG. 21B. If the point P corresponds to the point E in the paste buffer coordinate system as shown in FIG. 21C, the x coordinate corresponding to the point E can be expressed as $x_e - L_w/2$ with respect to $E_5$ as a reference.

The points $E_5$ and E in the paste buffer coordinate system in FIG. 21C correspond to the points $O_5$ and O of the cylinder in the three-dimensional space in FIG. 21A. Thus, the $x_e$ coordinate $x_e - L_w/2$ (with respect to the position as a reference for the point E) corresponds to the position of the point O on the circumference of the upper base of the cylinder in FIG. 21A.

That is, $\phi$ defined in the expression (16) above indicates the angle formed by the point $O_5$, the origin and the point O, and $x_p'$ and $y_p'$ of the expression (20) indicate the coordinates of the point P corresponding to the point O in the projected image.

Figure 23:
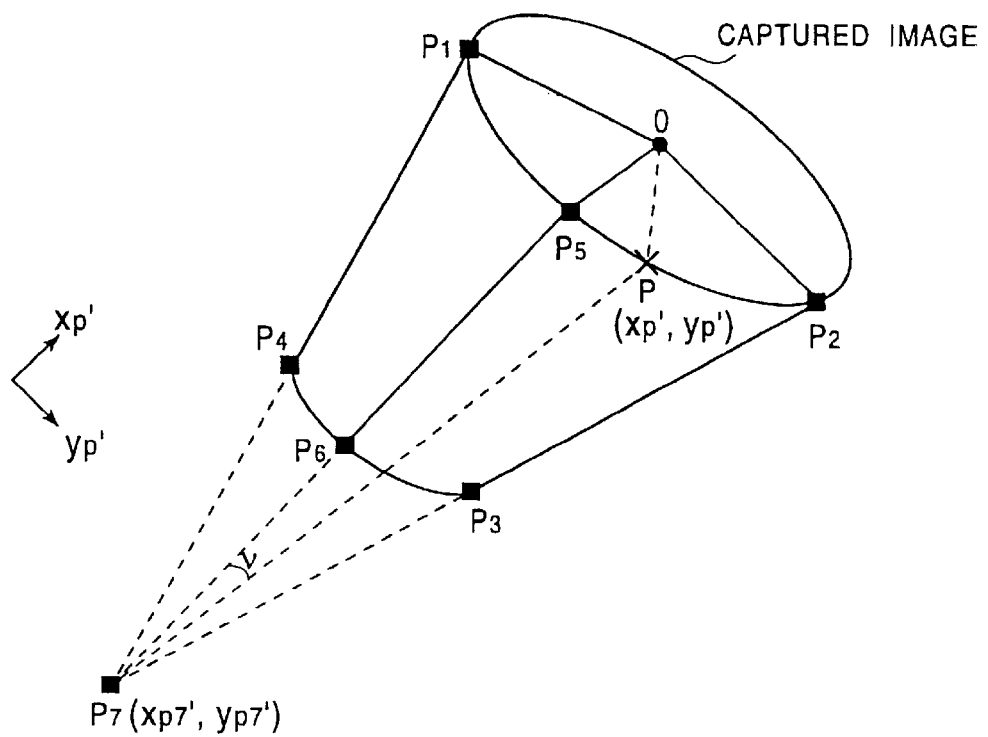
FIG. 23 is a drawing illustrating angle v.

Moving the point O with respect to $O_5$ as a reference along the circumference of the upper base of the cylinder, that is, varying the value of the angle $\phi$ from 0 radian causes the point P corresponding to the position O in the projected image to move along an arc $P_5P_2$ or an arc $P_5P_1$ with respect to the point $P_5$ as a reference. An angle formed by the point P, the vanishing point $P_7$, and the point $P_5$ is represented by $v$ as shown in FIG. 23.

The coordinates of the point P are given by $(x_p', y_p')$, found by the expression (20). Therefore, the angle $v$ can be found by the following expression when the coordinates of the point $P_7$ are represented as $(x_{p7}', y_{p7}')$ as shown in FIG. 23.

$v = \tan^{-1}(|y_p' - y_{p7}'|/|x_p' - x_{p7}'|)$ (21)

The angle $v$ is a function of the angle $\phi$ because as the point P moves, that is, the angle $\phi$ varies, the angle $v$ varies. In FIG. 23, assuming that the direction of right-handed rotation with respect to the line $P_5P_7$ as a reference line is the positive direction of the angle $v$, the angle $v$ is maximum when the point P corresponds to the point $P_2$, while the angle $v$ is minimum when the point P corresponds to the point $P_1$.

The point P corresponds to either the point $P_1$ or $P_2$ when the expression $|\phi|=\theta/2$ holds (the point P corresponds to the point $P_1$ when $\phi=-\theta/2$, while the point P corresponds to the point $P_2$ when $\phi=\theta/2$). Thus, the angle $v$ takes its extremes when the expression $|\phi|=\theta/2$ holds.

Accordingly, let a value obtained by partially differentiating the angle $v$ of the expression (21) using $\phi$, be 0, as follows:

$$\frac{\partial v}{\partial \phi} = 0 \quad (22)$$

The expression (22) holds when $|\phi|=\theta/2$ where $\theta$ is the angle to be found ($=2\phi$) (an angle formed by the point $O_1$, the center of the upper base of the cylinder, and the point $O_2$ where the points $P_1$ and $P_2$ correspond to the points $O_1$ and $O_2$ in FIG. 21).

Since the left-hand side of the expression (22), obtained by partially differentiating $v$ of the expression (22) using $\phi$, is a function which has two variables $\phi$ and $\theta$, computation of $\phi$ and $\theta$ satisfying the expression (22) becomes complicated. Therefore, the angle $\theta$ satisfying the expression (22) is found by using approximate calculation.

Figure 24:
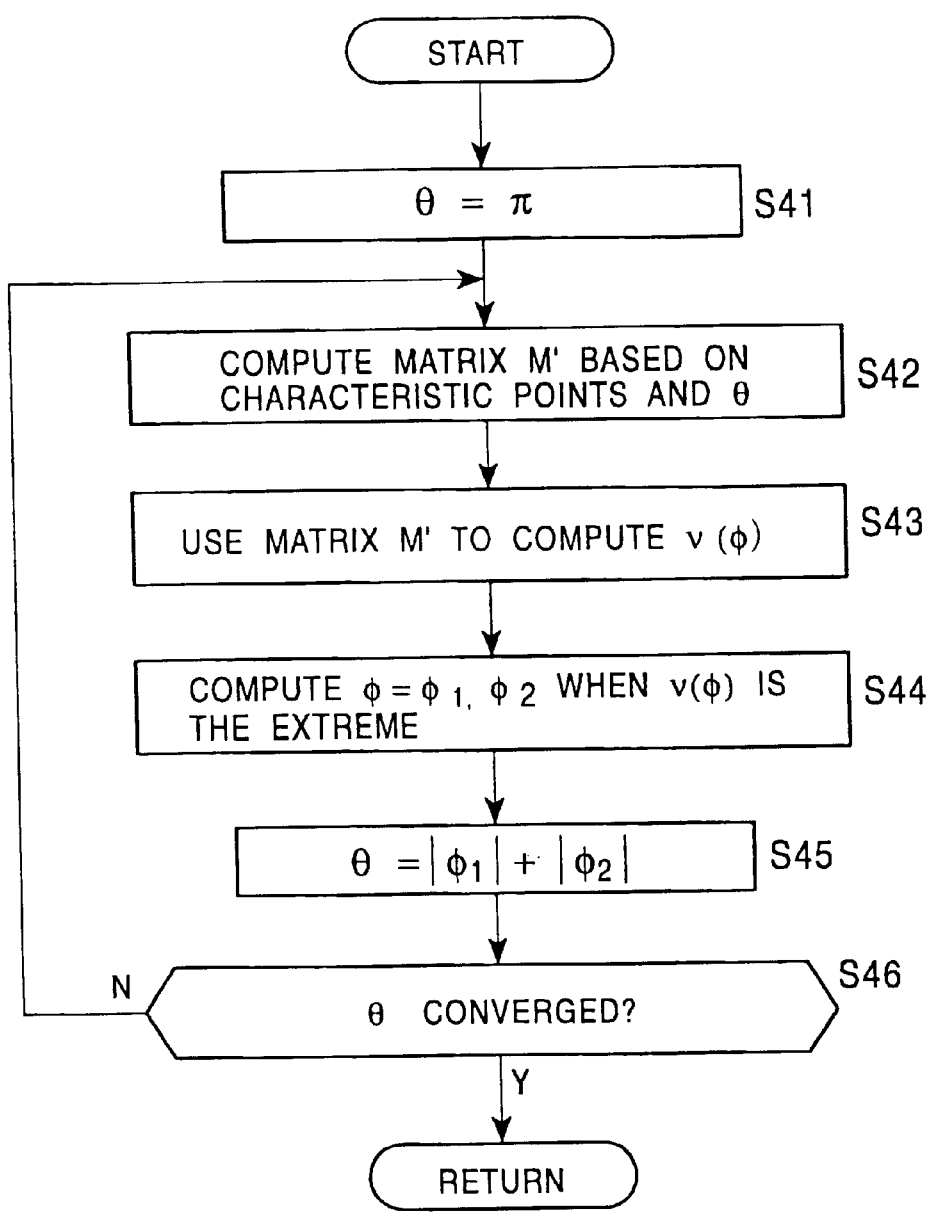
FIG. 24 is a flowchart illustrating computation of angle θ in the computation illustrated in FIG. 21.

FIG. 24 shows a flowchart illustrating a process for finding the value of $\theta$ satisfying the expression (22) by performing approximate calculation (hereinafter referred to as the "$\theta$ computation process"). The $\theta$ computation process is performed, for example, by the copy processor 12 in the copying, or by the paste processor 13 in the pasting.

In the $\theta$ computation process, the $\theta$ is set to $\pi$ (radian) in step S41. In step S42, the matrix M' satisfying the expression (22) is found based on the angle $\theta$ and the characteristic points. In step S43, $v$ of the expression (21) is found based on the matrix M' obtained in step S42. In step S44, $\phi$ obtained when $v$ is an extreme value, that is, $\phi$ satisfying the expression (22) is found. The process then proceeds to step S45.

Two values of $\phi$ satisfying the expression (21) are found, and the two values are represented as $\phi_1$ and $\phi_2$. In step S45, $\theta$ is newly set to $|\phi_1|+|\phi_2|$, and the process proceeds to step S46. In step S46, the process determines whether the angle $\theta$ has converged, in other words, the process determines whether the absolute value of the difference between the new $\theta$ and the previous $\theta$ is not more than a predetermined threshold value. If the process has determined in step S46 that the angle $\theta$ has not converges, which means that the absolute value of the difference between the new $\theta$ and the previous $\theta$ is more than the predetermined threshold value. The process returns to step S42 from which the angle $\theta$ is used to repeatedly perform the steps subsequent to step S42.

If the process has determined in step S46 that the angle $\theta$ has converged, which means that the absolute value of the difference between the new $\theta$ and the previous $\theta$ is not more than the predetermined threshold value, the new $\theta$ is determined as the value to be found, whereby the $\theta$ computation process is completed.

It has been described using taking an example that there is the vanishing point $P_7$ of the projected image in the cylinder (shown in FIGS. 21B and 23). If there is no vanishing point of the projected image, which means that lines $P_1P_4$ and $P_2P_3$ are parallel in the projected image, $y_p'$ of the expression (20) takes its extreme values when the expression $|\phi|=\theta/2$ holds. Let the value of the partial differential of $y_p'$ of the expression (20) using $\phi$ be 0, as shown in the expression (23). By performing the $\theta$ computation process in FIG. 24, based on the expressions (20) and (23) instead of the expressions (21) and (22) as described above, the computation of the values of $\theta$ when $y_p'$ takes its extreme value can be obtained.

$$\frac{\partial y'_p}{\partial \phi} = 0 \tag{23}$$

Next, if the three-dimensional object is, for example, a sphere, when the copying for creating and storing an expanded image of the sphere into the paste buffer, or the pasting for pasting the image stored in the paste buffer onto the sphere, is performed, the inverse transform expression or the right transform expression is computed respectively as described below. Here, the expanded image of the sphere is created by, for example, the equidistant cylindrical projection.

Figure 25A:
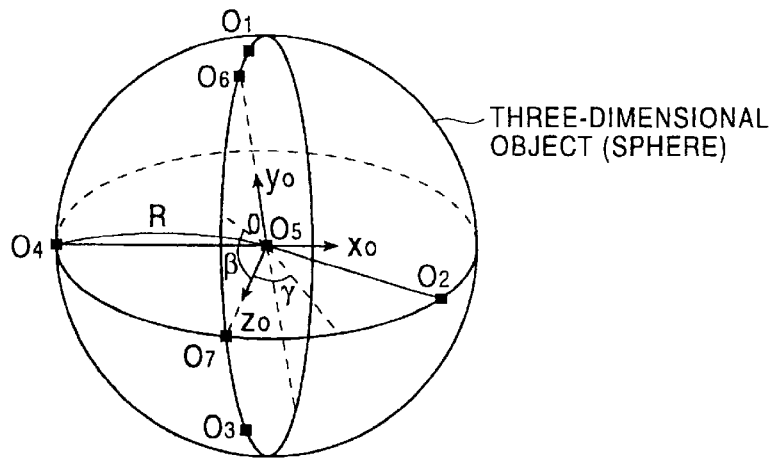
FIGS. 25A, 25B, and 25C are drawing illustrating computation of an inverse transform expression and a right transform expression in the case where a three-dimensional object is a sphere.

In this case, assuming that there is a three-dimensional coordinate system for representing the location of the sphere in the three-dimensional space as shown in FIG. 25A, where the center of the sphere is the origin (0, 0, 0) and the $x_0$ axis, the $y_0$ axis, and the $z_0$ axis are located so as to be perpendicular to one another (the $x_0$ axis is a direction in which a right hand screw advances when being turned from the $y_0$ axis to the $z_0$ axis.

Hereinafter, an intersecting point (on the positive side of the $y_0$ coordinate) where the sphere and the $y_0$ axis intersect is referred to as the "north pole", while an intersection (circle) where the sphere and the $x_0$-$z_0$ plane with $y_0=0$ intersect is referred to as the "equator".

Figure 25B:
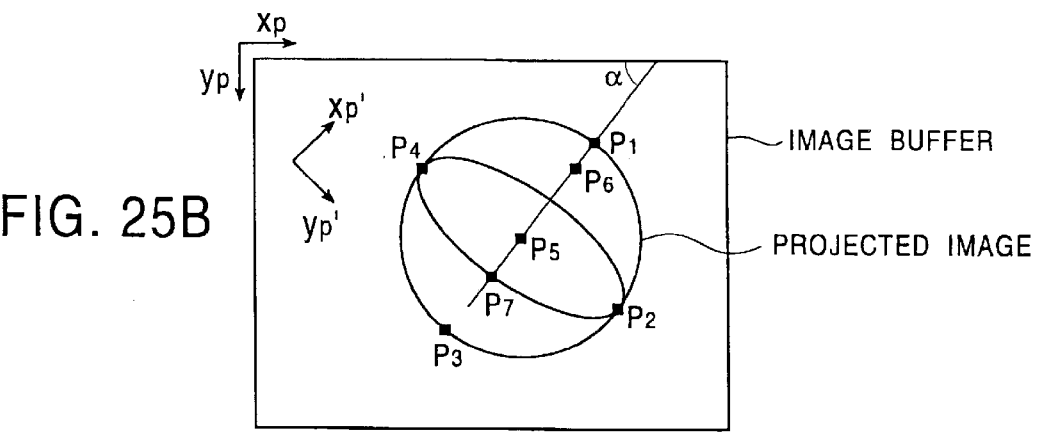

For example, a projected image obtained by capturing the image of the sphere in FIG. 25A from a predetermined position is displayed in the two dimensional image stored in the buffer of interest, as shown in FIG. 25B, where the straight line $P_5P_6$ connecting the points $P_5$ and $P_6$ (described below) is inclined at the angle $\alpha$ with respect to the $x_p$ axis.

Points $P_1$ and $P_3$ in FIG. 25B indicate two endpoints of the intersection (circle) of the sphere and the $y_0$-$z_0$ plane (with $x_0=0$) displayed in the projected image, where the point $P_1$ indicates the endpoint on the same side of the north pole while the point $P_3$ indicates the other endpoint at the opposite side of the north pole with respect to the $x_0$-$z_0$ plane as the standard. Points $P_2$ and $P_4$ indicate the two endpoints of the equator as the intersection of the sphere and the $x_0$-$z_0$ plane displayed in the projected image where the point $P_2$ indicates the endpoint at the positive side of the $x_0$ coordinate while the point $P_4$ indicates the other endpoint at the negative side of the $x_0$ coordinate.

Points $O_1$, $O_2$, $O_3$, and $O_4$ in FIG. 25A correspond to points $P_1$, $P_2$, $P_3$, and $P_4$ in FIG. 25B, respectively.

Points $O_5$, $O_6$ and $O_7$ in FIG. 25A indicate the center of the sphere, the north pole, and the bisecting point of an arc $O_2O_4$ (viewed as a projected image) along the equator, respectively, where points $P_5$, $P_6$ and $P_7$ in FIG. 25B correspond to points $O_5$, $O_6$ and $O_7$, respectively.

For example, if the expanded image of the entire sphere in FIG. 25A is stored in the paste buffer in accordance with the equidistant cylindrical projection, the radius R of the sphere can be given by the following expression where the equator corresponds to the horizontal direction of the expanded image.

$$R = L_w/(2\pi) \tag{24}$$

Regarding the sphere, $\psi$ in the expression (7), by considering the expanded image of the sphere in FIG. 25A in accordance with the equidistant cylindrical projection, the relationship between a point $(x_0, y_0, z_0)$ of the sphere in three-dimensional space and a point $(x_e, y_e)$ of the expanded image can be given as follows:

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} R\sin(\pi y_e/L_H)\cos(2\pi x_e/L_w) \\ R\cos(\pi y_e/L_H) \\ R\sin(\pi y_e/L_H)\sin(2\pi x_e/L_w) \end{pmatrix} \tag{25}$$

Also, there is no unnecessary element of the matrix M in this case. Thus, the eleven elements $m_{11}$ to $m_{14}$, $m_{21}$ to $m_{24}$, and $m_{31}$ to $m_{33}$, described in the expression (11), must be found.

At this time, for example, $P_1$ to $P_7$ in FIG. 25B are designated as characteristic points. Initially, for example, points $P_2$, $P_4$, $P_5$ and $P_6$ having two degrees of freedom are designated as characteristic points. Points $P_1$, $P_3$, and $P_7$ are designated so as to be on the straight line $P_5P_6$ connecting the point $P_5$ and the point $P_6$. Hence, since points $P_1$, $P_3$ and $P_7$ are on the straight line $P_5P_6$, they have one degree of freedom.

Since points $P_2$, $P_4$, $P_5$ and $P_6$ have two degrees of freedom, while points $P_1$, $P_3$ and $P_7$ have one degree of freedom, finding the values of these seven points $P_1$ to $P_7$ enables the eleven elements $m_{11}$ to $m_{14}$, $m_{21}$ to $m_{24}$, and $m_{31}$ to $m_{33}$ to be found.

Figure 25C:
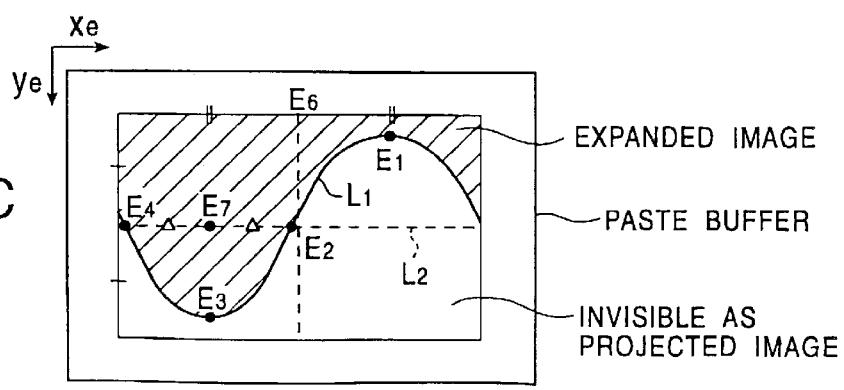

The entire sphere in FIG. 25A, in accordance with the equidistant cylindrical projection, is stored in the paste buffer, and its expanded image is shown in FIG. 25C.

The region with the diagonal lines in FIG. 25C indicates the expanded image of the projected image in FIG. 25B, while the region without the diagonal lines indicates the expanded image of the sphere which is not displayed in the projected image in FIG. 25B. Thus, regarding the sphere in FIG. 25A, a curved line $L_1$ corresponds to the boundary between the visible part and the invisible part of the sphere in the projected image in FIG. 25B. A line $L_2$ bisecting the vertical direction of the rectangular expanded image corresponds to the equator.

Points $E_1$, $E_2$, $E_3$ and $E_4$ on the curved line $L_1$ correspond to characteristic points $P_1$, $P_2$, $P_3$ and $P_4$ of the projected image in FIG. 25B, respectively. The $y_e$ coordinate of the point $E_1$ on the curved line $L_1$ takes the minimum value while the $y_e$ coordinate of the point $E_3$ on the curved line $L_1$ takes the maximum value. Points $E_2$ and $E_4$ indicate two intersecting points of the curved line $L_1$ and the line $L_2$ corresponding to the equator, where the $x_e$ coordinate of the point $E_2$ is greater than that of the point $E_4$.

A line $E_6$ connecting the origin (0, 0) and a point $(L_w, 0)$ in the paste buffer coordinate system in FIG. 25C corresponds to the point $P_6$ in FIG. 25B. A point $E_7$ in FIG. 25C bisecting a line $E_2E_4$ corresponds to a point $P_7$ in FIG. 25B.

Figure 26A:
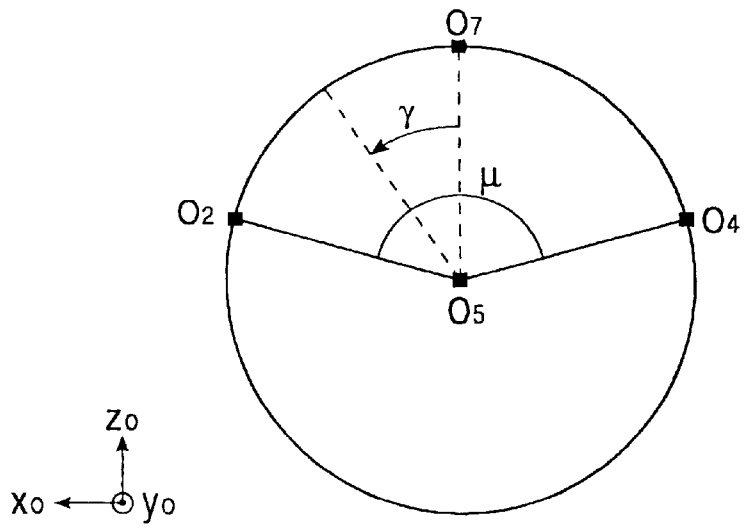
FIGS. 26A and 26B are drawings illustrating computation of an inverse transform expression and a right transform expression in the case where a three-dimensional object is a sphere.
Figure 26B:
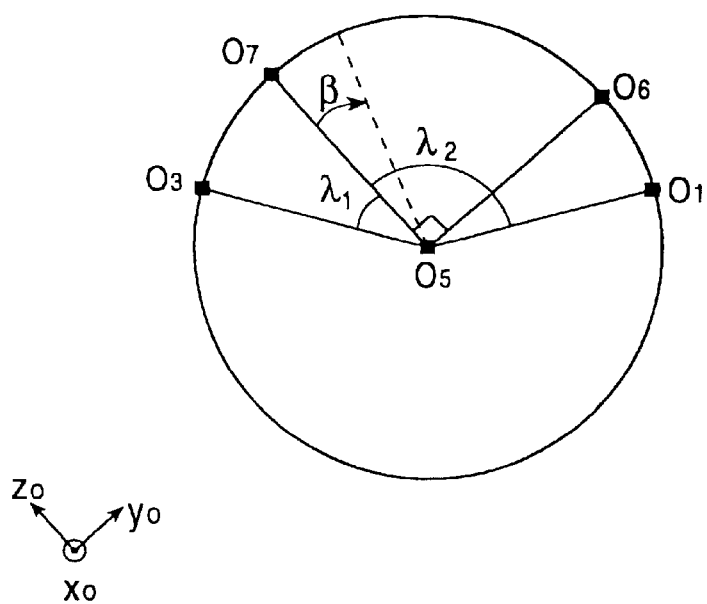

Next, let predetermined angles of the sphere in FIG. 25A be $\mu$, $\lambda_1$, and $\lambda_2$ as shown in FIG. 26. In other words, let the angle $\angle O_2O_5O_4$ formed between the two endpoints $P_1$ and $P_2$ and the origin of the sphere $O_5$ be $\mu$ as shown in FIG. 26(A), where points $P_1$ and $P_2$ are the endpoints of the intersection, that is, the circumference (or the equator), which the sphere and the $x_0$-$z_0$ plane intersect as displayed in the projected image. Let the endpoints of the intersection, that is, the circumference, of the sphere and the $y_0$-$z_0$ plane, as displayed in the projected image, be points $O_1$ and $O_3$ where the endpoint $O_1$ is on the same side of the north pole while the endpoint $O_3$ is on the other side of the north pole. Then let angle $\angle O_3O_5O_7$ formed by points $O_3$, $O_7$, and $O_5$, and angle $\angle O_1O_5O_7$ formed by point $O_1$, $O_7$ and $O_5$, be $\lambda_1$ and $\lambda_2$, respectively, as show in FIG. 26(B). Here the angle $\lambda_1+\lambda_2$ indicates the angle $\angle O_1O_5O_3$ formed by points $O_1$, $O_3$, and the center of the sphere $O_5$.

The coordinates of points $O_1$, $O_2$, $O_3$, $O_4$, $O_5$, $O_6$, and $O_7$ in FIG. 25A are (0, R sin $\lambda_2$, R cos $\lambda_2$), (R sin($\mu$/2), 0, R $\cos(\mu/2)$), (0, $-R \sin \lambda_1$, $R \cos \lambda_1$), ($-R \sin(\mu/2)$, 0, $R \cos(\mu/2)$), (0, 0, 0), (0, R, 0) and (0, 0, R), respectively.

The matrix M to be found regarding the sphere is a function of the angles $\mu$, $\lambda_1$ and $\lambda_2$ in FIG. 26. Thus, the values of these angles must be found. Also, in FIG. 25B, the values of these angles must be found, while considering the fact that a line $P_5P_6$ between the point $P_5$ corresponding to the center of the sphere and the point $P_6$ corresponding to the north pole, and the $x_p$ axis form the angle $\alpha$ in FIG. 25B.

Then the values of angles $\mu$, $\lambda_1$ and $\lambda_2$ are obtained by considering the $x_p'$ axis and the $y_p'$ axis formed by counter-clockwise rotating the xp axis and yp axis by the angle $\alpha$.

Also, in this case, the relationship between the points ($x_p$, $y_p$) and ($x_p'$, $y_p'$) can be given by the expression (18) by using homogeneous coordinates.

In FIG. 25A, let the coordinates of the intersection (circle) of the sphere and the $y_0$-$z_0$ plane with $x_0$=0 be (0, $R \sin \beta$, $R \cos \beta$), and let the coordinates of the intersection (the points on the sphere and the $x_0$-$z_0$ plane with $y_0$=0 be ($R \sin \gamma$, 0, $R \cos \gamma$). Let $x_p'$ and $y_p'$ coordinates obtained by projecting of the point (0, $R \sin \beta$, $R \cos \beta$) onto the screen coordinate system be $x_{P1}$ and $y_{P1}$. Let the $x_p'$ and $y_p'$ coordinates obtained by projecting the point ($R \sin \gamma$, 0, $R \cos \gamma$) onto the screen coordinate system be $x_{P2}$ and $y_{P2}$. The coordinates $x_{P1}$ and $y_{P2}$ can be given by the expressions (26) and (27), respectively, using the elements of the matrix M' defined in the expression (19).

$$x_{p1}=(m_{12}'R \sin \beta + m_{13}'R \cos \beta + m_{14}')/(m_{32}'R \sin \beta + m_{33}'R \cos \beta + 1) \quad (26)$$

$$y_{p2}=(m_{21}'R \sin \gamma + m_{22}'R \cos \gamma + m_{24}')/(m_{31}'R \sin \gamma + m_{33}'R \cos \gamma + 1) \quad (27)$$

Regarding the sphere in FIG. 25A, $x_{P1}$ of the expression (26) takes an extreme when the expression $\beta=-\lambda_1$ or $\beta=\lambda_2$ holds, while $y_{P2}$ of the expression (27) takes an extreme when the expression $\gamma=\mu/2$ or $\gamma=-\mu/2$ holds. Let each value obtained by partially differentiating $x_{P1}$ of the expression (26) and $y_{P2}$ of the expression (27) using $\beta$ and $\gamma$, respectively be 0 as follows:

$$\frac{\partial x_{p1}}{\partial \beta} = 0 \quad (28)$$

$$\frac{\partial y_{p2}}{\partial \gamma} = 0 \quad (29)$$

The expression (28) holds when $\beta=-\lambda_1$ or $\beta=\lambda_2$, in which $\lambda_1$ and $\lambda_2$ are values to be solved, while the expression (29) holds when $\gamma=\mu/2$ or $\gamma=-\mu/2$, in which $\mu$ is a value to be solved.

Since the elements of the matrix M' are functions of $\mu$, $\lambda_1$ and $\lambda_2$, a value obtained by partially differentiating $x_{p1}$ of the expression (28) using $\beta$ becomes a function with four variables $\mu$, $\lambda_1$, $\lambda_2$ and $\beta$, and a value obtained by partially differentiating $y_{p2}$ of the expression (29) with respect to $\gamma$ becomes a function with four variables $\mu$, $\lambda_1$, $\lambda_2$ and $\gamma$. Hence, computing the values of $\mu$, $\lambda_1$ and $\lambda_2$ which satisfy the expressions (28) and (29) becomes complicated. However, it becomes comparatively easier to obtain the values of $\mu$, $\lambda_1$ and $\lambda_2$ by using an approximate calculation in the same manner as the $\theta$ computation process as described above, where the values of $\mu$, $\lambda_1$ and $\lambda_2$ are initialized with predetermined values and then the elements of the matrix M' are computed thereby computing the values of $\beta$ and $\gamma$ with the values of the elements, which leads the values of $\mu$, $\lambda_1$ and $\lambda_2$ to be updated.

This example uses the equidistant cylindrical projection for creating the expanded image of the sphere. However, a technique of creating the expanded image of the sphere is not limited to the above-described example. That is, it is also possible to create the expanded image of the sphere by using Mercator's projection or Lambert conformal projection.

Regarding the sphere, the expanded image of the entire sphere is stored in the paste buffer as shown in FIG. 25C. Since the projected image corresponds only to the region with the diagonal lines in FIG. 25C, the region with the diagonal lines in FIG. 25C is displayed in the two dimensional image when the projected image transformed from the expanded image is pasted onto the two dimensional image stored in the buffer of interest. Since the whole image stored in the paste buffer is not displayed as the projected image in the two dimensional image, while considering above, two-dimensional paint operations, such as rendering a character and the like, must be performed over the expanded image pasted on the sphere. If the characters are pasted onto the projected image of the sphere in FIG. 25B, the pasting must be performed by rendering the characters in the region with the diagonal lines in FIG. 25C. If some of the characters are rendered outside the region, those characters are not pasted on the projected image in FIG. 25B.

Next, when the three-dimensional object is a sphere, $\mu$, $\lambda_1$, and $\lambda_2$ in FIG. 26 are respectively obtainable in a similar manner to the $\theta$ calculation, as described using, 24. The angle $\mu$ can be obtained by the following relationship after obtaining $\lambda_1$ and $\lambda_2$.

Figure 27:
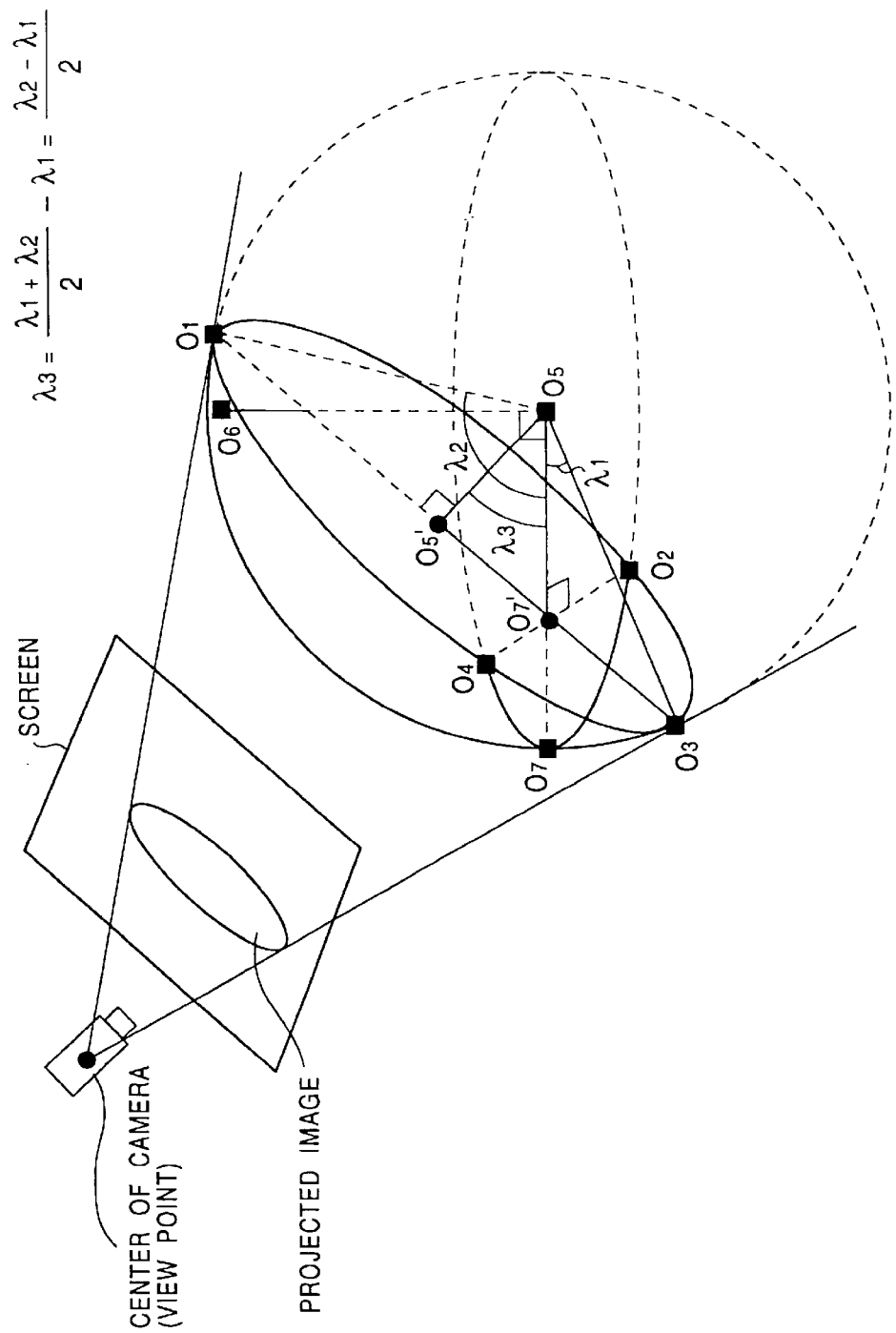
FIG. 27 is a drawing illustrating computation of $\mu$ from $\lambda_1$ and $\lambda_2$ shown in FIGS. 26A and 26B.

That is, suppose there are points $O_5'$ and $O_7'$, as shown in FIG. 27, besides the points $O_1$ through $O_7$ shown in FIG. 25A. The point $O_5'$ is an intersection of a line segment $O_1O_3$ and a perpendicular line extended from the point $O_5$ to the line segment $O_1O_3$, and the point $O_7'$ is an intersection of a line segment $O_2O_4$ and a line segment $O_5O_7$.

When $\phi O_5'O_5O_7'$ is symbolized by $\lambda 3$, $\lambda 3$ is given as the following expression by employing $\lambda_1$, or $\angle O_3O_5O_7$, and $\lambda_2$, or $\angle O_1O_5O_7$ as shown in FIG. 26B.

$$\lambda_3 = (\lambda_1 + \lambda_2)/2 - \lambda_1 \quad (30)$$
$$= (\lambda_2 - \lambda_1)/2$$

Figure 28:
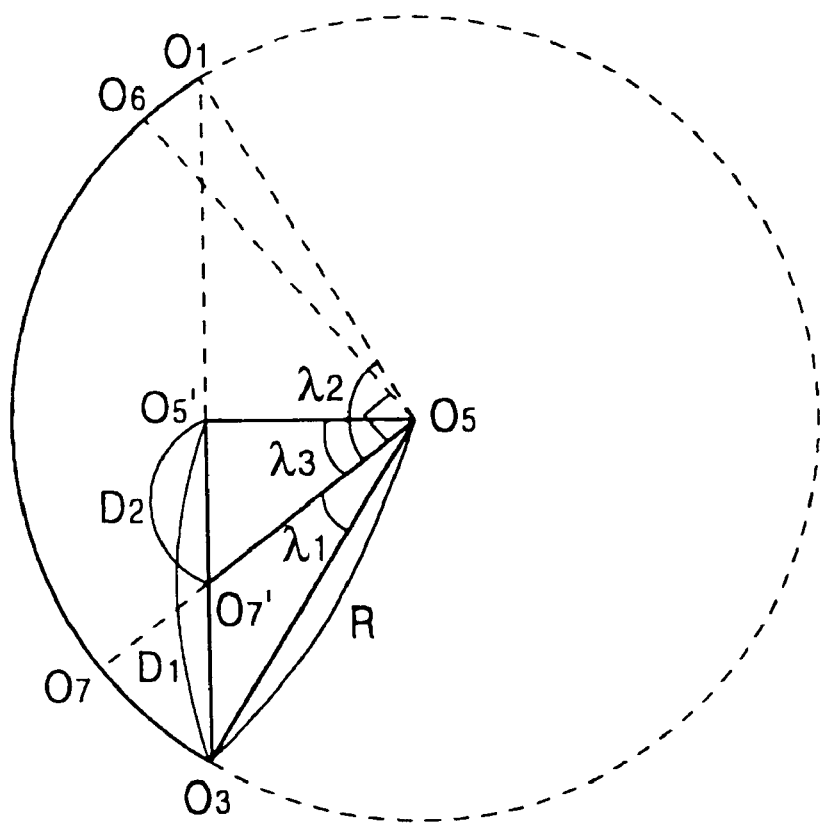
FIG. 28 is a drawing illustrating computation of $\mu$ from $\lambda_1$ and $\lambda_2$ shown in FIGS. 26A and 26B.

The intersectional plane of the sphere in FIG. 27 and the plane $O_1O_6O_7O_3$ ($y_0z_0$ plane) forms a circle, as shown in FIG. 28, with a center at $O_5$ and with an equal radius to the sphere in FIG. 27. In FIG. 28, $D_1$ is given by the following expression, when the length of line segment $O_3O_5'$ is $D_1$, $$D_1=R \sin((\lambda_1+\lambda_2)/2) \quad (31)$$

where R represents a radius of the sphere in three-dimensional space as shown in the expression (24).

Moreover, in FIG. 28, $D_2$ is also given by the following expression, when the length of the line segment $O_5'O_7'$ is $D_2$.

$$D_{2-R} \cos((\lambda_1+\lambda_2)/2)\tan \lambda_3 \quad (32)$$

Figure 29:
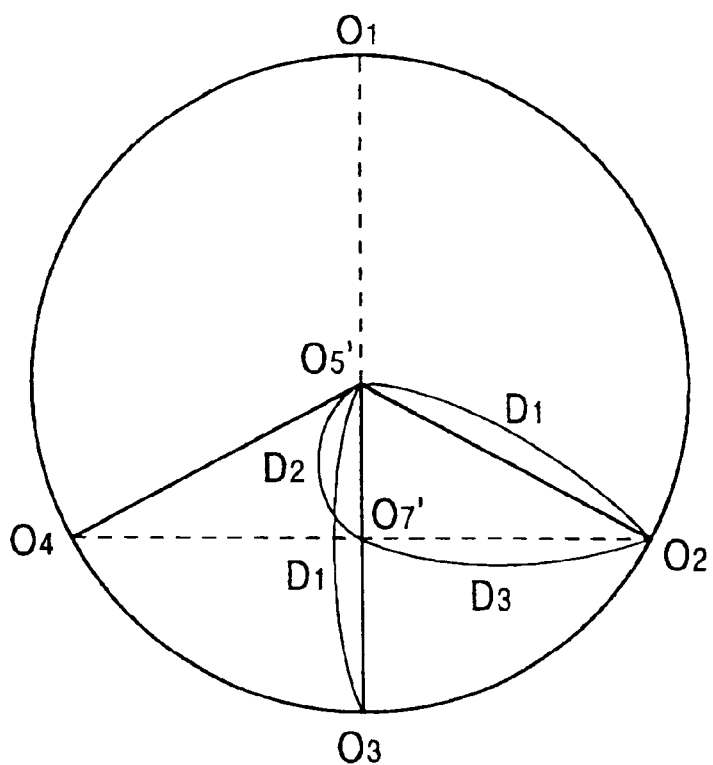
FIG. 29 is a drawing illustrating computation of $\mu$ from $\lambda_1$ and $\lambda_2$ shown in FIGS. 26A and 26B.

The intersectional plane of the plane of the points $O_1$, $O_2$, $O_3$, and $O_4$, and the sphere in FIG. 27 forms a circle with a center at $O_5'$ and with a radius of the line segment $O_3O_5'$, in which the line segments $O_5'O_3$ and $O_5'O_2$ are equal to each other since they are the radius of the circle with the center at $O_5'$. Accordingly, the length of the line segment $O_5'O_2$ is equal to the length of line segment $O_5'O_3$, or $D_1$ given by the expression (31). Thus, in FIG. 29, $D_3$ can be obtained from the Pythagorean proposition, where the length of the line segment $O_2O_7'$ is $D_3$.

$$D_3 = \sqrt{(D_1^2 - D_2^2)} \tag{33}$$
$$= R\sqrt{(\sin^2((\lambda_1 + \lambda_2)/2) - \cos^2((\lambda_1 + \lambda_2)/2)\tan^2\lambda_3)}$$

Figure 30:
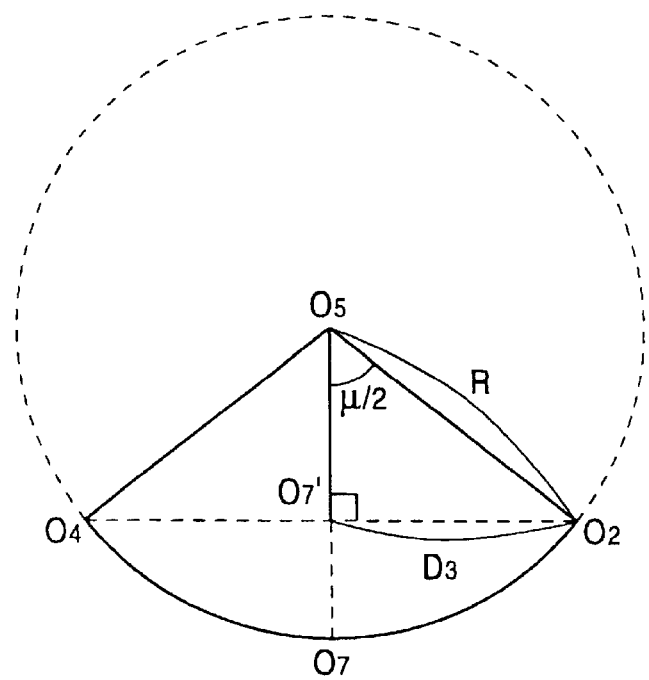
FIG. 30 is a drawing illustrating computation of $\mu$ from $\lambda_1$ and $\lambda_2$ shown in FIGS. 26A and 26B.

Further, the intersectional plane of the sphere in FIG. 27 and the plane of the points $O_5$, $O_2$, $O_7$, and $O_4$ forms the circle with a center at $O_5$ and with a radius R as shown in FIG. 30, similarly to FIG. 26A. Since sine of angle $\mu/2$ is obtained from FIG. 30 by computing $D_3/R$, the following expression holds for $\mu$, $\lambda_1$ and $\lambda_2$.

$$\sin(\mu/2) = D_3/R \tag{34}$$
$$= \sqrt{(\sin^2((\lambda_1 + \lambda_2)/2) - \cos^2((\lambda_1 + \lambda_2)/2)\tan^2\lambda_3)}$$
$$= \sqrt{(\sin^2((\lambda_1 + \lambda_2)/2) - \cos^2((\lambda_1 + \lambda_2)/2)\tan^2((\lambda_2 - \lambda_1)/2))}$$

As described above, $\lambda_1$ and $\lambda_2$ are obtained in a similar manner to the θ calculation described using, 24, and $\mu$ is obtainable by substituting $\lambda_1$ and $\lambda_2$ into the expression (34).

In the θ calculation, steps from S42 through S45 are necessarily repeated until θ converges. Thus, it is not required to repeat steps when $\mu$ is obtained from $\lambda_1$ and $\lambda_2$. Hence, $\mu$ is calculated faster and with less operations.

In the case that the three-dimensional object is, for example, a cone, when copying for storing a generated expanded side image of the cone in the paste buffer, or pasting an image stored in the paste buffer to the side of the cone, inverse transformation or transformation is computed in the following manner.

Figure 31A:
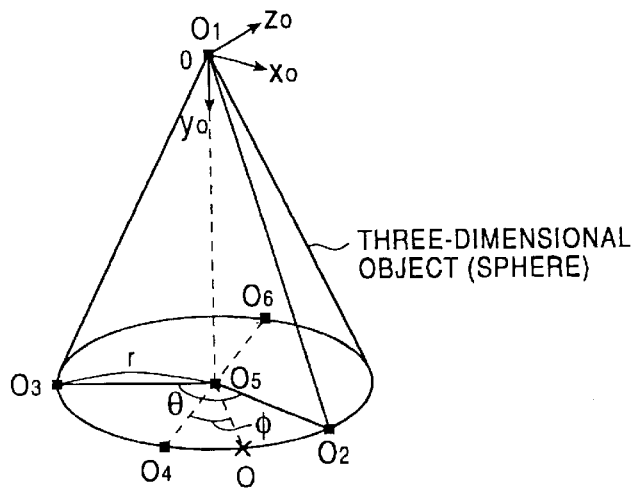
FIGS. 31A, 31B, and 31C are drawings illustrating computation of an inverse transform expression and a right transform expression in the case where a three-dimensional object is a cone.

Namely, in this case, as shown in FIG. 31A, suppose that three-dimensional coordinates in three-dimensional space indicate the position of the cone. In these coordinates, suppose a $y_0$ axis from a vertex designated as the origin (0, 0, 0), which corresponds to the center of the fan formed by expanding the side of the cone, is directed to the center of the base surface $O_5$, and further suppose a $z_0$ axis from a below mentioned point $O_4$ is directed to the center of the base surface $O_5$, where a $x_0$ axis coincides with the direction of a right-hand screw when the right-hand screw is twisted from the $y_0$ axis to the $z_0$ axis.

Figure 31B:
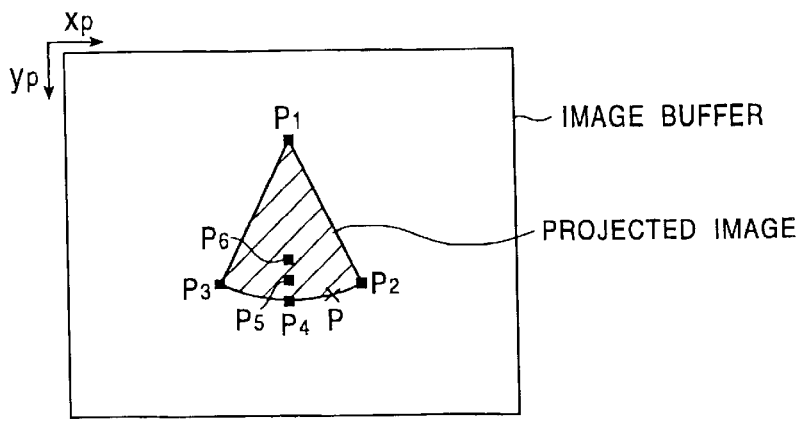

When, for example, the projected image of the cone in FIG. 31A, whose image was captured from a relatively higher position, is displayed in the two-dimensional image of the buffer of interest, the projected image of the cone appears as an shaded image in FIG. 31B.

In FIG. 31B, points $P_1$ and $P_5$ correspond to the points $O_1$ and $O_5$ in FIG. 31A, respectively. Moreover, the points $P_2$ and $P_3$ are end points of the intersectional line of the projected image of the side of the cone (the projected image formed when only the side plane is projected) and the projected image of the base of the cone (the projected image formed when only the base surface is projected). The right and left ends of the intersectional line are designated as the points $P_2$ and $P_3$, respectively. The points $P_2$ and $P_3$ correspond to the points $O_2$ and $O_3$ in FIG. 31A, respectively.

In FIG. 31A, points $O_4$ and $O_6$ are the points bisect the front and the back of the base circle, between the points $O_2$ and $O_3$, and correspond to the points $P_4$ and $P_6$ in FIG. 31B, respectively.

Here, as described above, the $z_0$ axis is directed from the point $O_4$ to the center of the base circle, or point $O_5$, and the point $O_5$ is on the $y_0$ axis. Further, as described, the points $O_4$, $O_5$, and $O_6$ are on the same straight line, hence, these points from $O_4$ to $O_6$ are all on the $y_0z_0$ plane (the plane at $x_0=0$). In consequence, in FIG. 31B, the points $P_4$, $P_5$, and $P_6$, respectively corresponding to the points $O_4$, $O_5$ and $O_6$, are also on the same straight line. That is, when two of the points from $P_4$ to $P_6$ are designated, for example the points $P_4$ and $P_6$, the remaining point, the point $P_5$, is necessarily on the straight line $P_4P_6$. That means one degree of freedom.

In the case where the expanded image corresponding to the projected image of the side of the cone is stored in the paste buffer, the relationship between the angle θ in FIG. 31A representing $\angle O_2O_5O_3$, and the radius of the base of the cone designated as r, is given by the expression (15), similarly to the case for the cylinder described using, 21, where, for example, the direction of the base circle of the cone coincides with the lateral direction of the expanded image.

Further, in the case when the angle φ is given by the expression (16), in a similar manner as the cylinder described using, 21, ψ of the expression (7) on the side of the cone, or the relationship of the point on the side of the cone between $(x_0,y_0,z_0)$ in three-dimension space, and $(x_e, y_e)$ on the expanded image, is represented by the following expression through taking account of the expanded image of the cone in FIG. 31A.

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} \dfrac{y_e}{L_H}r\sin\phi \\ y_e \\ -\dfrac{y_e}{L_H}r\cos\phi \end{pmatrix}$$

In this event, the eleven elements $m_{11}$ to $m_{14}$, $m_{21}$ to $m_{24}$ and $m_{31}$ to $m_{33}$ of the matrix, as described by the expression (11), which are necessarily obtained, can be calculated in the manner as heretofore described by designating six points in total on the projected image, composed of five points having two degrees of freedom and one point having one degree of freedom.

At this point, the user is requested to designate six characteristic points, for example, the point $P_1$ through the point $P_6$ in FIG. 31B. Namely, five points having two degrees of freedom, for example, the point $P_1$ through the point $P_4$ and the point $P_6$, are designated, and one point having one degree of freedom, for example, the point $P_5$, is designated. When the points $P_4$ and $P_6$ are designated, the point $P_5$ is on the straight line $P_4P_6$ as described, so that the point $P_5$ has one degree of freedom.

Figure 31C:
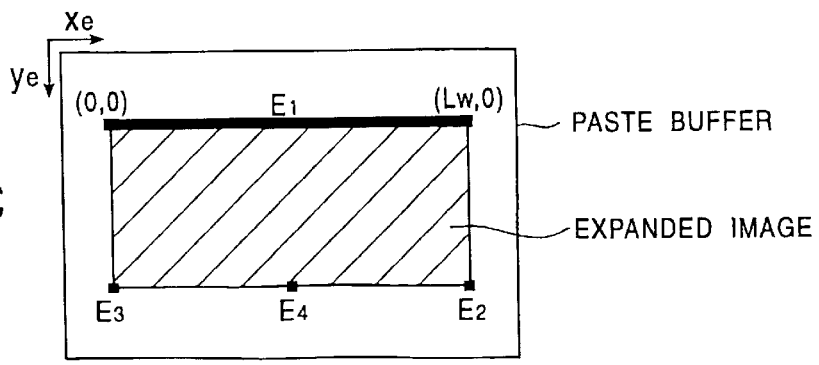

Further, as shown in FIG. 31C, in the paste buffer coordinate system of the expanded image stored as a rectangle in the paste buffer, the line segment from an origin (0,0) to point $(L_w, 0)$, coordinates $(L_w, L_H)$, $(0, L_H)$ and $(L_w/2, L_H)$ are designated as $E_1$, $E_2$, $E_3$, and $E_4$, respectively, where $P_1$ corresponds to $E_1$, $P_2$ to $E_2$, $P_3$ to $E_3$, and $P_4$ to $E_4$.

According to the expression (10) in conjunction with the above relationship, the eleven elements $m_{11}$ to $m_{14}$, $m_{21}$ to $m_{24}$, and $m_{31}$ to $m_{33}$, that is, matrix M, are given by solving expressions for the eleven elements $m_{11}$ to $m_{14}$, $m_{21}$ to $m_{24}$ and $m_{31}$ to $m_{33}$.

In the example in FIG. 31C, a rectangle is used as the expanded image of the side of the cone, other expanded images of the cone also may be employed, for example, such as a fan shape which is merely an expanded image of the side of the cone in FIG. 31A.

In the case of using the fan as the expanded image of the side of the cone, it is required to render characters along the circle of the expanded image of the fan when characters are to be pasted in parallel with the base surface on the projected image of the side of the cone. On the contrary, in the case of using the rectangle as the expanded image of the side of the cone as shown in FIG. 31C, rendering characters in the expanded image in parallel with the $x_e$ axis and pasting, enables characters to be pasted in parallel with the base surface on the projected image of the side of the cone.

Figure 32:
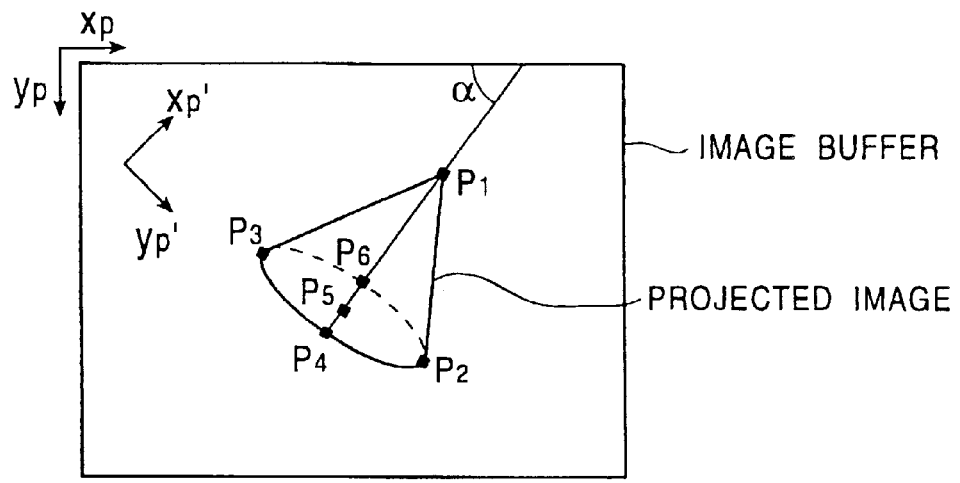
FIG. 32 is a drawing illustrating computation of an inverse transform expression and a right transform expression in the case where a three-dimensional object is a cone.

When the height of the cone in FIG. 31A is equal to the longitudinal length $L_H$ of the expanded image in FIG. 31C, coordinates of points $O_1$, $O_2$, $O_3$, $O_4$, $O_5$, and $O_6$ are (0, 0, 0), (r sin($\theta$/2), $L_H$, −r cos($\theta$/2)), (−r sin($\theta$/2), $L_H$, −r cos($\theta$/2)), (0, $L_H$, −r), (0, $L_H$, 0) and (0,$L_H$,r), respectively. Matrix M for the cone obtained as described above is a function of the angle $\theta$ similar to the case of cylinder described using. 21, hence this angle $\theta$ needs to be calculated. The projected image of the cone in FIG. 31B is displayed on two-dimensional image in a manner that the straight line between the characteristic points $P_4$ and $P_5$ is in parallel with the $y_p$ axis, however it is generally common, for example as shown in FIG. 32, that the straight line between the characteristic points $P_4$ and $P_5$ on the projected image of the cone are inclining about the $y_p$ axis.

The method for computing $\theta$ is described, where the angle made by the straight line between the characteristic points $P_4$ and $P_5'$ and the $x_p$ axis is $\alpha$.

When $y_0 = y_e = L_H$ in the expression (35), the expression (35) is equal to the expression (17) representing $\psi$ on the cylinder. Accordingly, in this case $x_p$ and $y_p$ on the cone are equal to $x_p$ and $y_p$ on the cylinder, respectively. When the angle formed by the straight line between two characteristic points $P_4$ and $P_5$, and the $x_p$ axis is $\alpha$, as described, in the coordinate system defined by the axes of $x_p'$ and $y_p'$, where the $x_p'$ and $y_p'$ axes obtained by rotating counterclockwise the $x_p$ and $y_p$ axes by $\alpha$, the point P on the projected image (in FIG. 31), corresponding to the point O on the circle of the base of the cone, is represented similarly to the case of the cylinder.

Figure 33:
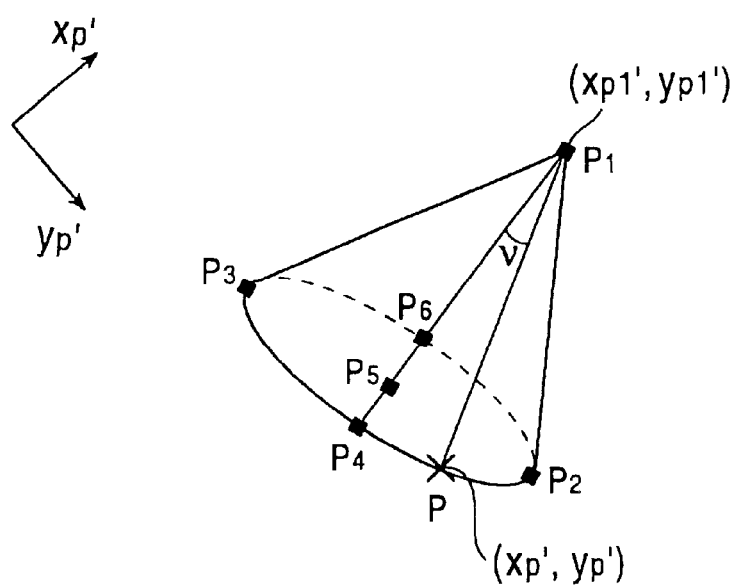
FIG. 33 is a drawing illustrating angle v.

That is, regarding the cone, the coordinates of $x_p'$ and $y_p'$ of point P on the projected image, corresponding to the point O on the circle of the base of the cone, are given by the expression (20). When an angle formed by the point P corresponding to the point O, $P_1$, and $P_4$ on the projected image is designated as $\nu$, as shown in FIG. 33, and the coordinates of $P_1$ is represented as ($x_p'$, $y_p'$), the angle $\nu$ is represented as the following expression.

$$\nu = \tan^{-1}(|y_p' - y_{p1}'|/|x_p' - x_{p1}'|) \quad (36)$$

The angle $\nu$ of the expression (36) is a function of the angle $\phi$ (=$\angle O_4 O_5 O$) (in FIG. 31A) formed by the point O, $O_5$ and $O_4$, and is extreme when $|\phi| = \theta/2$ is satisfied.

Hence, instead of the expression (21), $\theta$ of the cone in FIG. 31A is given by using the expression (36), similarly to the case of the cylinder.

When the vertex $P_1$ is inside the projected image in FIG. 31B or FIG. 33, $\theta$ is $2\pi$ (360 degrees) since the entire side is to be seen.

The foregoing description is about the method for computing $\psi$ and M regarding some primitive shapes as three-dimensional objects, and computation of $\psi$ and M of three-dimensional objects having different shapes from the above-described shapes can be performed if the shapes are represented by functions.

The characteristic points are not limited to the points described above. For example, in FIG. 20, the vertices of the quadrangle, or the projected image of the rectangle, are designated as the characteristic points, while each midpoint of the sides of the quadrangle is instead designated as the characteristic points of the quadrangle. Regarding the sphere, points from $P_1$ through $P_7$ corresponding to the points $O_1$ to $O_7$, respectively, shown in FIG. 25A, are designated as the characteristic points. However, for example, the projected points on the two-dimensional image corresponding to the points $O_1$ to $O_6$, and a point $O_8$ may be designated as the characteristic points of the sphere, when the point $O_8$ is the other end of the intersection than the point $O_7$, of the straight line of points $O_5$ and $O_7$, and the sphere shown in FIG. 25A.

Figure 34A:
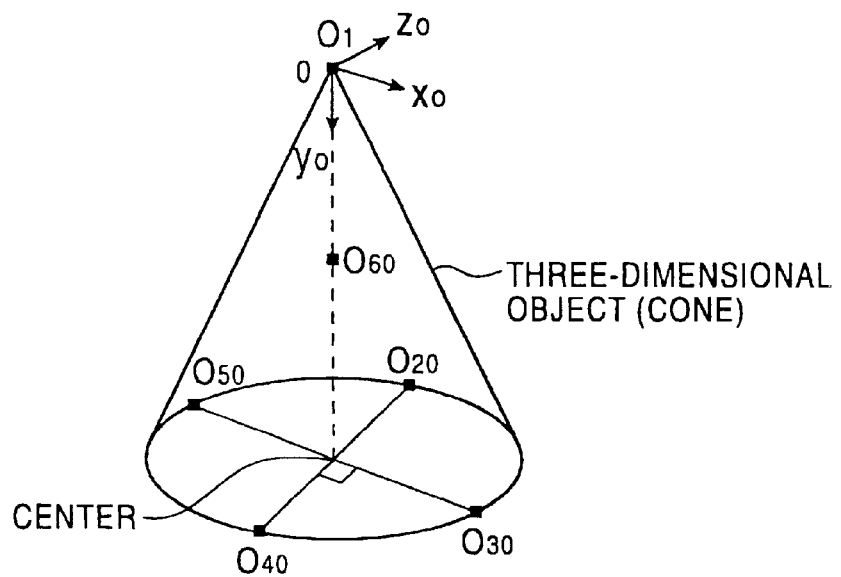
FIGS. 34A and 34B are drawings showing examples of characteristic points designated for a cone.
Figure 34B:
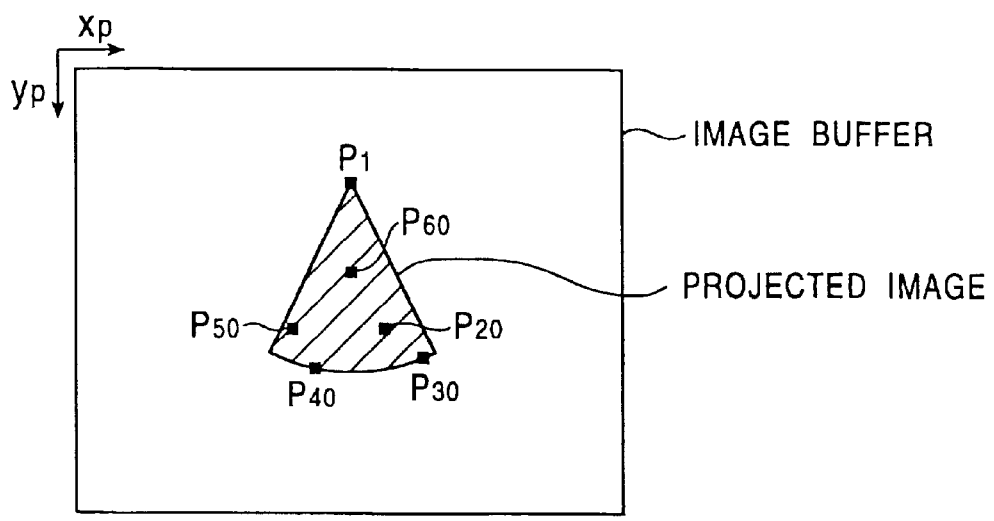

Regarding the cone, for example, points as shown in FIG. 34 may be designated as the characteristic points. That is, as shown in FIG. 34A, the midpoint of the line segment between the vertex $O_1$ of the cone and the center of the base is represented as $O_{60}$. The points of intersection of the circle of the base and the $x_0 y_0$ plane are represented as $O_{30}$ and $O_{50}$, and the points of intersection of the circle of the base and the $y_0 z_0$ plane are represented as $O_{20}$ and $O_{40}$. Here, the coordinates of the points $O_{20}$, $O_{30}$, $O_{40}$, $O_{50}$ and $O_{60}$ correspond to (r, $L_H$, 0), (0, $L_H$, −r), (−r, $L_H$, 0), (0, $L_H$, r) and (0, $L_H/2$, 0), respectively. When points on the projected image corresponding to the points $O_1$, $O_{20}$, $O_{30}$, $O_{40}$, $O_{50}$ and $O_{60}$, are represented as points $P_1$, $P_{20}$, $P_{30}$, $P_{40}$, $P_{50}$ and $P_{60}$, respectively, as shown in FIG. 34B, these points may be designated as the characteristic points.

It is apparent from the foregoing description that a displayed point (a visible point) and a non-displayed point (an invisible point) on the projected image both can be designated as the characteristic points.

The correspondence of the designated point as the characteristic point of the projected image to the position of the expanded image stored in the paste buffer is predetermined.

In the pasting, basically as described above, the image stored in the paste buffer is pasted on the surface of the three-dimensional object, which is specified by the characteristic points designated by the user, on the two-dimensional image stored in the buffer of interest. That is, the pixel levels of the image stored in the paste buffer are used to overwrite the two-dimensional image in the buffer of interest. However, for example, in the case when a new three-dimensional object is added to the two-dimensional image stored in the buffer of interest by using the pasting, simply overwriting with the pixel levels of the image stored in the paste buffer on the buffer of interest enables the new three-dimensional object to be added in front of the three-dimensional object already displayed in the two-dimensional image stored in the buffer of interest, but not at the back thereof.

Hence, in this embodiment, by using a matte, the new three-dimensional object can be added at the back of the three-dimensional object already displayed in the two-dimensional image stored in the buffer of interest.

The matte is a so-called "gray scale image" representing a shape of an object displayed in the two-dimensional image, and is also called an "$\alpha$-image" since the gray scale value represents a contribution rate (hereinafter referred to as "$\alpha$") to the object at each pixel composing the two-dimensional image. Here, the matte of the two-dimensional image stored in the buffer of interest is adapted to be generated by the matte processing in step 15 in FIG. 7. As described above, the matte of two-dimensional image is stored in the image buffer storing the two-dimensional image.

Each pixel level is between, for example, zero and one. The level of each pixel composing a foreground is one. The level of each pixel composing a background is zero. The level of each pixel composing a boundary region between the foreground and the background is proportional to the ratio of the foreground to the background included in each pixel (As the ratio of the foreground is greater, the pixel level is closer to one, and as the ratio of the background is greater, the pixel level is closer to zero).

Figure 35A:
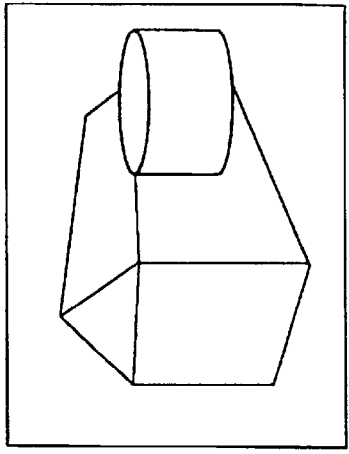
FIGS. 35A, 35B, 35C, and 35D are drawings illustrating matte processing.
Figure 35B:
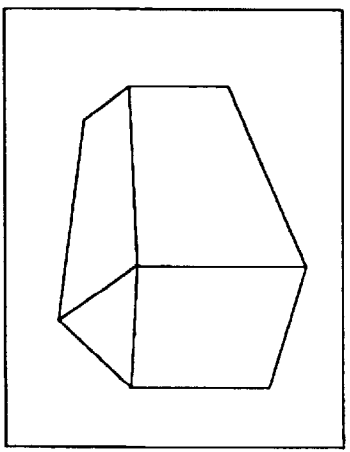

Accordingly, for example, in the case when a two-dimensional image displaying a house-shaped three-dimensional object, as shown in FIG. 35A, is stored in the buffer of interest, when performing the matte operation using the house as a foreground and the other part as a background, a matte is generated in the matte processor 16, as shown in FIG. 35B, and stored in the buffer of interest. In FIG. 35B, each pixel level of the shaded portion is one, and each pixel level of the blank portion is zero.

The following disclosed methods can be applied to the matte generation. They are, for example, "Intelligent Scissors for Image Composition", Proceedings of SIGGRAPH 95, pp. 191–198, by Eric N. Mortensen and William A. Barrett, and the inventions in Japanese Unexamined Patent Publication Nos. 8-331455 and 10-143654 (both disclosed by Sony Corporation in Japan).

When the matte, together with the two-dimensional image, is stored in the buffer of interest, operation of the input unit 6 enables the matte operation to be valid or not.

Figure 35C:
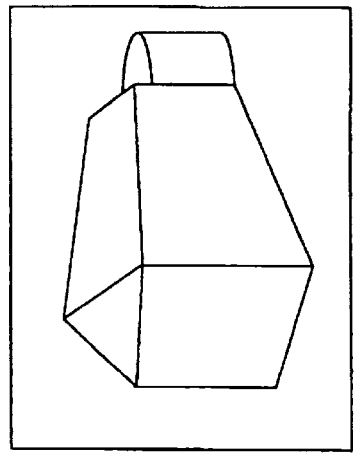

For example, when the two-dimensional image or the matte are stored in the buffer of interest, as shown in FIG. 35A or FIG. 35B, and when the pasting of, for example, a cylinder on the two-dimensional image of the buffer of interest is instructed, the projected image of the cylinder simply overwrites the two-dimensional image, so that a two-dimensional image having a cylinder in front of the house is generated, as shown in FIG. 35C.

When the matte is invalid, the two-dimensional image C by the pasting is generated based on the expression $C=\alpha A+(1-\alpha)B$, where the level of pixels composing the two-dimensional image stored in the buffer of interest is A, the level of pixels composing the projected image of the cylinder is B, and the level of pixels composing the matte is $\alpha$.

Figure 35D:
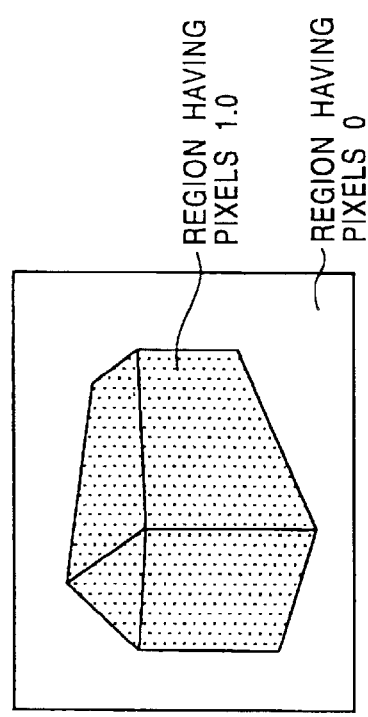

Accordingly, in this case, a two-dimensional image having the cylinder behind the house is generated, as shown in FIG. 35D.

The pasting using the matte enables a so-called occlusion to occur, which causes the hidden part of the three-dimensional object displayed in the two-dimensional image to be invisible. Hence, in this case the matte is functioning as a flag which determines whether overwriting using the projected image is allowed.

It is possible for the matte to be generated by the user.

Figure 36:
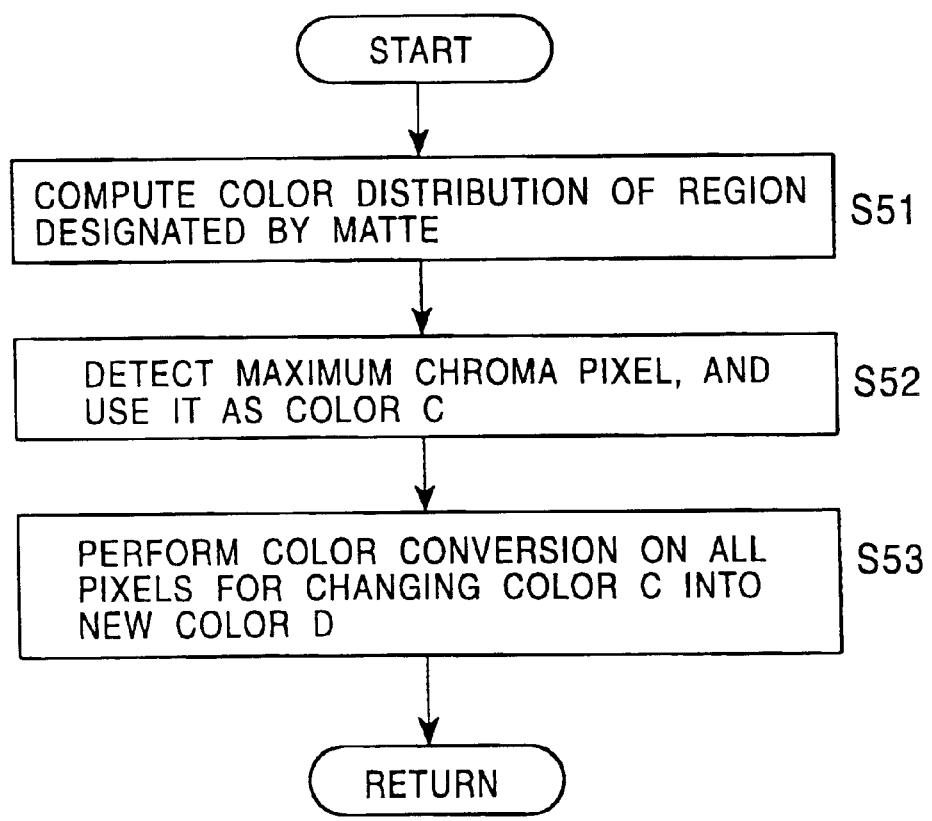
FIG. 36 is a flowchart illustrating the object property/illumination change process in step S16 shown in FIG. 7.

Referring to the flowchart in FIG. 36, the object property/illumination change process in step 16 in FIG. 7 is described. In this case, it is assumed that the matte of the two-dimensional image has already been generated and stored in the buffer of interest.

In the object property/illumination change, in step S51, the color distribution of the region of the object displayed in the two-dimensional image stored in the buffer of interest is computed, which distribution is represented by the matte also stored in the buffer of interest. In step S51, the region of the object displayed in the two-dimensional image stored in the buffer of interest is recognized based on the matte stored in the buffer of interest, and the distribution (color distribution) (in the RGB space) of the RGB value of pixels composing the region is computed.

In step S52, following the computation of the color distribution, among pixels composing the region of the object, a pixel (hereinafter referred to as "maximum chromatic pixel") having a maximum chroma is detected based on the color distribution computed in step S51.

Figure 37:
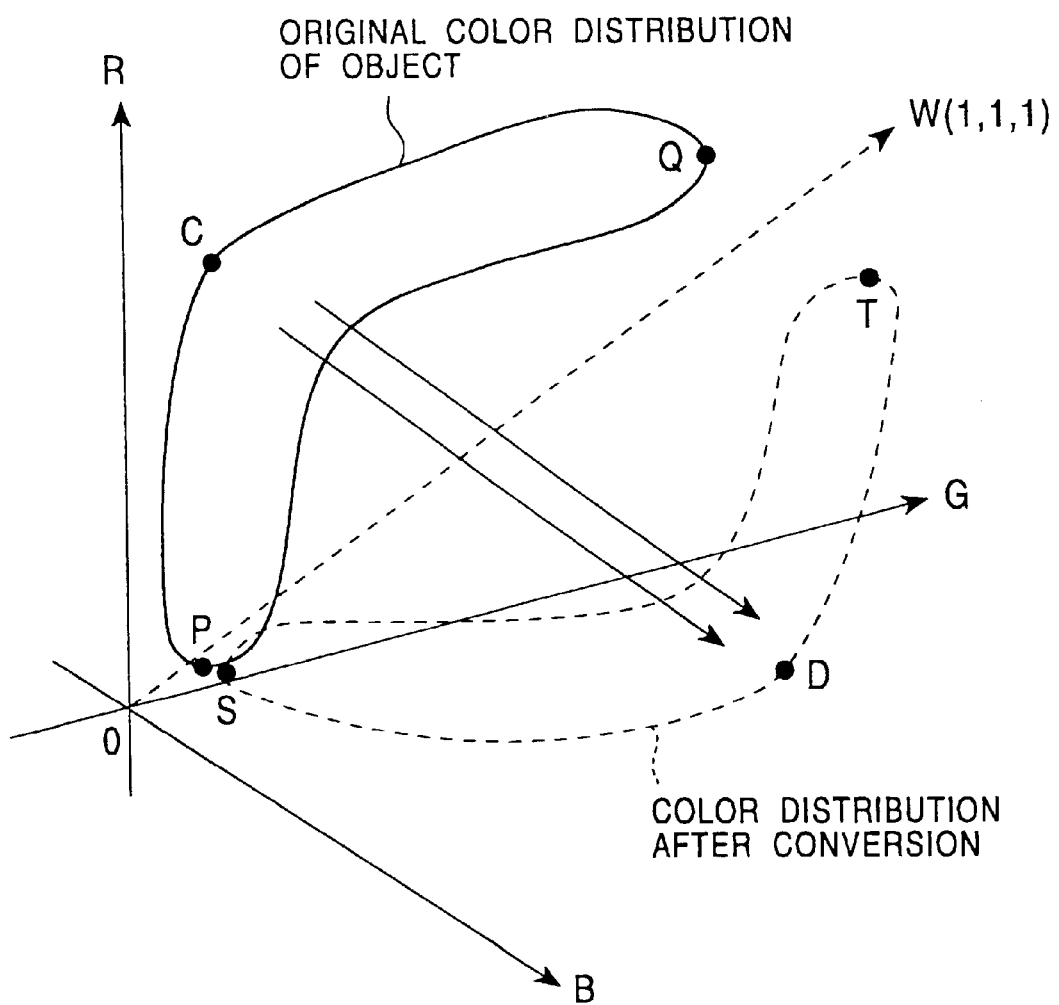
FIG. 37 is a drawing illustrating step S53 shown in FIG. 36.

FIG. 37 shows an example of the color distribution of the object in RGB space (the portion circumscribed with the solid line). FIG. 37 shows the color distribution in which each of the maximum R, G, and B values is normalized to one. Therefore, in the RGB space, a point in which (R, G, B)=(0, 0, 0) represents black, and a point in which (R, G, B)=(1, 1, 1) represents white.

In the RGB space, the chroma is larger farther from the straight line of the points of black and white, in other words, the straight line of the points (0, 0, 0) and (1, 1, 1) in FIG. 37. Accordingly, in step S52, a pixel (in the color distribution obtained in step S51) having the color located at the point being farthest from the straight line of the point (0, 0, 0) and (1, 1, 1) is detected. In the color distribution in FIG. 37, the pixel of color indicated by C in the same Fig. is computed as the maximum chromatic pixel.

Here, the color C of the maximum chromatic pixel (RGB level) is considered as the original color of the object displayed in the two-dimensional image stored in the buffer of interest.

The process proceeds to step S53, and the color distribution computed in step S51 is transformed, then the pixel levels (RGB levels) in accordance with the transformed color distribution are written in the corresponding pixels composing the two-dimensional image stored in the buffer of interest, and the process returns. In step S53, the color C of the maximum chromatic pixel is converted into predetermined color D, then the other colors of pixels composing the region of the object are converted in accordance with a predetermined rule.

Specifically, when the object property process for changing material attributes of the object, such as color or tone, is commanded, in step S53, the color C of the maximum chromatic pixel is converted into the predetermined color D, and in a similar manner, the other colors of pixels composing the region of the object are linearly converted.

That is, as shown in FIG. 37, when the color C of the maximum chromatic pixel is converted, the colors (in the color distribution) between the color C and the color at the point (1, 1, 1) representing white are converted into the color between the color D and the color at the point (1, 1, 1) representing white. Moreover, the colors (in the color distribution) between the color C and the color at the point (0, 0, 0) representing black are linearly converted into the color between the color D and the color of the point (0, 0, 0) representing black. In consequence, the color distribution of the object indicated by the solid line in FIG. 37 is changed to that indicated by the dotted line. In this case, as the colors are linearly converted, the brightest color Q in the original color distribution is converted into the brightest color T in the transformed color distribution. Similarly, the darkest color P in the original color distribution is converted into the darkest color S in the transformed color distribution.

The colors between the color C and the color at the point (1, 1, 1) representing white are specular reflective elements from the object by specular reflection of rays from an illuminant, and the colors between the color C and the color at the point (0, 0, 0) representing black are diffused reflective elements from the object by diffused reflection of rays from the illuminant. Hence, as described above, the colors of the projected image of the object displayed in the two-dimensional image stored in the buffer of interest can be converted while maintaining the original shade by lineally transforming specular reflective elements and diffused reflective elements of the color distribution of the object separately. That is, in the case described above, the color of the object displayed in the two-dimensional image is changeable from the color C to the color D.

The color change is based on the theory of the dichromatic reflection model.

In the above-described case, respective specular reflective elements or diffused reflective elements of the color distribution of the object are linearly transformed, meanwhile specular reflective elements or diffused reflective elements can non-linearly be transformed in step S53.

Figure 38A:
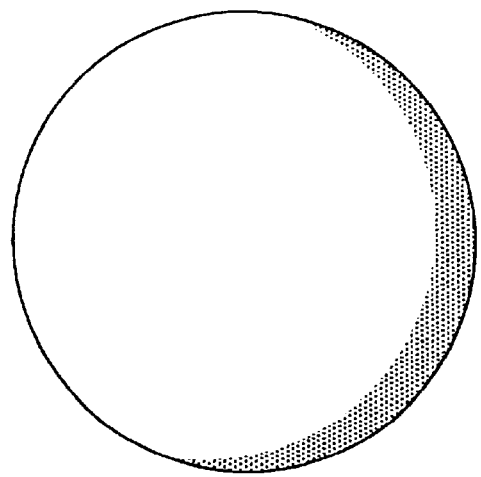
FIGS. 38A and 38B are drawings illustrating the results of the color distribution of an object.
Figure 38B:
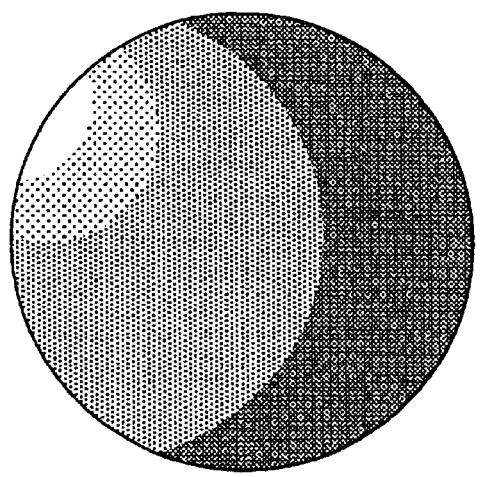

For example, in FIG. 37, by transforming almost all colors between the color C and Q of specular reflective elements to the region around the color D, and transforming the color Q and colors around the color Q to the region around the color T, the object can be provided with strong specular reflection on a limited part of the object. In this case, the entirely bright object having rich diffused reflection (as shown in FIG. 38A) can be changed to the object with strong specular reflection at a part thereof as shown in FIG. 38B.

As described above, non-linear transformation of diffused reflective elements or specular reflective elements enables the region of specular reflection on the object to be narrowed or broadened, or enables the intensity of specular reflection to be changed, hence the material tone of the object can be changed.

The generation of the strong reflection at a part of an object, as illustrated above, is generally due to a small surface roughness of the object. Accordingly, the surface of the object can be changed to a smoother surface by changing the color distribution.

When the illumination change process is commanded, in step S53 in FIG. 36, the colors between the color C and Q of specular reflective elements in FIG. 37 are converted so as to be distributed along from the color C to the color of a new illuminant.

Since the brightest color in the color distribution of the object is considered as a color of the illuminant, an apparent effect in which the illuminant looks to be changed to a new one can be obtained by transforming the colors distributed from the color C to the brightest color Q, to the colors distributed from the color C to the color of the new illuminant.

Referring to step S17 in FIG. 7, the erasing is described. As described above, since the erasing is to eliminate a part of the two-dimensional image stored in the image buffer, the erasing can basically be performed by the following steps. The first is the copying of the image buffer as the buffer of interest, which stores the two-dimensional image to be erased, to store the expanded image in the paste buffer, the second is the erasing for eliminating a part of the expanded image stored in the paste buffer, and the last is the pasting to paste the projected image, corresponding to the expanded image, on the original position in the buffer of interest.

Figure 39:
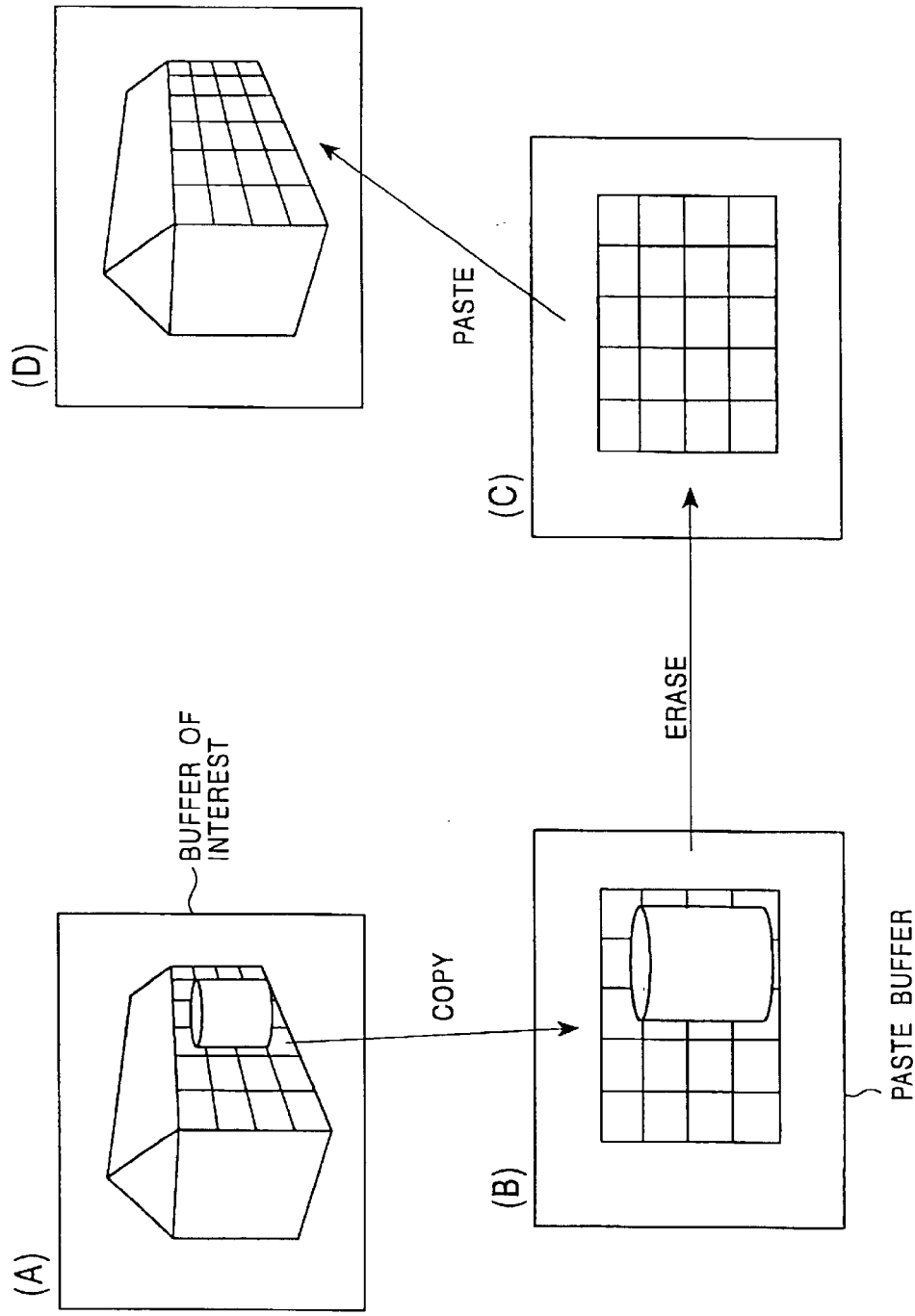
FIG. 39 consists of drawings (A), (B), (C), and (D) illustrating erasing.

However, in the case of erasing the cylinder buried in a grid pattern wall in the two-dimensional image as shown in FIG. 39A, sequential processing from the copying to store the wall of the expanded image in the paste buffer as shown in FIG. 39B to the erasing of simply eliminating the part of the cylinder followed by the pasting, results in an unnatural two-dimensional image without any design at the part where the cylinder originally existed.

Therefore, the erasing can eliminate a part of the expanded image, and can reproduce the eliminated part of background.

That is, for example, in the case of eliminating the cylinder buried in the grid pattern wall in the two-dimensional image, shown in FIG. 39A, when the expanded image of the wall is stored in the paste buffer, as shown in FIG. 39B, by performing the copying, the erasing can eliminate the cylinder part, and can render the background corresponding to the eliminated part. Hence, the grid pattern is entirely drawn on the expanded image of the paste buffer, as shown in FIG. 39C.

Accordingly, the cylinder is eliminated as shown in FIG. 39D by the pasting with the expanded image as described above, and further the natural two-dimensional image with grid pattern is reproduced at a part where the cylinder originally existed.

As described above, the methods of eliminating a part of the image, and reproducing a background having the eliminated part, which are disclosed in, for example, Japanese Unexamined Patent Publication No. 9-128529 (corresponding to European Unexamined Patent Publication No. 772,157) and 10-105700 (corresponding to U.S. Pat. No. 5,892,853) both being of the same assignee as this application, may be employed.

In the embodiment described heretofore, copying processing is performed such that the expanded image is formed only of a single surface of the three-dimensional object contained in the two-dimensional displayed image stored in the buffer of interest, and such a sole expanded image is stored in the paste buffer. This, however, is only illustrative and the copying processing may be executed such that expanded images are formed of two or more adjacent surfaces on the three-dimensional object contained in the two-dimensional displayed image stored in the buffer of interest and these expanded images are collectively stored in the paste buffer.

Figure 40B:
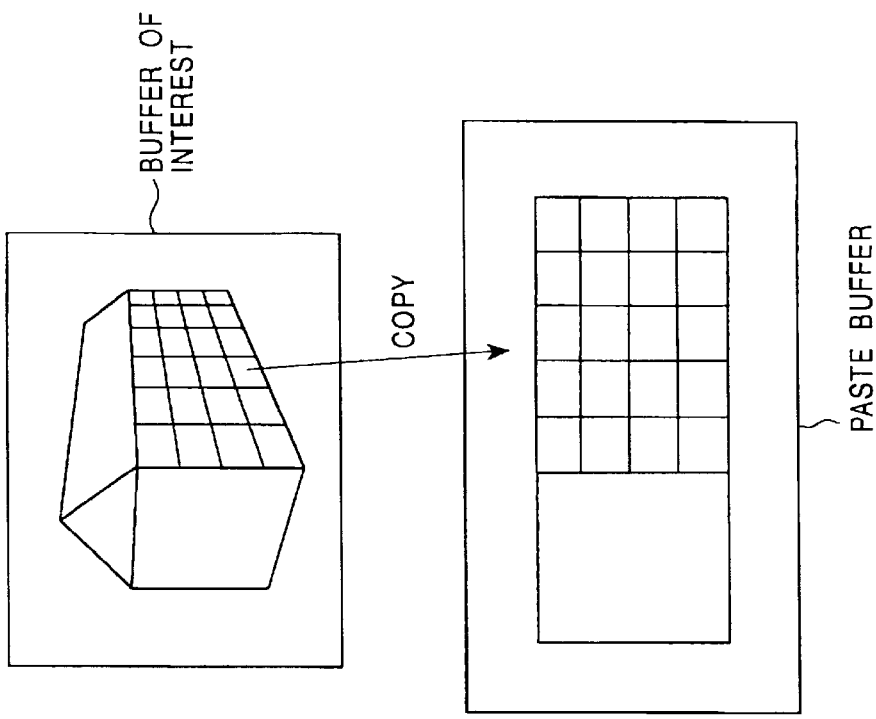
FIGS. 40A and 40B are illustrations of copying processing.
Figure 40A:
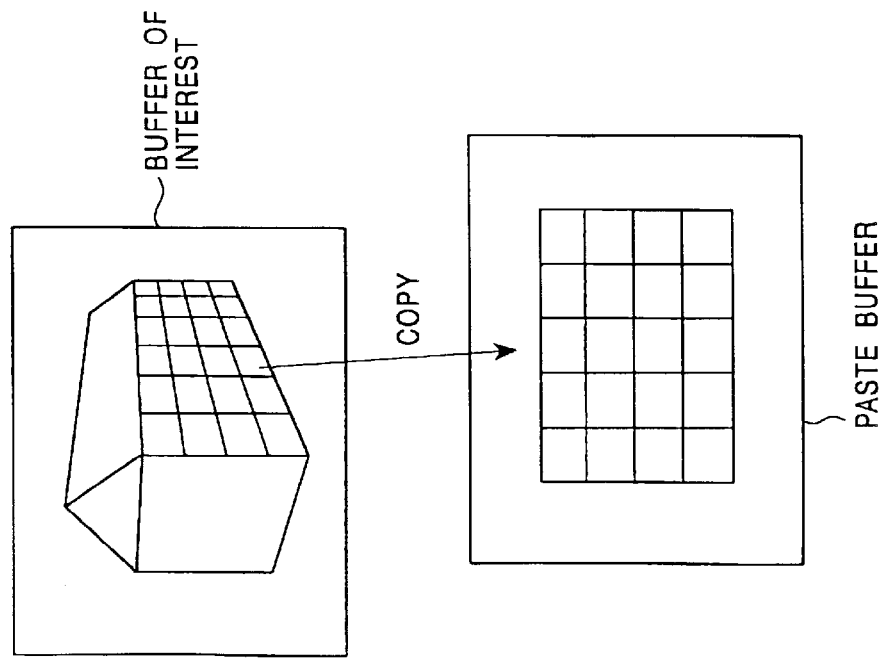

FIG. 40A shows, by way of example, a process in which only a single surface of a three-dimensional object is developed into expanded image. Referring to this Figure, it is assumed that the buffer of interest stores a two-dimensional image containing an image of a house as a three-dimensional object. The house has a wall on which a lattice-like pattern is rendered and an adjacent plain wall. When consecutive characters or a continuous pattern is to be rendered on these two walls, the copying processing is executed first on the wall having the lattice pattern. Namely, the expanded image of this wall is stored in the paste buffer and retouching such as rendering characters or pattern is effected on the stored expanded image. The pasting processing is then executed to paste the lattice-pattern wall having the characters or pattern rendered thereon. The described operation is repeatedly conducted for the plain wall. Namely, expanded image of the plain wall is formed through the copying processing and stored in the paste buffer. Characters or a pattern is rendered on the stored expanded image of the plain wall, and the image of the plain wall now carrying characters or the pattern is set back to the house image by the pasting processing. It will be seen that this operation is quite troublesome because the surfaces defining the three-dimensional objects are processed, i.e., developed, retouched and pasted, in a one-by-one fashion. In addition, it is not easy to render a character string or continuous pattern that extends over two ore more surfaces defining the three-dimensional object.

Referring now to FIG. 40B, expanded images are formed of both the wall having the lattice pattern and the adjacent plain wall, and these expanded images are stored in the paste buffer. In this case, character string or pattern can easily be drawn on the consecutive two walls, i.e., the wall having the lattice pattern and the plain wall.

Pasting operation is also possible such that the expanded images of two or more consecutive surfaces stored in the paste buffer are simultaneously set back to the corresponding positions on the three-dimensional object.

Thus, according to the present invention, an inverse transformation expression for developing the image of a surface constituting part of three-dimensional object in a two-dimensional displayed image into a two-dimensional expanded image is determined based on the shape information and the characteristic point designated by the user. Thus, the image of a surface defining part of the three-dimensional object is transformed into an expanded image in accordance with this inverse transformation expression. The invention also determines, in accordance with the shape information and the characteristic point as designated by the user, a forward transformation expression for transforming the expanded image into a projected image. The projected image formed through the processing in accordance with the forward transformation expression is pasted to an area which is identified by the characteristic point on the two-dimensional displayed image. It is therefore easy to effect three-dimensional editorial work or other types of retouching on the image of a three-dimensional object contained in a two-dimensional displayed image.

Therefore, when a picture of an object taken by the camera 9 is available, the image processing apparatus of FIG. 3 enables the position, shape or texture of the object without requiring taking the picture of the object again and again. This image processing apparatus also can be used by a designer when the designer wishes to effect trimming or retouching on the image taken up through a camera. Further, the image processing apparatus can be employed in, for example, preparation of virtual-reality space which is now finding spreading use, as well as for various editorial purposes. Obviously, the image processing apparatus of this embodiment can process not only the image of an actual objet taken up by a camera, but also images obtained through photographing paintings or pictures, as well as images formed by using computer graphics techniques.

Thus, a series of operations are executed including the copying processing effected on a surface of a three-dimensional object contained in a two-dimensional displayed image stored in a buffer of interest, storing the result of the copying processing in a paste buffer, retouching the image thus stored in the paste buffer, and pasting the retouched image to the original surface of the three-dimensional object. In this series of operations, the pasting processing is performed by using the same shape information and characteristic point as those used in the copying processing. This is because in the process of the kind described the shape information and the characteristic point used in the pasting processing are naturally identical to those employed in the copying processing. It is laborious and wasteful for the user to input again the same shape information and characteristic point when pasting the retouched image back to the original surface of the three-dimensional object. Further, there is a risk that the user when pasting may designate a characteristic point which is not identical to that used in the copying processing, even if an automatic correcting processing is executed. In such a case, the region in which the retouched projected image is pasted is not registered with the region in the two-dimensional image from which the expanded image is derived, with the result that an unnatural two-dimensional image is formed as a result of the pasting.

It is also to be understood that the image processing apparatus shown in FIG. 3 can equally be used both for still and moving two-dimensional images.

Figure 41:
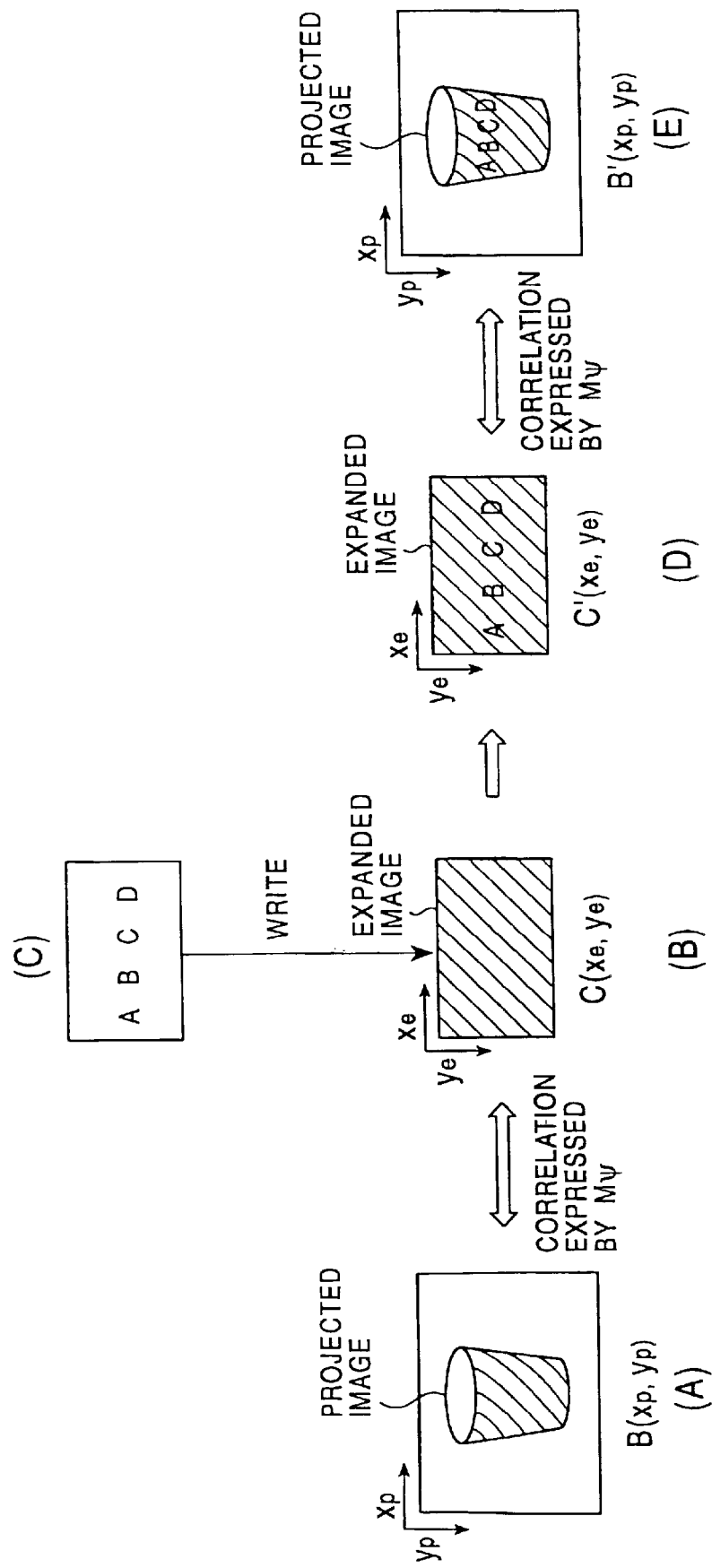
FIG. 41 is an illustration of a copy and paste processing performed on a still picture.

A description will be given first as to the case where the two-dimensional image to be obtained is a still image. It is assumed here that the two-dimensional image to be processed is a still image (projected image) of a three-dimensional object such as, for example, a cylindrical body as shown in Segment (A) of FIG. 41. In this case, the copying operation is conducted by determining, based on the shape information and the characteristic point that are designated by the user, the function $M\psi$ of the equation (10) which expresses the correlation between coordinates $(x_p, y_p)$ of a point on the projected image of the cylindrical body displayed in the still image and the coordinates $(x_e, y_e)$ of the corresponding point on the expanded image. Then, based on the function $M\psi$, the pixel value B $(x_p, y_p)$ of a point $(x_p, y_p)$ on the projected image in the still picture is written in the paste buffer as the pixel value C $(x_e, y_e)$ of the corresponding point $(x_e, y_e)$ on the expanded image, whereby an expanded image of the side or peripheral surface of the cylindrical body developed into two-dimensional image is obtained as shown in Segment (B) of FIG. 41. The projected image of the cylindrical body shown in Segment (A) of FIG. 41 is an image which is obtained when the cylindrical body, having the peripheral surface hatched as illustrated, is viewed from a level slightly above the top face of the cylindrical body. The expanded image of the peripheral surface of the cylindrical body, therefore, is patterned by hatching as shown in Segment (B) of FIG. 41.

For the purpose of the writing a string of characters "ABCD" on the peripheral surface of the cylindrical body shown in Segment (A) of FIG. 41, characters "A", "B", "C" and "D" are written on the expanded image of the peripheral surface shown in Segment (B) of FIG. 41, in the same way as writing these characters on a two-dimensional surface as shown in Segment (C) of FIG. 41, whereby an expanded image carrying the characters "A", "B", "C" and "D" is obtained as shown in Segment (D) of FIG. 41. The pixel value of a point, i.e., the coordinates of a pixel $(x_e, y_e)$ on the expanded image of the peripheral surface of the cylindrical body, carrying the characters "A", "B", "C" and "D", is expressed by C'$(x_e, y_e)$. Then, the pasting processing is executed by writing into the buffer of interest, the pixel value C'$(x_e, y_e)$ of the point on the expanded image as the pixel value B'$(x_p, y_p)$ of the corresponding point $(x_p, y_p)$ on the projected image, based on the same function $M\psi$ as that used in the copying processing, whereby a two-dimensional image containing a natural projected image, equivalent to an image obtained by photographing the cylindrical body and carrying the character string "ABCD" on and along the peripheral surface, is obtained as shown in Segment (E) of FIG. 41.

It will be seen that the pasting processing is executed by using the shape information and the characteristic point which are the same as those used in the copying processing.

Figure 42:
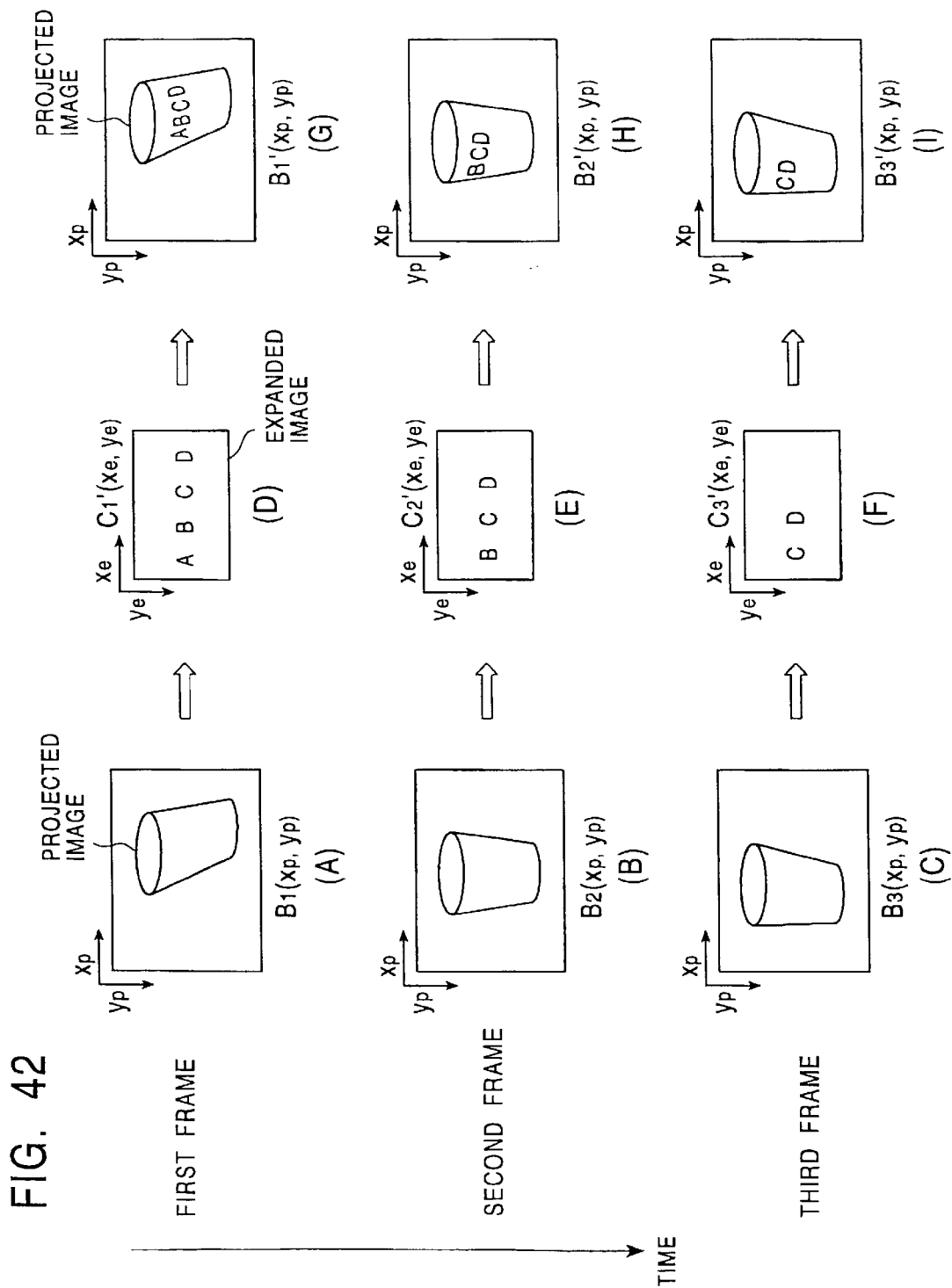
FIG. 42 is an illustration of a copy and paste processing performed on a dynamic image.

A description will now be given of a case in which the two-dimensional image to be processed is a moving picture which is formed of first to third frames (or fields) as shown in Segments (A), (B) and (C) of FIG. 42. In this case, the series of processings including the copying processing for transforming the projected image in the two-dimensional displayed image into an expanded image, retouching the expanded image and pasting the retouched image back to the projected image are executed in the following manner. This series of processings will be referred to as "copy and paste processing", hereinafter. The first to third frames shown in Segments (A) to (C) of FIG. 42 illustrate images of a cylindrical body which is moving leftward while rotating clockwise when viewed from the top, as seen from a level slightly above the top of the cylindrical body. This is equivalent to images that are obtained when the viewer moves counterclockwise around the cylindrical body while the latter is moving leftward.

In this case, the copying operation is conducted by determining, based on the shape information and the characteristic point that are designated by the user, the function $M\psi$ of the equation (10) which expresses the correlation between coordinates $(x_p, y_p)$ of a point on the projected image of the cylindrical body displayed in the first frame (Segment (A) of FIG. 42) and the coordinates $(x_e, y_e)$ of the corresponding point on the expanded image. Then, based on the function $M\psi$, the pixel value $B_1(x_p, y_p)$ of a point $(x_p, y_p)$ on the projected image in the first frame is written in the paste buffer as the pixel value $C_1(x_e, y_e)$ of the corresponding point $(x_e, y_e)$ on the expanded image, whereby an expanded image of the side or peripheral surface of the cylindrical body shown in the first frame developed into two-dimensional image is obtained.

For the purpose of the writing a string of characters "A", "B", "C" and "D" on the peripheral surface of the cylindrical body in the same way as that explained before with reference to Segment (A) of FIG. 41, characters "A", "B", "C" and "D" are written on the expanded image of the peripheral surface, whereby an expanded image carrying the characters "A", "B", "C" and "D" is obtained as shown in Segment (D) of FIG. 42. The pixel value of a point, i.e., the coordinates of a pixel $(x_e, y_e)$n on the peripheral surface of the cylindrical body shown in the first frame, now carrying the characters "A", "B", "C" and "D", is expressed by $C_1'(x_e, y_e)$. Then, the pasting processing is executed by writing into the buffer of interest, the pixel value $C_1'(x_e, y_e)$ of the point on the expanded image as the pixel value $B_1'(x_p, y_p)$ of the corresponding point $(x_p, y_p)$ on the projected image of the first frame, based on the same function $M\psi$ as that used in the copying processing, whereby a first frame image containing a natural projected image, equivalent to an image obtained by photographing the cylindrical body carrying the character string "ABCD" on and along the peripheral surface, is obtained as shown in Segment (G) of FIG. 42.

Then, a copying processing is executed on the image contained in the second frame. The copying operation is conducted by determining, based on the shape information and the characteristic point that are designated by the user, the function $M\psi$ of the equation (10) which expresses the correlation between coordinates $(x_p, y_p)$ of a point on the projected image of the cylindrical body displayed in the second frame (Segment (B) of FIG. 42) and the coordinates $(x_e, y_e)$ of the corresponding point on the expanded image. Then, based on the function $M\psi$, the pixel value $B_2(x_p, y_p)$ of a point $(x_p, y_p)$ on the projected image in the second frame is written in the paste buffer as the pixel value $C_2(x_e, y_e)$ of the corresponding point $(x_e, y_e)$ on the expanded image, whereby an expanded image of the side or peripheral surface of the cylindrical body of the second frame is obtained.

The purpose of the process which is being described is to obtain a projected image of the cylindrical body carrying the character string "ABCD" on and along the peripheral surface thereof. It is recalled here that the image of the cylindrical body is presented as a moving picture such that the cylindrical body rotates clockwise. Accordingly, even though all the characters ABC and D are visible in the first frame image shown in Segment (G) of FIG. 42, the leftmost character "A" becomes invisible in the final projected image of the second frame. Therefore, characters "B", "C" and "D", except for the invisible character "A", are rendered on the second frame expanded image of the peripheral surface of the cylindrical body, as shown in Segment (E) of FIG. 42, such as to leave a grater space between the character "D" and the edge of the expanded image than in Segment (D) of this Figure. The pixel value of a point, i.e., the coordinates of a pixel $(x_e, y_e)$, on the expanded image of the peripheral surface of the cylindrical body image of the second frame is expressed by $C_2'(x_e, y_e)$. Then, the pasting processing is executed by writing into the buffer of interest, the pixel value $C_2'(x_e, y_e)$ of the point on the expanded image as the pixel value $B_2'(x_p, y_p)$ of the corresponding point $(x_p, y_p)$ on the projected image of the second frame, based on the same function $M\psi$ as that used in the copying processing, whereby a second frame image containing a natural projected image, equivalent to an image obtained by photographing the cylindrical image which has been rotated clockwise to hide the character "A", is obtained as shown in Segment (H) of FIG. 42.

Then, a copying processing is executed on the image contained in the third frame. The copying operation is conducted by determining, based on the shape information and the characteristic point that are designated by the user, the function $M\psi$ of the equation (10) which expresses the correlation between coordinates $(x_p, y_p)$ of a point on the projected image of the cylindrical body displayed in the third frame (Segment (C) of FIG. 42) and the coordinates $(x_e, y_e)$ of the corresponding point on the expanded image. Then, based on the function $M\psi$, the pixel value $B_3(x_p, y_p)$ of a point $(x_p, y_p)$ on the projected image in the third frame is written in the paste buffer as the pixel value $C_3(x_e, y_e)$ of the corresponding point $(x_e, y_e)$ on the expanded image, whereby an expanded image of the side or peripheral surface of the cylindrical body of the third frame is obtained.

The image of the cylindrical body is presented as a moving picture such that the cylindrical body rotates clockwise. Accordingly, even though the characters "B", "C" and "D" are visible in the second frame image shown in Segment (H) of FIG. 42, the leftmost character "B" becomes invisible in the final projected image of the third frame. More specifically, the character "A" which is visible in the first frame projected image becomes invisible in the second frame projected image and further the character "B" disappears in the final projected image of the third frame. Therefore, only the characters "C" and "D", except for the invisible character "A" and "B", are rendered on the third frame expanded image of the peripheral surface of the cylindrical body, as shown in Segment (F) of FIG. 42, such as to leave a further grater space between the character "D" and the edge of the expanded image than in Segment (E) of this Figure. The pixel value of a point, i.e., the coordinates of a pixel $(x_e, y_e)$, on the expanded image of the peripheral surface of the cylindrical body image of the third frame is expressed by $C_3'(x_e, y_e)$. Then, the pasting processing is executed by writing into the buffer of interest, the pixel value $C_3'(x_e, y_e)$ of the point on the expanded image as the pixel value $B_3'(x_p, y_p)$ of the corresponding point $(x_p, y_p)$ on the projected image of the third frame, based on the same function $M\psi$ as that used in the copying processing, whereby a third frame image containing a natural projected image, equivalent to an image obtained by photographing the cylindrical image which has been further rotated clockwise to hide the characters "A" and "B", is obtained as shown in Segment (H) of FIG. 42.

It will be seen from the foregoing description that three-dimensional editorial work or other retouching operations can easily be effected on a two-dimensional image regardless of whether the image is moving or still.

The above-described technique, however, is laborious particularly when the two-dimensional image to be processed is a moving picture image, because the retouching operation such as rendering characters has to be executed on the expanded image of a three-dimensional object in each of a plurality of frames.

In addition, in the case of an object of the type described in connection with FIG. 42, the user is obliged to conduct different types of retouching work on the expanded images of different frames, such that all the characters "A" to "D" are written for the first frame, characters "B", "C" and "D" except for "A" are written for the second frame and only the characters "C" and "D" are written for the third frame. This also heavily burdens the user.

A description will now be given of an embodiment which enables easier copy and paste processing on a moving two-dimensional picture image.

A description will first given of a case where no part of the image of the three-dimensional object becomes invisible despite the motion of the picture.

Figure 43:
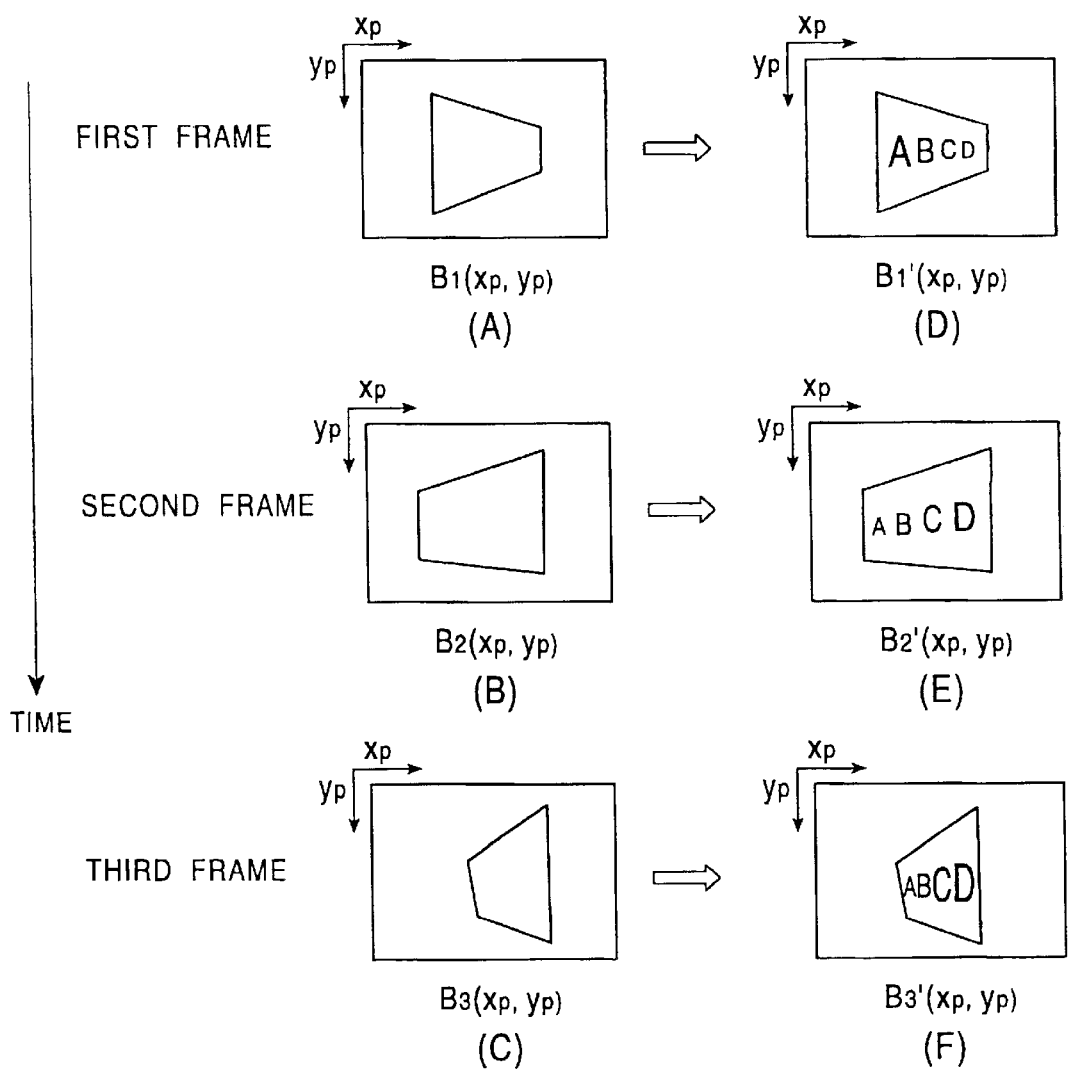
FIG. 43 is an illustration of a copy and paste processing executed on a moving picture composed of a plurality of frames showing a three-dimensional object, where the portion visible in one frame is also visible in other frames.

Segments (A), (B) and (C) of FIG. 43 show images carried by first to third frames of a moving picture of a rectangle which is a surface of a rectangular parallelepiped body. It is intended here that this moving picture is processed into a moving picture composed of the first to third frames each having a character string "ABCD" as shown in Segments (D) to (F) of FIG. 43.

The frames of the moving picture shown in Segments (A) to (C) of FIG. 43 illustrate the rectangle as a surface of the rectangular parallelepiped body which is rotating clockwise when viewed from the upper side. This is equivalent to images obtained when a photographer moves counterclockwise around the rectangular parallelepiped body while photographing.

It will be understood that the rectangle as a plane is wholly-visible, i.e., the projected images show the entire portion of the rectangle, even when the rectangle is rotated or translated in a three-dimensional space, although the two-dimensional shape and size, i.e., the contour and size of the projected image, may vary, unless the angle between the visual axis and a line normal to the plane of the rectangle exceeds 90 degrees.

A copying processing is executed on the image contained in the third frame. The copying operation is conducted by determining, based on the shape information and the characteristic point that are designated by the user, the function $M\psi$ of the equation (10) which expresses the correlation between coordinates $(x_p, y_p)$ of a point on the projected image of the rectangle displayed in the first frame (Segment (A) of FIG. 43) and the coordinates $(x_e, y_e)$ of the corresponding point on the expanded image. Then, based on the function $M\psi$, the pixel value $B_1(x_p, y_p)$ of a point $(x_p, y_p)$ on the projected image in the first frame is written in the paste buffer as the pixel value $C_1(x_e, y_e)$ of the corresponding point $(x_e, y_e)$ on the expanded image, whereby an expanded image of one surface of the rectangular parallelepiped body of the first frame is obtained.

In this case, the object to be processed is the image of a rectangle which is one of the surfaces presented by a parallelepiped body. The correlation between a point $(x_0, y_0, z_0)$ in the three-dimensional space and the corresponding point $(x_e, y_e)$ on the expanded image is expressed by the aforesaid equation (12). The point $(x_e, y_e)$ is correlated to the corresponding point $(x_p, y_p)$ on the projected image of the rectangle by the aforesaid equation (13).

Coordinates of four apices of the tetragon providing the projected image of the rectangle are defined, clockwise starting from the left upper apex, as $P_1(=(x_{P1}, y_{P1})$, $P_2(=(x_{P2}, y_{P2})$, $P_3(=(x_{P3}, y_{P3})$, and $P_4(=(x_{P4}, y_{P4})$. At the same time, four apices of the expanded image of the rectangle are termed as $E_1$, $E_2$, $E_3$ and $E_4$, clockwise starting from the left upper apex. Thus, the apices $P_1$, $P_2$, $P_3$ and $P_4$ of the projected image correspond to the apices $E_1$, $E_2$, $E_3$ and $E_4$ of the expanded image, respectively. The coordinates of the points $E_1$, $E_2$, $E_3$ and $E_4$ on the paste buffer coordinate system are defined as $(0, 0)$, $(L_W, 0)$, $(L_W, L_H)$ and $(0, L_H)$, respectively. As stated before, $L_W$ and $L_H$ respectively represent the width and height of the expanded image of the rectangle. The equation (14) is derived from the equation (13) and the term M in the equation (13) is determined by solving the equation (14).

Therefore, the function $M\psi$ in the equation (10), that determines the correlation between the point $(x_p, y_p)$ on the projected image of the rectangle displayed in the first frame (Segment (A) of FIG. 43) and the coordinates $(x_e, y_e)$ of the corresponding point on the expanded image, can be determined when the user designates, as the shape information, that the projected image to be processed is an image of a rectangle and designates, as the characteristic points, the coordinates of the four apices of the rectangle on the two-dimensional displayed image. More specifically, the term M can be determined based on the characteristic points and $\psi$ can be determined based on the shape information.

Figure 44:
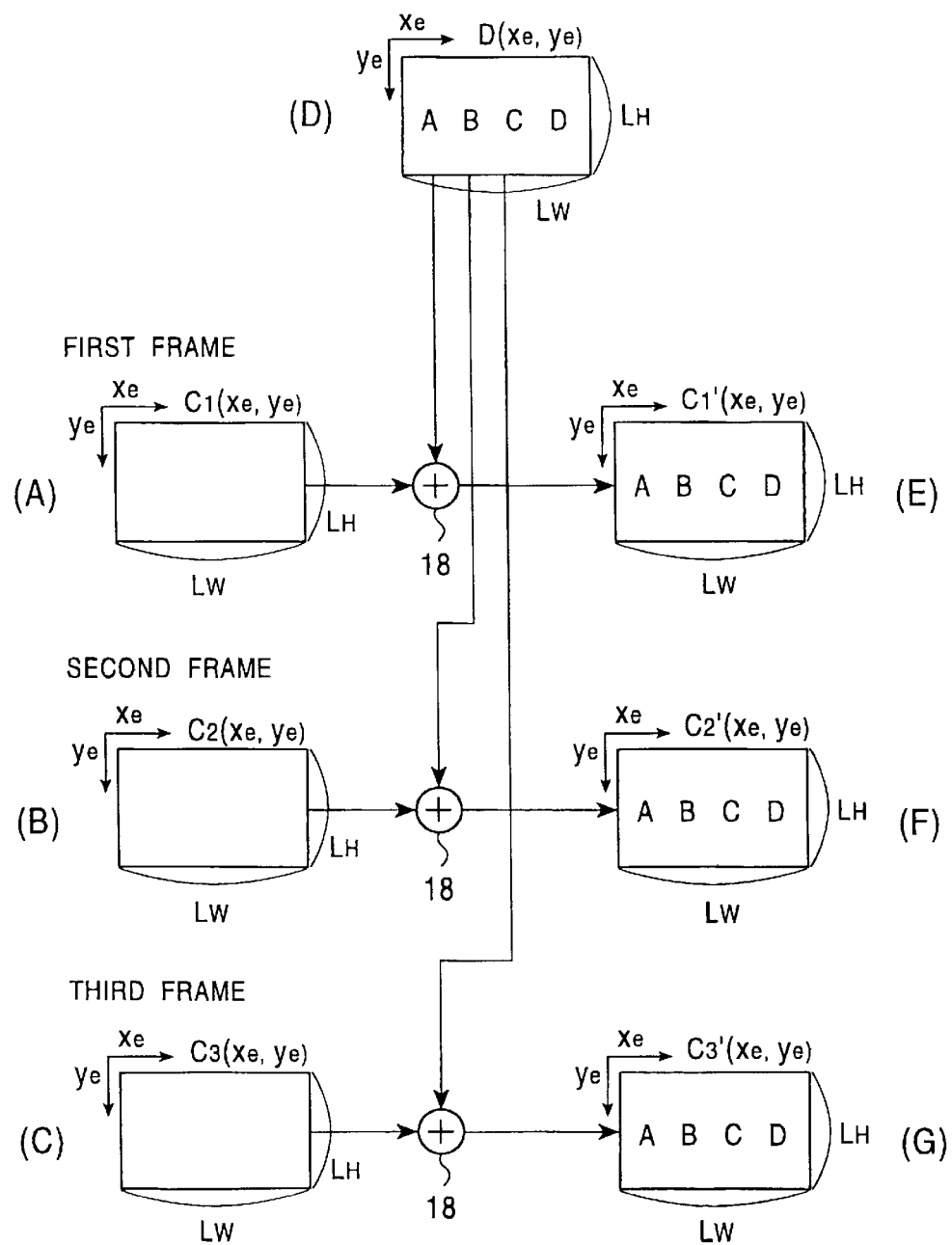
FIG. 44 is a detailed illustration of the copy and paste processing executed on a moving picture composed of a plurality of frames showing a three-dimensional object, where the portion visible in one frame is also visible in other frames.

Then, based on the function $M\psi$, the pixel value $B_1(x_p, y_p)$ of a point $(x_p, y_p)$ on the projected image in the first frame is written in the paste buffer as the pixel value $C_1(x_e, y_e)$ of the corresponding point $(x_e, y_e)$ on the expanded image, whereby an expanded image of one surface of the rectangular parallelepiped body of the first frame is obtained, as shown in Segment (A) of FIG. 44.

The described operation is performed also on the second and third frames. Namely, the function $M\psi$ in the equation (10), that determines the correlation between the point $(x_p, y_p)$ on the projected image of the rectangle displayed in each of the second and third frames and the coordinates $(x_e, y_e)$ of the corresponding point on the expanded image, can be determined when the user designates the coordinates of the four apices of the rectangle on the two-dimensional image displayed in each frame. It will be appreciated that there is no need for designation of the shape information, because the shape information used in the processing of the first frame image can be used also for each of the second and third frames. Expanded images of one surface of the rectangular parallelepiped body contained in the second and third frames can be formed based on the function $M\psi$ thus determined.

More specifically, for the image on the second frame, the pixel value $B_2(x_p, y_p)$ of a point $(x_p, y_p)$ on the projected image in the second frame is written in the paste buffer based on the function $M\psi$, as the pixel value $C_2(x_e, y_e)$ of the corresponding point $(x_e, y_e)$ on the expanded image, whereby an expanded image of one surface of the rectangular parallelepiped body of the second frame is obtained, as shown in Segment (B) of FIG. 44. Similarly, for the third frame, the pixel value $B_3(x_p, y_p)$ of a point $(x_p, y_p)$ on the projected image in the third frame is written in the paste buffer based on the function $M\psi$, as the pixel value $C_3(x_e, y_e)$ of the corresponding point $(x_e, y_e)$ on the expanded image, whereby an expanded image of one surface of the rectangular parallelepiped body of the third frame is obtained, as shown in Segment (C) of FIG. 44.

The expanded images are thus formed of the rectangle for the respective frames of the moving picture, and are stored in the paste buffers and displayed on the display unit 5. In this case, therefore, three image buffers are used as the paste buffers. The projected images contained in the first to third frames are of an identical rectangle. The expanded images of the first to third frames, shown in Segments (A) to (C) of FIG. 44, therefore, have the same values of height $L_H$ and the width $L_W$ of the rectangle.

Then, in the image processing apparatus of FIG. 4, one of the image buffers which is not occupied is selected and used as a buffer which stores the expanded image of the whole of the rectangle to be processed. This image buffer will be referred to also as a "paint buffer". A storage area that can store the expanded image of the whole of the rectangle to be processed is secured in the paint buffer. This storage area will be referred to also as a "overall expanded image storage area". In this case, the width and height of the expanded image, formed by developing the whole or entire part of the rectangle to be processed, are equal to the width $L_W$ and height $L_H$ of the expanded images of the rectangle contained in the first to third frames. Therefore, an area having a width $L_W$ and height $L_H$ is secured as the overall expanded image storage area, as shown in Segment (D) of FIG. 44.

In the meantime, the user while monitoring the expanded image displayed on the display unit 5 operates the input unit 5, so as to render the characters "A", "B", "C" and "D" at desired addresses in the overall expanded image storage area. The thus rendered characters are written in the overall expanded image storage area of the paint buffer by the operation of the paint processor 18, as shown in Segment (D) of FIG. 44.

The position of a point in the overall expanded image storage area secured in the paint buffer is expressed in terms of a two-dimensional coordinate system having an X-axis and a Y-axis which extend, respectively, to the right and downward from an origin which is located on the left upper corner of the storage area. This coordinate system is the same as the paste buffer coordinate system. The pixel value (stored value) of a point $(x_e, y_e)$ in the overall expanded image storage area is expressed as $D(x_e, y_e)$.

Character images are thus rendered by the user and are stored in the overall expanded image storage area. The paint processor 18 then cuts at least part out of the overall expanded image storage area. This cut-out part will be referred to as a "cut-out region", hereinafter. Retouching such as an editorial work is effected on the basis of the cut-out region, on the expanded image of rectangle which is contained in each of the first to third frames and which is stored in each paste buffer.

In the illustrated case, the paint processor 18 cuts out the entirety of the overall expanded image storage area. Thus, the cut-out region is the same as the entirety of the overall expanded image storage area. The paint processor 18 then writes the contents of the cut-out region onto the expanded images of rectangle displayed in the first to third frames.

This operation will be described in more detail. The pixel value (stored value) of a point $(x_e, y_e)$ in the overall expanded image storage area is expressed as $D(x_e, y_e)$. A function, which is "1" where the pixel value $D(x_e, y_e)$ is not "0" and "0" where the pixel value $D(x_e, y_e)$ is 0, is expressed by $\alpha(x_e, y_e)$. The results of writing of the content carried by the cut-out region onto the pixels $(x_e, y_e)$ of the expanded images of the rectangle shown in the first, second and third frames are respectively represented by $C_1'(c_e, y_e), C_2'(x_e, y_e)$ and $C_3'(x_e, y_e)$. The paint processor 18 then determines, in accordance with the following equation (37), the expanded images $C_1'(x_e, y_e), C_2'(x_e, y_e)$ and $C_3'(x_e, y_e)$ of the rectangle in the first, second and third frames in which the contents of the respective cut-out regions have been written.

$$C_1'(x_e, y_e) = \alpha(x_e, y_e)D(x_e, y_e) + (1 - \alpha(x_e, y_e))C_1(x_e, y_e)$$

$$C_2'(x_e, y_e) = \alpha(x_e, y_e)D(x_e, y_e) + (1 - \alpha(x_e, y_e))C_2(x_e, y_e)$$

$$C_3'(x_e, y_e) = \alpha(x_e, y_e)D(x_e, y_e) + (1 - \alpha(x_e, y_e))C_3(x_e, y_e) \tag{37}$$

As a result of this processing, the expanded images of the rectangle contained in the first to third frames as shown in Segments (A) to (C) of FIG. 44 are transformed into expanded images carrying the character string "ABCD" as shown in Segments (E) to (G) of the same Figure.

The characters "A", "B", "C" and "D" to be added to each frame may be written in a manner as if these characters are rendered by a translucent paint. This can be achieved by setting the term $\alpha(x_e, y_e)$ to a value which is greater than 0 but less than 1.0, e.g., 0.5, in the equation (37) shown above.

Then, a pasting processing is executed by writing into the buffer of interest (image buffer in which the first frame data is stored) the pixel value $C_1'(x_e, y_e)$ of the point $(x_e, y_e)$ on the expanded image (Segment (E) of FIG. 44) of the rectangle contained in the first frame which now carries the character string "ABCD", as the pixel value $B_1'(x_p, y_p)$ of the corresponding point $(x_p, y_p)$ on the projected image of the first frame, based on the same function $M\psi$ as that used in the copying processing on the first frame. As a result, a first frame image containing a projected image of the rectangle carrying the character string "ABCD" is obtained as shown in Segment (D) of FIG. 43.

Similarly, a pasting processing is executed for the second frame. This is effected by writing into the buffer of interest (image buffer in which the second frame data is stored) the pixel value $C_2'(x_e, y_e)$ of the point $(x_e, y_e)$ on the expanded image (Segment (F) of FIG. 44) of the rectangle contained in the second frame which now carries the character string "ABCD", as the pixel value $B_2'(x_p, y_p)$ of the corresponding point $(x_p, y_p)$ on the projected image of the second frame, based on the same function $M\psi$ as that used in the copying processing on the second frame. As a result, a second frame containing the projected image of the rectangle carrying the character string "ABCD" is obtained, as shown in Segment (E) of FIG. 43.

Likewise, a pasting processing is executed for the third frame. This is effected by writing into the buffer of interest (image buffer in which the third frame data is stored) the pixel value $C_3'(x_e, y_e)$ of the point $(x_e, y_e)$ on the expanded image (Segment (G) of FIG. 44) of the rectangle contained in the third frame which now carries the character string "ABCD", as the pixel value $B_3'(x_p, y_p)$ of the corresponding point $(x_p, y_p)$ on the projected image of the third frame, based on the same function $M\psi$ as that used in the copying processing on the third frame. As a result, a third frame containing the projected image of the rectangle carrying the character string "ABCD" is obtained, as shown in Segment (F) of FIG. 43.

Thus, the content rendered by the user is written in the overall expanded image storage area of the paint buffer as shown in Segment (D) of FIG. 44, and the entirety of the overall expanded image storage area is extracted as the cut-out region. Editorial work, which is the rendering of the character string "ABCD" in this case, is effected on the expanded images of the rectangle displayed in the first to third frames of the moving picture. It is therefore possible to obtain the desired two-dimensional moving picture, without taking the labor of repeatedly effecting the editorial work such as rendering of the character string on the expanded image of the three-dimensional object separately for the individual frames. In other words, for obtaining the moving picture carrying the character string "ABCD", constituted by projected images of the rectangle presented by three frames, it suffices to render the character string "ABCD" only once.

A description will now be given of a copy and paste processing which is used in a case where different frames of a moving picture provide different visible portions of a three-dimensional object.

Figure 45:
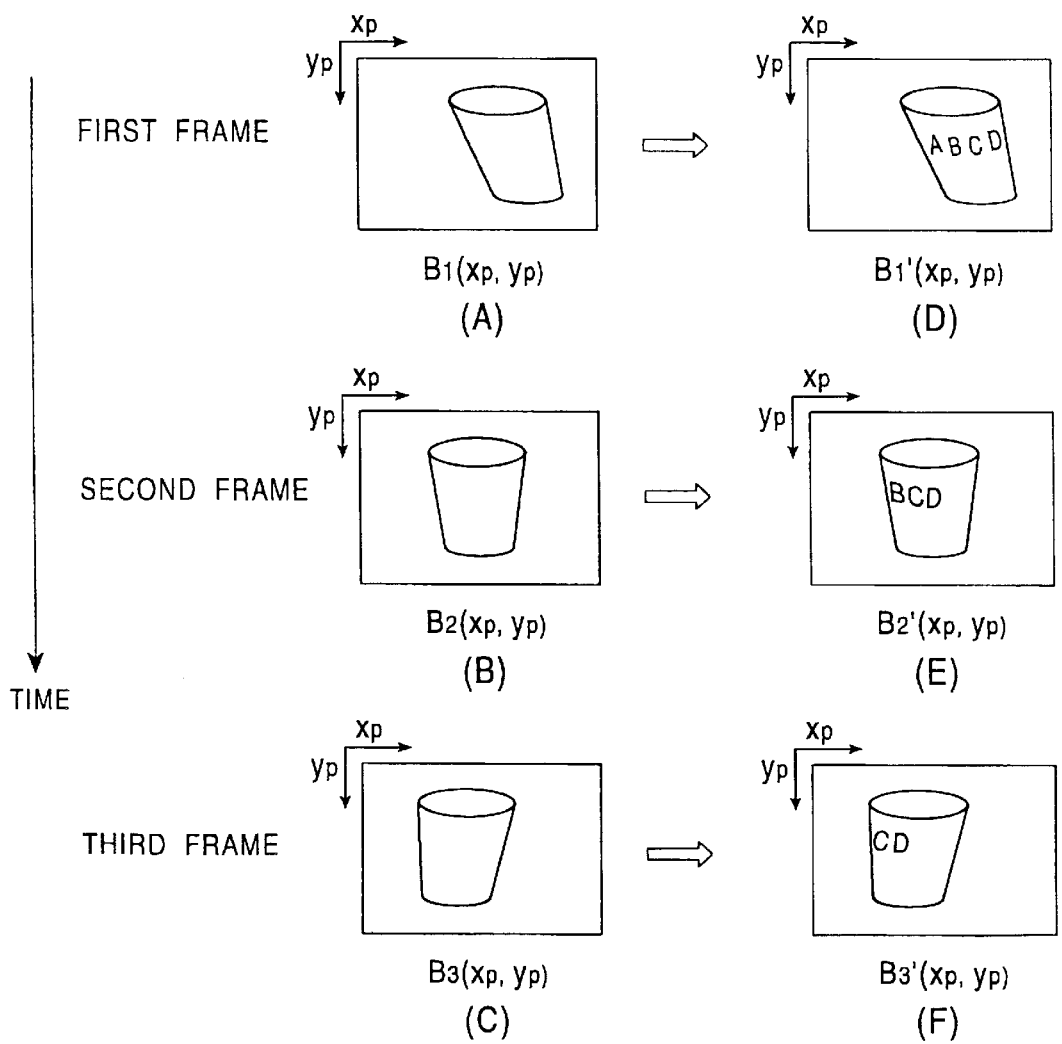
FIG. 45 is an illustration of a copy and paste processing executed on a moving picture composed of a plurality of frames showing a three-dimensional object, where a portion visible in one frame is invisible in other frames.

Segments (A) to (C) of FIG. 45 show images on first to third frames of a moving picture. A cylindrical body is shown as a moving three-dimensional object, by way of example. It is intended here that the moving picture is transformed into a moving picture which shows the cylindrical body carrying a character string "ABCD" on and along its peripheral surface and which is composed of first to third frames as shown in Segments (D) to (F) of FIG. 45.

Segments (A) to (C) of FIG. 45 show projected images of the cylindrical body which is rotating clockwise and moving to the left when viewed from a level slightly above the top surface thereof, as in the case of the images shown in Segments (A) to (C) of FIG. 42.

Since the peripheral surface of the cylindrical body is a three-dimensional curved surface, appearance of the displayed image, as well as the visible portion, i.e., the portion which appears on the displayed two-dimensional image, vary in accordance with rotation or translation of the cylindrical body (or position of the viewer) in the three-dimensional space. For instance, a portion of the peripheral surface which is visible in the image on a frame may completely disappear in the image on another frame of the moving picture.

As in the process described before, the copying operation is conducted by determining, based on the shape information and the characteristic point that are designated by the user, the function $M\psi$ of the equation (10) which expresses the correlation between coordinates $(x_p, y_p)$ of a point on the projected image of the cylindrical body displayed in the first frame (Segment (A) of FIG. 45) and the coordinates $(x_e, y_e)$ of the corresponding point on the expanded image. Then, based on the function $M\psi$, the pixel value $B_1(x_p, y_p)$ of a point $(x_p, y_p)$ on the projected image in the first frame is written in the paste buffer as the pixel value $C_1(x_e, y_e)$ of the corresponding point $(x_e, y_e)$ on the expanded image, whereby an expanded image of the side or peripheral surface of the cylindrical body, corresponding to the projected image contained in the first frame, is obtained.

The object to be processed in this case is the side or peripheral surface of a cylindrical body. For the reasons stated before in connection with FIGS. 21A to 21C, the correlation between the coordinates $(x_0, y_0, z_0)$ of a point on the peripheral surface in the three-dimensional space and the coordinates $(x_e, y_e)$ of the corresponding point are given by the following equation (38).

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} \frac{L_{WI}}{\theta_1}\sin\left(\frac{\theta_1}{L_{WI}}\left(x_e - \frac{L_{WI}}{2}\right)\right) \\ y_e \\ \frac{L_{WI}}{\theta_1}\cos\left(\frac{\theta_1}{L_{WI}}\left(x_e - \frac{L_{WI}}{2}\right)\right) \end{pmatrix} \quad (38)$$

The equation (38) is equivalent to the equation (17), since it is derived from the equation (17) by substituting the equation (15) or (16) for the element "r" or "φ" of the equation (17) and substituting $O_1$ and $L_{W1}$ for θ and $L_W$ of the equation (17), respectively. As stated before, the portion of the curved peripheral surface of the cylindrical body which is visible on the projected image varies in accordance with rotation o translation of the cylindrical body within the three-dimensional space. Therefore, in the equation (17), the value of the factor θ which indicates the angle formed around the center of the top surface of the cylindrical portion by the visible section of the peripheral surface (see FIG. 21A), as well as the value of the factor $L_W$ (length of the side $E_1E_2$ or $E_4E_3$ shown in FIG. 21C) which indicates the width of the expanded image corresponding to the portion of the peripheral surface visible on the projected image, varies according to the frame of the moving picture. In the following description, therefore, symbols $\theta_1, L_{W1}$; $\theta_2, L_{W2}$; $\theta_3, L_{W3}$ are used to indicates the values of the factors θ and $L_W$ obtained with the first, second and third frames, respectively.

It is to be understood that the first to third frames show projected images of an identical cylindrical body. Therefore, the ratios $L_{W1}/\theta_1$, $L_{W2}/\theta_2$ and $L_{W3}/\theta_3$, indicative of the radii of the top surface of the cylindrical bodies in the images of the respective frames, have an identical value.

In regard to the peripheral surface of a cylindrical body, the correlation between the coordinates $(x_p, y_p)$ of a point on the projected image and the coordinates $(x_e, y_e)$ of the corresponding point on the expanded image is expressed by the following equation (39) which is obtained by incorporating the equation (38) in the equation (10).

$$\begin{pmatrix} wx_p \\ wy_p \\ w \end{pmatrix} = M \begin{pmatrix} \psi_1(x_e, y_e) \\ \psi_2(x_e, y_e) \\ \psi_3(x_e, y_e) \\ 1 \end{pmatrix} = M \begin{pmatrix} \frac{L_{WI}}{\theta_1}\sin\left(\frac{\theta_1}{L_{WI}}\left(x_e - \frac{L_{WI}}{2}\right)\right) \\ y_e \\ \frac{L_{WI}}{\theta_1}\cos\left(\frac{\theta_1}{L_{WI}}\left(x_e - \frac{L_{WI}}{2}\right)\right) \\ 1 \end{pmatrix} \quad (39)$$

As will be seen from the equation (11), the matrix M in the equation (39) has eleven elements: $m_{11}$ to $m_{14}$, $m_{21}$ to $m_{24}$ and $m_{31}$ to $m_{33}$. As explained before with reference to FIGS. 21A to 21C, these elements can be determined based on 6 (six) characteristic points: five points having two degrees of freedom and one point having one degree of freedom, and corresponding points on the paste buffer coordinate system, provided that such six characteristic points are designated. Using the matrix M thus determined, it is possible to transform the projected image of the peripheral surface of the cylindrical body into a corresponding expanded image, in accordance with the equation (39).

Figure 46A:
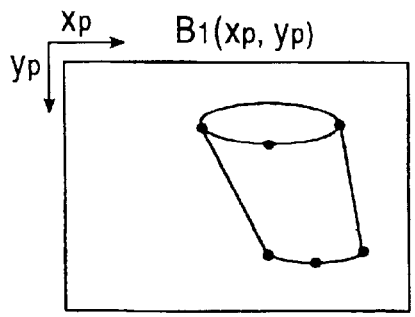
FIGS. 46A to 46C are illustrations of points that are to be designated as being characteristic points.
Figure 47:
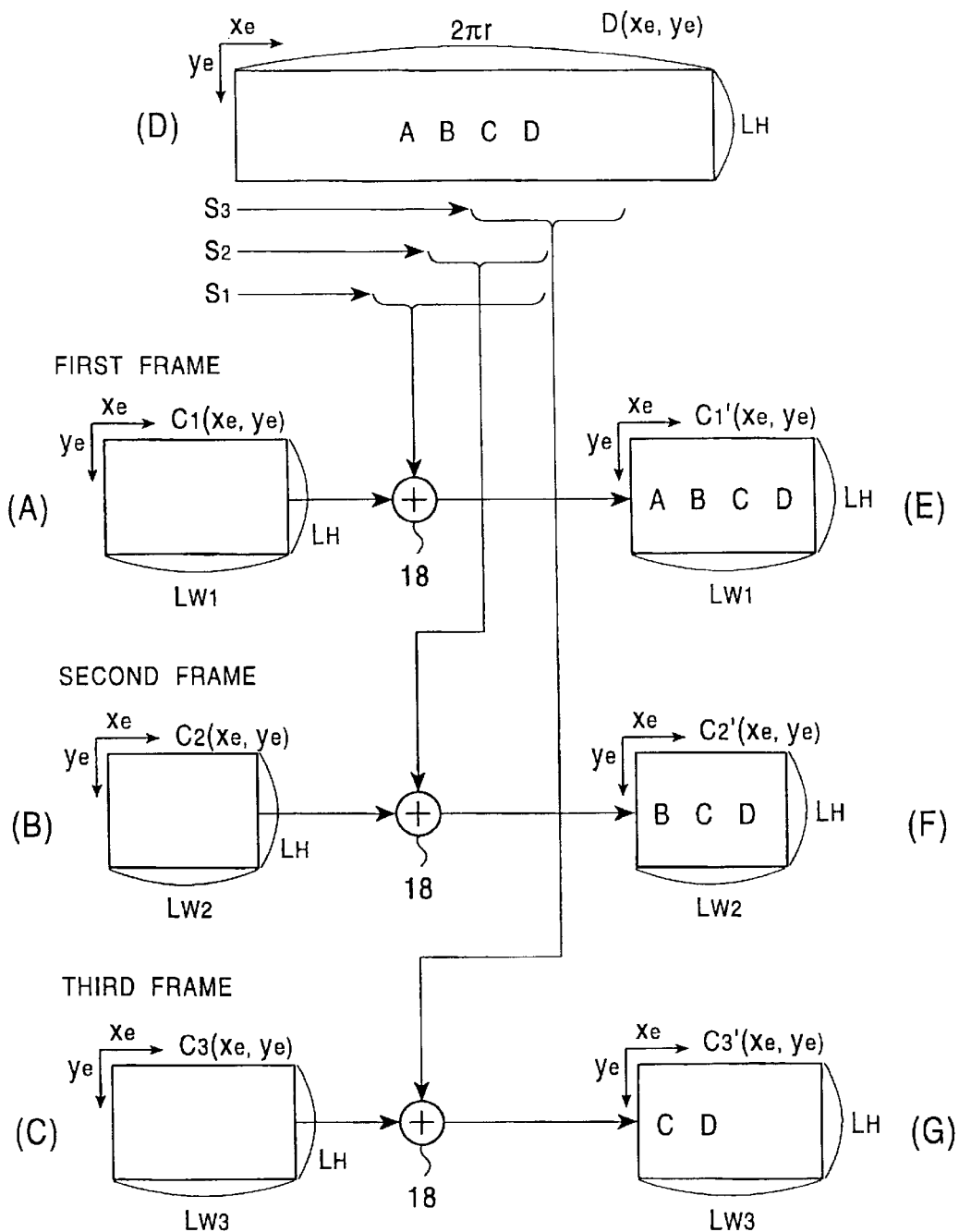
FIG. 47 is a detailed illustration of the copy and paste processing executed on a moving picture composed of a plurality of frames showing a three-dimensional object, where a portion visible in one frame is invisible in other frames.

To explain in more detail, the user designates six points marked by black solid circles (●) in FIG. 46A which shows the projected image of the cylindrical body contained in the first frame. These six points are the same as the points $P_1$ to $P_6$ explained before in connection with FIG. 21B. The expanded image corresponding to the peripheral surface of the cylindrical body sown in the first frame has a rectangular shape. As explained before in connection with FIG. 21C, the apices of the rectangle are indicated by $E_1$, $E_2$, $E_3$ and $E_4$, as mentioned in the clockwise direction starting from the left upper apex. The bisector point of the line $E_1E_2$ and the bisector point of the line $E_4E_3$ are respectively represented by $E_5$ and $E_6$. The points $P_1$, $P_2$, $P_3$, $P_4$, $P_5$ and $P_6$ are respectively correlated to the points $E_1$, $E_2$, $E_3$, $E_4$, $E_5$ and $E_6$. The coordinates $(x_e, y_e)$ of the points $E_1$, $E_2$, $E_3$, $E_4$, $E_5$ and $E_6$ are respectively given as $(0, 0)$, $(L_{W1}, 0)$, $(L_{W1}, L_H)$, $(0, L_H)$, $(L_{W1}/2, 0)$ and $(L_{W1}/2, L_H)$. At the same time, the coordinates $(x_p, y_p)$ of the points $P_1$, $P_2$, $P_3$, $P_4$, $P_5$ and $P_6$ designated as the characteristic points are respectively expressed by $(x_{p1}, y_{p1})$,$(x_{p2}, y_{p2})$, $(x_{p3}, y_{p3})$, $(x_{p4}, y_{p4})$, $(x_{p5}, y_{p5})$ and $(x_{p6}, y_{p6})$ Using these expressions, the following equation (40) is derived from the equation (39). The matrix M in the equation (39) can be determined by solving the equation (40).

image, whereby an expanded image of the portion of the side or peripheral surface of the cylindrical body, visible on the projected image contained in the first frame, is obtained as shown in Segment (A) of FIG. 47.

Figure 46B:
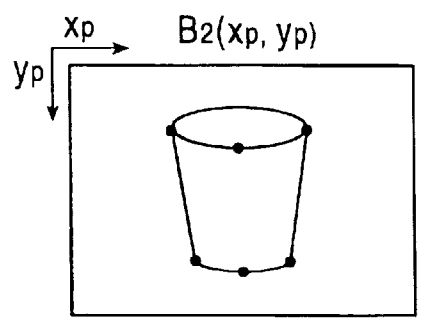
Figure 46C:
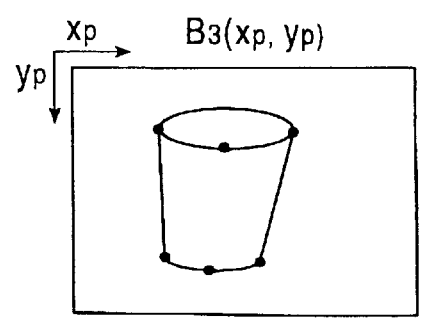

The same operations are performed on the images of the second and third frames. Namely, the user designates six characteristic points as marked by solid black circles (●)in each of FIG. 46B and FIG. 46C. For the second and third frames, however, it is not necessary that the user designates the shape information, because the shape information used for the first frame can be used also for the second and third frames. It is therefore possible to determine the factor $M\psi$ of the equation (10) indicative of the correlation between the point $(x_p, y_p)$ on the projected image of the peripheral surface of the cylindrical body and the corresponding point $(x_e, y_e)$ on the expanded image for each of the second and $$\begin{pmatrix} w_1 x_{p1} & w_2 x_{p2} & w_3 x_{p3} & w_4 x_{p4} & w_5 x_{p5} & w_6 x_{p6} \\ w_1 y_{p1} & w_2 y_{p2} & w_3 y_{p3} & w_4 y_{p4} & w_5 y_{p5} & w_6 y_{p6} \\ w_1 & w_2 & w_3 & w_4 & w_5 & w_6 \end{pmatrix} = M \begin{pmatrix} \psi_1(0,0) & \psi_1(L_{WI},0) & \psi_1(L_{WI},L_H) & \psi_1(0,L_H) & \psi_1\left(\frac{L_{WI}}{2},0\right) & \psi_1\left(\frac{L_{WI}}{2},L_H\right) \\ \psi_2(0,0) & \psi_2(L_{WI},0) & \psi_2(L_{WI},L_H) & \psi_2(0,L_H) & \psi_2\left(\frac{L_{WI}}{2},0\right) & \psi_2\left(\frac{L_{WI}}{2},L_H\right) \\ \psi_3(0,0) & \psi_3(L_{WI},0) & \psi_3(L_{WI},L_H) & \psi_3(0,L_H) & \psi_3\left(\frac{L_{WI}}{2},0\right) & \psi_3\left(\frac{L_{WI}}{2},L_H\right) \\ 1 & 1 & 1 & 1 & 1 & 1 \end{pmatrix}$$

$$= M \begin{pmatrix} \frac{L_{WI}}{\theta_1}\sin\left(\frac{\theta_1}{L_{WI}}\left(0-\frac{L_{WI}}{2}\right)\right) & \frac{L_{WI}}{\theta_1}\sin\left(\frac{\theta_1}{L_{WI}}\left(L_{WI}-\frac{L_{WI}}{2}\right)\right) & \frac{L_{WI}}{\theta_1}\sin\left(\frac{\theta_1}{L_{WI}}\left(L_{WI}-\frac{L_{WI}}{2}\right)\right) \\ 0 & 0 & L_H \\ \frac{L_{WI}}{\theta_1}\cos\left(\frac{\theta_1}{L_{WI}}\left(0-\frac{L_{WI}}{2}\right)\right) & \frac{L_{WI}}{\theta_1}\cos\left(\frac{\theta_1}{L_{WI}}\left(L_{WI}-\frac{L_{WI}}{2}\right)\right) & \frac{L_{WI}}{\theta_1}\cos\left(\frac{\theta_1}{L_{WI}}\left(L_{WI}-\frac{L_{WI}}{2}\right)\right) \\ 1 & 1 & 1 \end{pmatrix}$$

$$\begin{pmatrix} \frac{L_{WI}}{\theta_1}\sin\left(\frac{\theta_1}{L_{WI}}\left(0-\frac{L_{WI}}{2}\right)\right) & \frac{L_{WI}}{\theta_1}\sin\left(\frac{\theta_1}{L_{WI}}\left(\frac{L_{WI}}{2}-\frac{L_{WI}}{2}\right)\right) & \frac{L_{WI}}{\theta_1}\sin\left(\frac{\theta_1}{L_{WI}}\left(\frac{L_{WI}}{2}-\frac{L_{WI}}{2}\right)\right) \\ L_H & 0 & L_H \\ \frac{L_{WI}}{\theta_1}\cos\left(\frac{\theta_1}{L_{WI}}\left(0-\frac{L_{WI}}{2}\right)\right) & \frac{L_{WI}}{\theta_1}\cos\left(\frac{\theta_1}{L_{WI}}\left(\frac{L_{WI}}{2}-\frac{L_{WI}}{2}\right)\right) & \frac{L_{WI}}{\theta_1}\cos\left(\frac{\theta_1}{L_{WI}}\left(\frac{L_{WI}}{2}-\frac{L_{WI}}{2}\right)\right) \\ 1 & 1 & 1 \end{pmatrix}$$

(40)

In the equation (40), $w_1$, $w_2$, $w_3$, $w_4$, $w_5$ and $w_6$ are arbitrary numbers representing homogeneous coordinates. The symbol $L_H$ indicates the height of the expanded image of the portion of the peripheral surface of the cylindrical body which is visible in the projected image in the first field. The projected images in the first to third frames are of an identical cylindrical body. Therefore, heights of the expanded Images obtained from the projected images of the first to third frames are the same, unlike the widths of the expanded images.

The factor M which is contained in the equation (39) represents the relationship between the point $(x_p, y_p)$ on the projected image of the peripheral surface of the cylindrical body shown in the first frame (see Segment "A" of FIG. 45) and the corresponding point $(x_e, y_e)$ on the expanded image of the peripheral surface. This factor M is determined in accordance with the procedure described above. In the meantime, the factor $\psi$ can be determined as the user designates shape information indicating that the subject of the projected image to be processed is an image of a cylindrical body. It is thus possible to determine the factor $M\psi$ which is employed in the transformation of the projected image of the peripheral surface of the cylindrical body of the first frame into corresponding expanded image.

Then, based on the function $M\psi$, the pixel value $B_1(x_p, y_p)$ of a point $(x_p, y_p)$ on the projected image in the first frame is written in the paste buffer as the pixel value $C_1(x_e, y_e)$ of the corresponding point $(x_e, y_e)$ on the expanded third frames, simply by designating the six characteristic points. Based on the thus determined factor $M\psi$, it is possible to obtain the expanded image of the peripheral surface of the cylindrical body, for each of the second and third frames.

To explain in more detail, based on the function My determined by the six characteristic points designated on the image of the second frame, the pixel value $B_2(x_p, y_p)$ of a point $(x_p, y_p)$ on the projected image in the second frame is written in the paste buffer as the pixel value $C_2(x_e, y_e)$ of the corresponding point $(x_e, y_e)$ on the expanded image. Consequently, an expanded image of the portion of the side or peripheral surface of the cylindrical body, visible on the projected image contained in the second frame, is obtained as shown in Segment (B) of FIG. 47. Similarly, for the third frame image, the pixel value $B_3(x_p, y_p)$ of a point $(x_p, y_p)$ on the projected image in the third frame is written in the paste buffer as the pixel value $C_3(x_e, y_e)$ of the corresponding point $(x_e, y_e)$ on the expanded image, based on the function $M\psi$ determined in accordance with the six characteristic points designated on the image in the third frame. As a result, an expanded image of the portion of the side or peripheral surface of the cylindrical body, visible on the projected image contained in the third frame, is obtained as shown in Segment (C) of FIG. 47.

The following equations (41) and (42), corresponding to the equation (39), are used for the purpose of determining the matrix M on the images contained in the second and third frames, respectively.

$$\begin{pmatrix} wx_p \\ wy_p \\ w \end{pmatrix} = M \begin{pmatrix} \psi_1(x_e, y_e) \\ \psi_2(x_e, y_e) \\ \psi_3(x_e, y_e) \\ 1 \end{pmatrix} = M \begin{pmatrix} \frac{L_{W2}}{\theta_2} \sin\left(\frac{\theta_2}{L_{W2}}\left(x_e - \frac{L_{W2}}{2}\right)\right) \\ y_e \\ \frac{L_{W2}}{\theta_2} \cos\left(\frac{\theta_2}{L_{W2}}\left(x_e - \frac{L_{W2}}{2}\right)\right) \\ 1 \end{pmatrix} \quad (41)$$

$$\begin{pmatrix} wx_p \\ wy_p \\ w \end{pmatrix} = M \begin{pmatrix} \psi_1(x_e, y_e) \\ \psi_2(x_e, y_e) \\ \psi_3(x_e, y_e) \\ 1 \end{pmatrix} = M \begin{pmatrix} \frac{L_{W3}}{\theta_3} \sin\left(\frac{\theta_3}{L_{W3}}\left(x_e - \frac{L_{W3}}{2}\right)\right) \\ y_e \\ \frac{L_{W3}}{\theta_3} \cos\left(\frac{\theta_3}{L_{W3}}\left(x_e - \frac{L_{W3}}{2}\right)\right) \\ 1 \end{pmatrix}$$

The expanded images of the peripheral surfaces of the cylindrical body shown in the first to third frames are stored in paste buffers and are displayed on the image display unit 5. In this case, therefore, three image buffers are selected from among a plurality of image buffers and used as the paste buffers, as in the process explained before in connection with FIGS. 43 and 44. As explained before, the expanded images derived the projected images of the peripheral surface of the cylindrical body shown in the first, second and third frames have an equal height $L_H$. The widths $L_{W1}$, $L_{W2}$ and $L_{W3}$ of the expanded images, however, are basically different, although one of these widths may eventually be equal to another (See Segments (A) to (C) of FIG. 47.).

Then, in the image processing apparatus of FIG. 4, one of the unused image buffers is selected and used as a paint buffer which stores the expanded image of the entirety of the peripheral surface of the cylindrical body to be processed. An overall expanded image storage area, which can store the expanded image of the entire peripheral surface of the cylindrical body as the processing object is secured in the paint buffer. The height of the expanded image obtained by two-dimensionally developing the entirety of the peripheral surface of the cylindrical body is the same as the height $L_H$ which is the height of the expanded images derived from the projected images of the peripheral surface contained in the first to third frames. In the meantime, the width of the expanded image of the entirety of the peripheral surface can be given by $2\pi r$, where r represents the radius of the top surface of the cylindrical body. In this case, therefore, an area having the width $2\pi r$ and the height $L_H$ is secured as the overall expanded image storage area, as shown in Segment (D) of FIG. 47. The radius R is expressed by $L_{W1}/\theta_1$ (or $L_{W2}/\theta_2$ or $L_{W3}/\theta_3$), as explained before.

In the meantime, the user while monitoring the expanded image displayed on the display unit 5 operates the input unit 5, so as to render the characters "A", "B", "C" and "D" at desired addresses in the overall expanded image storage area. The thus rendered characters are written in the overall expanded image storage area of the paint buffer by the operation of the paint processor 18, as shown in Segment (D) of FIG. 47.

After the content rendered by the user is stored in the overall expanded image storage area, the paint processor 18 cuts, for each of the first to third frames, a region out of the overall expanded image storage area and performs an editorial work or other retouching work on the expanded image of the peripheral surface of the cylindrical body contained in each of the first to third frames, based on the cut-out region. The expanded images to be retouched, corresponding to the first to third frames, have been stored in the respective paste buffers.

To explain in more detail, referring to Segment (D) of FIG. 47, the values of the coordinates $x_e$ of a point which is slightly spaced leftward from the character "A", a point between the characters "A" and "B" and a point between the characters "B" and "C" are respectively represented by $S_1$, $S_2$ and $S_3$. For the purpose of processing the image of the first frame, the paint processor 18 cuts a region defined by coordinates $(S_1, 0)$ and $(S_1+L_{W1}, L_H)$ out of the overall expanded image storage area. For the second and third frames, the paint processor 18 cuts a region defined by coordinates $(S_2, 0)$ and $(S_2+L_{W2}, L_H)$ and a region defined by coordinates $(S_3, 0)$ and $(S_3+L_{W3}, L_H)$, respectively, out of the overall expanded image storage area. Then, the paint processor 18 writes the content of the region cut out for each frame into the expanded image of the peripheral surface of the cylindrical body of the corresponding frame.

This operation will be described in more detail. The pixel value (stored value) of a point $(x_e, y_e)$ in the overall expanded image storage area is expressed as $D(x_e, y_e)$. A function, which is "1" where the pixel value $D(x_1, y_e)$ is not "0" and "0" where the pixel value $D(x_e, y_e)$ is 0, is expressed by $\alpha(x_e, y_e)$. The results of writing of the content carried by the cut-out region onto the pixels $(x_e, y_e)$ of the expanded images of the rectangle shown in the first, second and third frames are respectively represented by $C_1'(x_e, y_e)$, $C_2'(x_e, y_e)$ and $C_3'(x_e, y_e)$. The paint processor 18 then determines, in accordance with the following equation (43), the expanded images $C_1'(x_e, y_e)$, $C_2'(x_e, y_e)$ and $C_3'(x_e, y_e)$ of the peripheral surface of the cylindrical body in the first, second and third frames in which the contents of the respective cut-out regions have been written.

$C_1'(x_e, y_e) =$ $\alpha(x_e+S_1, y_e)D$ $(x_e+S_1, y_e)+(1-$ $\alpha(x_e+S_1, y_e))C_1$ $(x_e, y_e)C_2'(x_e,$ $y_e) = \alpha(x_e+S_2, y_e)D$ $(x_e+S_2, y_e)+(1-$ $\alpha(x_e+S_2, y_e))C_2$ $(x_e, y_e)C_3$ $'(x_e, y_e) = \alpha(x_e$ $+S_3, y_e)D(x_e+S_3,$ $y_e)+(1-\alpha(x_e+S_3,$ $y_e))C_3(x_e,$ $y_e)$ (43)

In the equation (43), the value of the coordinate $y_e$ ranges from 0 to $L_H$. The value of the coordinate $x_e$ ranges from 0 to $L_{W1}$ for the expanded image $C_1'(x_e, y_e)$, from 0 to $L_{W2}$ for the expanded image $C_2'(x_e, y_e)$, and from 0 to $L_{W3}$ for the expanded image $C_3'(x_e, y_e)$.

As a result of this processing, the expanded image of the peripheral surface of the cylindrical body shown in the first frame as shown in Segment (A) of FIG. 47 is transformed into an expanded image carrying all the characters "A", "B", "C" and "D" as shown in Segment (E) of the same Figure. Similarly, the expanded image of the peripheral surface of the cylindrical body shown in the second frame as shown in Segment (B) of FIG. 47 is transformed into an expanded image carrying characters "B", "C" and "D" as shown in Segment (F) of the same Figure. Likewise, the expanded image of the peripheral surface of the cylindrical body shown in the third frame as shown in Segment (C) of FIG. 47 is transformed into an expanded image as shown in Segment (G) of the same Figure. In this case, however, the expanded image carries only characters "C" and "D".

The characters "A", "B", "C" and "D" to be added to each frame may be written in a manner as if these characters are rendered by a translucent paint. This can be achieved by setting the term $\alpha(x_e, y_e)$ to a value which is greater than 0 but less than 1.0, e.g., 0.5, in the equation (37) shown above.

The points where the coordinate $x_e$ takes the value S1, S2 and S3 may be designated by the user after the rendering of the character string "ABCD" in the overall expanded image storage area.

In the event that the value or values one or more of the factors $(x_e+S_1)$, $(x_e+S_2)$ and $(x_e+S_1)$ exceed $2\pi r$ or fall below 0, $2\pi r$ is added to or subtracted from such factor or factors so that the values of all the factors $(x_e+S_1)$, $(x_e+S_2)$ and $(x_e+S_1)$ range from 0 and $2\pi r$. It will be seen that the point where the coordinate $x_e$ is 0 and the point where the coordinate $x_e$ is $2\pi r$ are identical in the three-dimensional space, because the object under processing is the peripheral surface of a cylindrical body.

Then, a pasting processing is executed for the first frame by writing into the buffer of interest (image buffer storing two-dimensional image data of the first frame) the pixel value $C_1'(x_e, y_e)$ of the point $(x_e, y_e)$ on the expanded image (Segment (E) of FIG. 47) of the cylinder peripheral surface in the first frame which now carries the character string "ABCD", as the pixel value $B_1'(x_p, y_p)$ of the corresponding point $(x_p, y_p)$ on the projected image of the first frame, based on the same function Mψ as that used in the copying processing on the first frame. As a result, a first frame image containing a projected image of the cylinder peripheral surface carrying the character string "ABCD", presenting a natural image as if photographed, is obtained as shown in Segment (D) of FIG. 45.

Similarly, a pasting processing is executed for the second frame. This is effected by writing into the buffer of interest (image buffer storing two-dimensional image data of the second frame) the pixel value $C_2'(x_e, y_e)$ of the point $(x_e, y_e)$ on the expanded image (Segment (F) of FIG. 47) of the cylinder peripheral surface contained in the second frame which now carries the characters "B", "C" and "D", as the pixel value $B_2'(x_p, y_p)$ of the corresponding point $(x_e, y_p)$ on the projected image of the second frame, based on the same function My as that used in the copying processing on the second frame. As a result, a second frame is obtained, containing only the characters "B", "C" and "D" expressing a natural image of the cylindrical body that has been rotated from the position shown in the first frame to make the character "A" disappear, as shown in Segment (E) of FIG. 47.

Likewise, a pasting processing is executed for the third frame. This is effected by writing into the buffer of interest (image buffer storing two-dimensional image data of the second frame) the pixel value $C_3'(x_e, y_e)$ of the point $(x_e, y_e)$ on the expanded image (Segment (G) of FIG. 47) of the cylinder peripheral surface shown in the third frame which now carries only the characters "C" and "D", as the pixel value $B_3'(x_p, y_p)$ of the corresponding point $(x_p, y_p)$ on the projected image of the third frame, based on the same function Mψ as that used in the copying processing on the third frame. As a result, a third frame image is obtained carrying only the characters "C" and "D", presenting a natural image as if photographed, indicating that the cylindrical body has been further rotated from the position shown in the second frame to make the character "B" invisible, as shown in Segment (F) of FIG. 45.

As will be seen from the foregoing description, the contents rendered by the user are written in the overall expanded image storage area in the paint buffer, and different portions of the overall expanded image storage area are cut as the cut-out regions for different frames. Different processings are then effected on the expanded images of the cylinder peripheral surface shown in the first, second and third frames, respectively, based on the contents of the respective cut-out regions. As a result of such processing, all the characters "A", "B", "C" and "D" are written in the expanded image in the first frame, characters "B", "C" and "D" are written on the expanded image in the second frame, and only the characters "C" and "D" are written on the expanded image in the third frame. Consequently, desired two-dimensional images are obtained without requiring the user to repeatedly conduct editorial work or retouching on the expanded images of the successive frames.

It is recalled that the processing described before in connection with FIG. 42 requires separate and different jobs to be performed on different frames, such that all the characters "A", "B", "C" and "D" are written for the first frame, characters "B", "C" and "D" are written for the second frame and only characters "C" and "D" for the third frame. Such a troublesome and laborious work is not necessary in the process described with reference to FIGS. 45 to 47, because the expanded images of the cylinder peripheral surface in the first to third frames are processed based on the contents of the corresponding cut-out regions which are cut out from the overall expanded image storage area in which the characters are written.

In other words, in order to obtain a moving picture of the cylinder peripheral surface carrying the characters "A", "B", "C" and "D", the user is required only to input characteristic points for each of the first to third frames and to input the points $S_1$ to $S_3$, followed by rendering of the character "A", "B", "C" and "D" which needs to be executed only once.

The point $S_1$, $S_2$ and $S_3$ represent the coordinates of the left upper corners of the respective cut-out regions, i.e., the amounts of offsets of the left upper corners of the respective cut-out regions relative to the origin which is the left upper corner of the overall expanded image storage area. These points $S_1$, $S_2$ and $S_3$, therefore, will be referred to also as "offsets", hereinafter.

In the foregoing description, all the points $S_1$, $S_2$ and $S_3$ are designated by the user. This, however, is only illustrative, and the process may be carried out such that the user designates only one of these points, e.g., the point where the coordinate $x_e$ is $S_1$, while the coordinates $x_e$ of other points $S_2$ and $S_3$ are automatically determined as follows.

Figure 48:
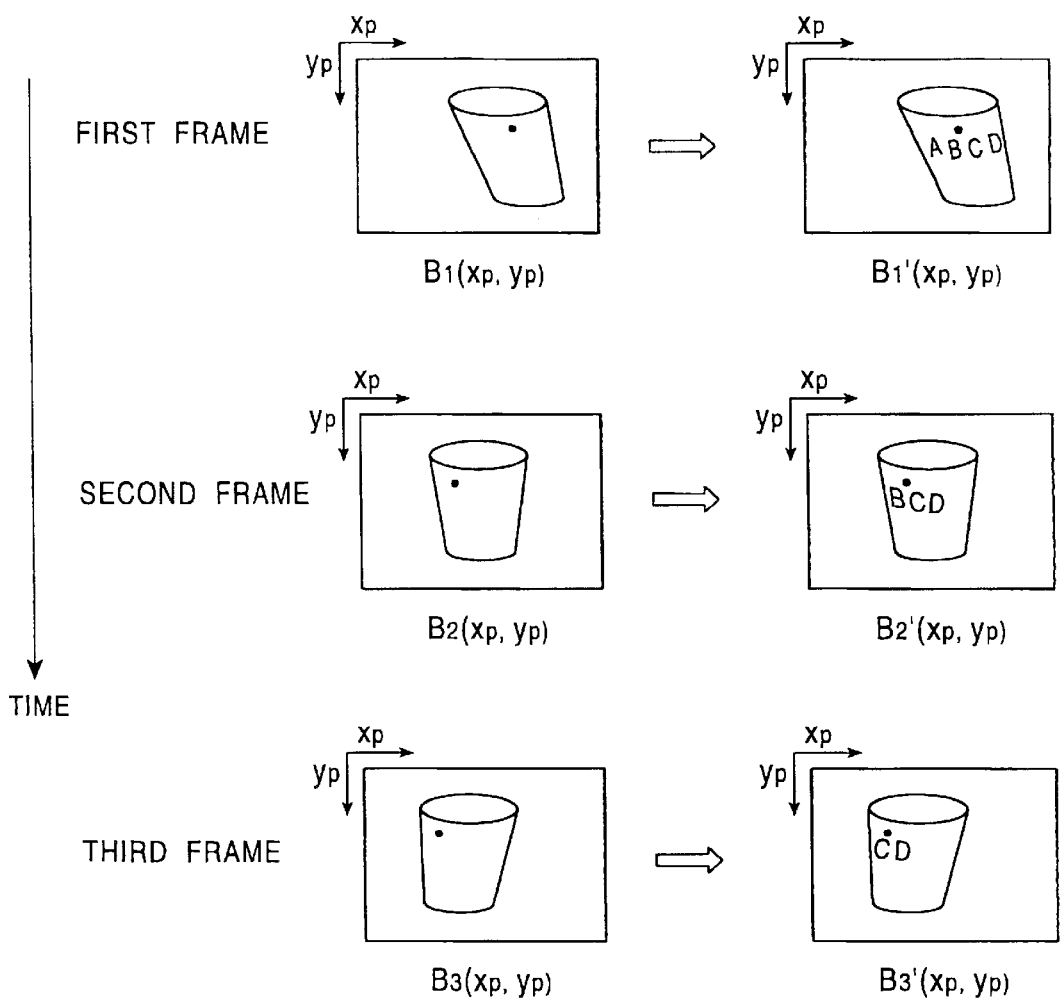
FIG. 48 is an illustration of a method for determining amounts of offsets.

In the process which is now being described, a moving picture composed of first to third frames each presenting an image of a cylindrical body is transformed into a moving picture which is composed of first to third frames presenting images of the cylindrical body carrying the string of characters "ABCD", "BCD" and "CD", as described in connection with FIG. 45. FIG. 45 shows frames of a moving picture similar to those shown in FIG. 45. In FIG. 48, however, a specific pattern, which my be a scratch, is provided on the peripheral surface of the cylindrical body the image of which is to be processed. In FIG. 48, such a pattern is indicated by a solid black circle (●).

Figure 49:
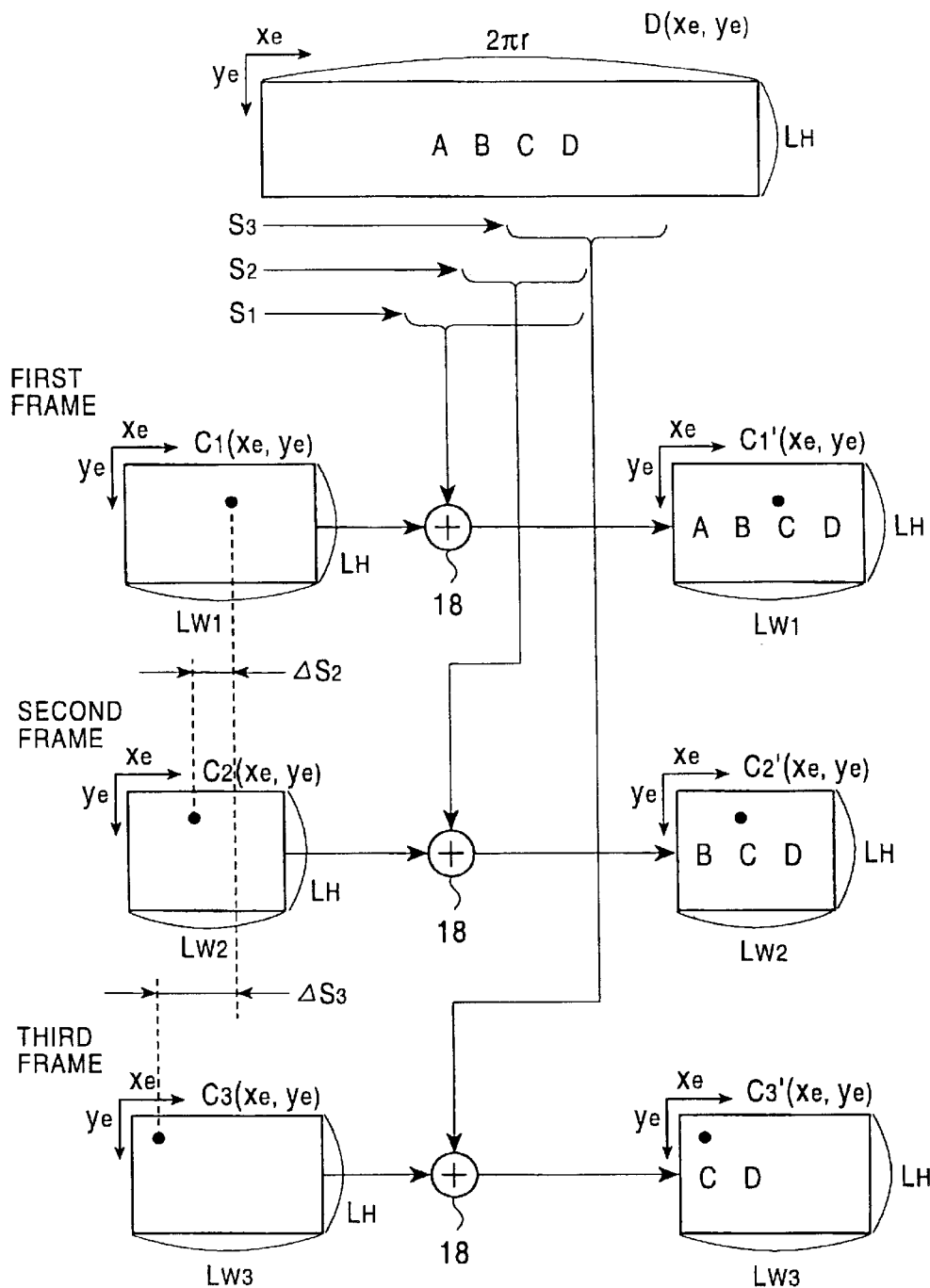
FIG. 49 is an illustration showing the detail of the method for determining amounts of offsets.

In this case, the image of the above-mentioned specific pattern appears on the expanded image of the cylinder peripheral surface in each of the first to third frame as obtained through the copying processing effected on each of these frames, as will be seen from FIG. 49 which is equivalent to FIG. 47.

In FIG. 49, the expanded images of the respective frames carry the marks (●) that indicate the images of an identical pattern on the projected image of the cylinder peripheral surface. It is therefore possible to determine the coordinates of the points $S_2$ and $S_3$, based on the coordinate of the point $S_1$ designated by the user, provided that the positional relationships between the patterns on the first, second and third images are given.

The difference $\Delta S_2$ between the $x_e$ coordinate of the position of the pattern on the expanded image of the first frame and that of the second frame is equal to the difference between the offset $S_1$ and the offset $S_2$. Likewise, the difference $\Delta S_3$ between the $x_e$ coordinate of the position of the pattern on the expanded image of the first frame and that of the third frame equals to the difference between the offset $S_1$ and the offset $S_3$. Provided that the above-mentioned differences $\Delta S_2$ and $\Delta S_3$ are known, therefore, it is possible to determine the offsets $S_2$ and $S_3$ based on the offset $S_1$ designated by the user, by computing $S_2=S_1+\Delta S_2$ and $S_3=S_1+\Delta S_3$.

It will be appreciated that the above-described copy and paste processing can be applied to the processing of moving pictures of any desired type of three-dimensional objects, although rectangular parallelepiped and cylindrical bodies have been specifically mentioned in the foregoing description.

Figure 50:
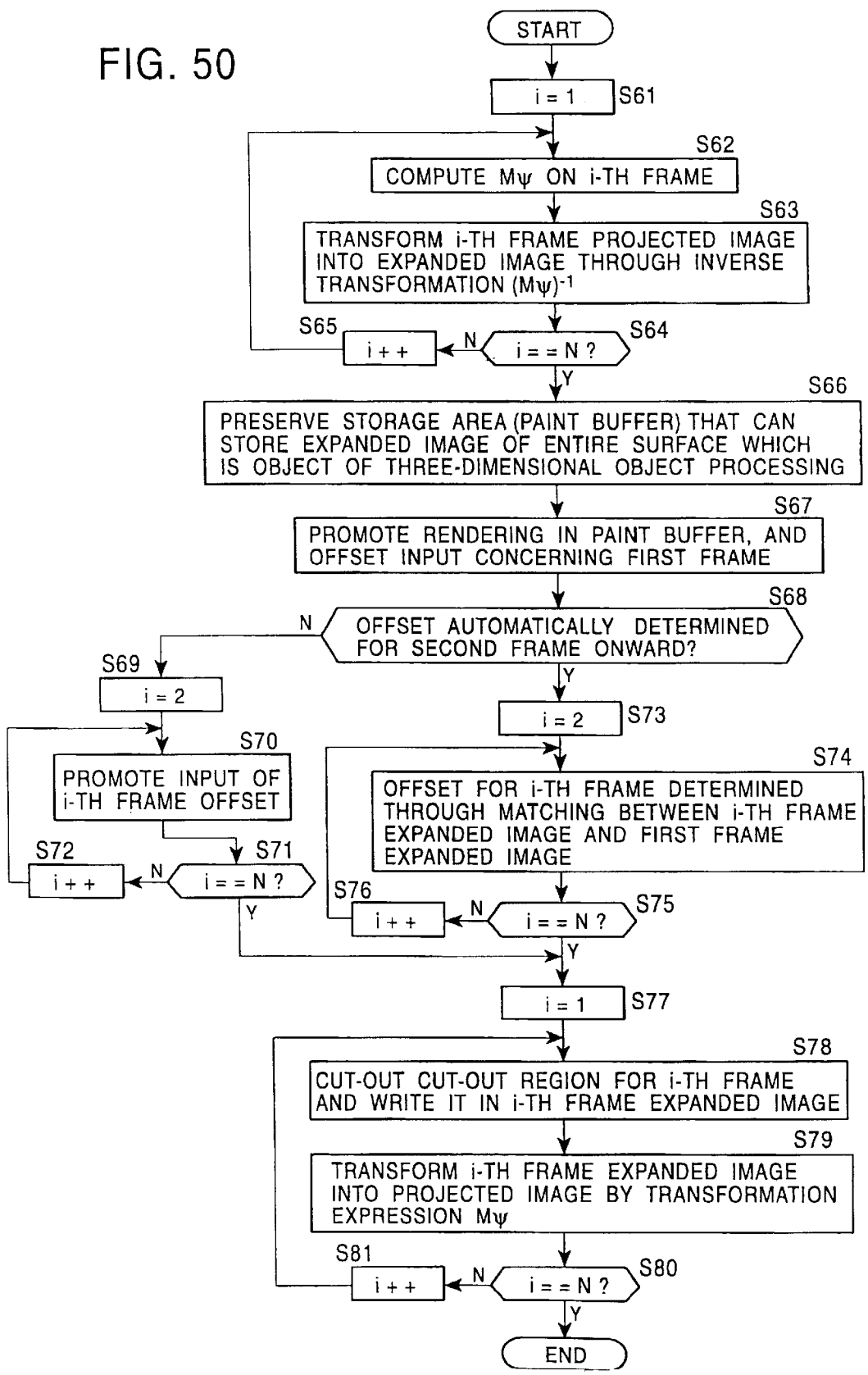
FIG. 50 is a flowchart showing a copy and paste processing effected on a moving picture.

A further description will be given of the copy and paste processing to be conducted on a moving picture, with specific reference to FIG. 50 which is a flowchart showing an example of this process. The following description proceeds on an assumption that an identical three-dimensional object is shown in the frames of the moving picture, and the shape information identifying such object has already been input. It is also assumed that the moving picture is composed of first to N-th frames.

The copy and paste processing begins with Step S61 in which the copy processor 12 initializes the variable "i" to, for example, 1. The variable "i" indicates arbitrary one of the numbers of the frames constituting the moving picture. After a predetermined point on the projected image of the three-dimensional object displayed in an i-th frame has been input through the operation of the input unit 6, the process advances to Step S62 in which the copy processor 12 performs computation to determine the function $M\psi$ which is to be used for transforming the projected image of the three-dimensional object in the i-th frame into corresponding expanded image. This computation is performed based on the characteristic point input by the user and the shape information which has been input in advance of the start of the processing. The function $M\psi$ thus determined is supplied to the image transform processor 20.

Upon receipt of the function $M\psi$ in regard to the i-th frame, the image transform processor 20 transforms the projected image of the three-dimensional object displayed in the i-th frame into an expanded image, in accordance with an inverse transformation expression $(M\psi)^{-1}$. The image transform processor 20 causes this expanded image to be stored in the paste buffer.

The process then advances to Step S64 in which the copy processor 12 determines whether the variable "i" equals to the total number N of the frames that constitutes the moving picture. If the determination in Step S64 has proved that the variable "i" is not equal to N, i.e., when the variable "i" is below N, the process advances to Step S65 in which the copy processor 12 increments the variable "i" by 1 (one).

The user then operates the input unit 6 so as to input a characteristic point, i.e., a predetermined point on the projected image of the three-dimensional body in the i-th frame (actually, (i+1)-th frame in this case, because "i" has been incremented by 1 in Step S65). Thereafter, the process returns to Step S62. Thus, Steps S62 to S65 are repeatedly executed until Step S64 determines that the variable "i" is equal to N.

Figure 51:
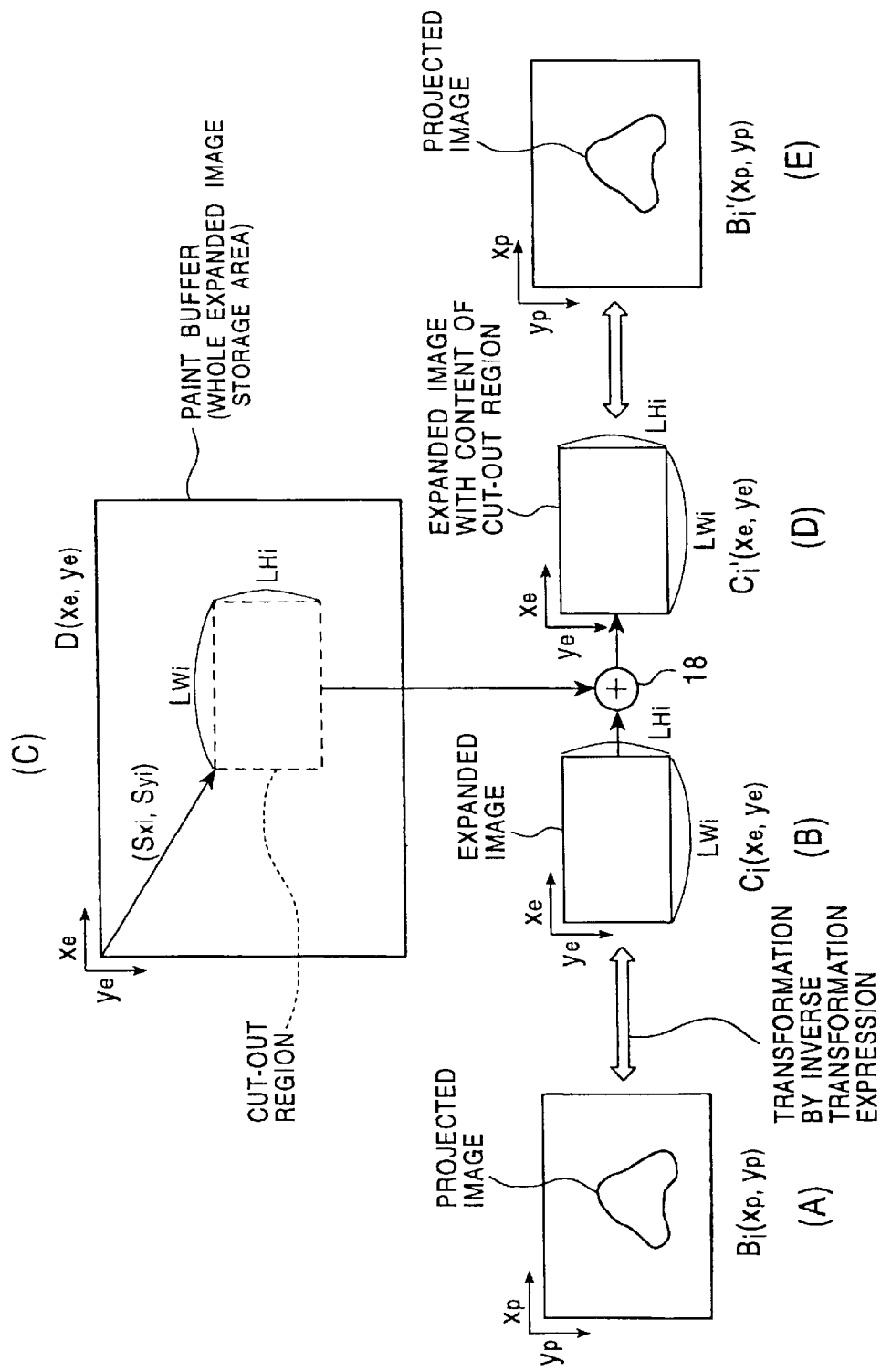
FIG. 51 is an illustration of the copy and paste processing effected on a moving picture.

As a result of execution of Steps S62 to S65 on the i-th frame, projected image of the three-dimensional object displayed in the i-th frame shown in Segment (A) of FIG. 51 is transformed based on the function $M\psi$ obtained for the i-th frame, into an expanded image having a width $L_{Wi}$ and a height $L_{Wi}$ as shown in Segment (B) of FIG. 51. More specifically, based on the function $M\psi$ obtained with the i-th frame, the pixel value $B_i(x_p, y_p)$ of the point $(x_p, y_p)$ on the projected image (Segment (A) of FIG. 51) of the i-th frame is written in the paste buffer as the pixel value $C_i(x_p, y_p)$ of the corresponding point $(x_p, y_p)$ on the expanded image, whereby the expanded image of the three-dimensional object contained in the i-th frame is obtained as shown in Segment (B) of FIG. 51.

When the variable "i" has grown to N, the process skips from Step S64 to S66 in which one of unused image buffers is selected so as to be used as the paint buffer. At the same time, an overall expanded image storage area is secured in the paint buffer, as shown in Segment (C) of FIG. 51. This overall expanded image storage area is large enough to store the expanded image of the entirety of the surface of the three-dimensional object displayed in the moving picture constituted by the first to N-th frames. The process then advances to Step S67.

Step S67 causes the display unit 5 to display a message which for example, requests the user to render an image into the paint buffer and to input the offset for the first frame. The result of the rendering made by the user in response to the message is stored in the overall expanded image storage area that has been secured in the paint buffer. The offset in regard to the first frame, which also is input by the user, is stored in a predetermined address in the data memory 3.

The process then advances to Step S68 which determines whether the offsets in the second to N-th frames are to be automatically determined. When it is determined that such automatic determination is not to be executed, e.g., when instructions are given by the user through the input unit that the offsets are to be designated by the user, the process advances to Step S69 which sets the variable "i" to 2. The process then advances to Step S70 which causes the display unit 5 to display a message requesting the user to input the offset for the i-th frame. The offset for the i-th frame input by the user responding to the message is stored in a predetermined address of the data memory. The process then advances to Step S71 which determines whether the variable "i" has reached N. If the answer is "NO", i.e., if the variable "i" is still smaller than N, the process proceeds to Step S72 which increments the variable "i" by 1 (one). The process then returns to Step S70. Thus, Steps S70 to S72 are repeatedly executed until Step S71 determines that the variable "i" has become equal to N. Determining that the variable "i" has become equal to N in Step S71 means that the user has completed the operation to input the offsets for all of the second to N-th frames. The process then advances to Step S77.

However, if Step S68 has determined that the offsets are to be automatically determined for the second to N-th frames, e.g., if an instruction is input by the user through the input unit 6 requesting automatic determination of the offsets, the process advances to Step S73 in which the variable "i" is set to 2.

The process then proceeds to Step S74 which performs a pattern matching so as to determine the positional relationship between the expanded image in the first frame and the expanded image in the i-th frame, i.e., the positional relationship between the positions of an identical pattern on the expanded images of the first and i-th frames as explained before with reference to FIGS. 48 and 49. Step S74 determines the offset of the expanded image in the i-th frame, based on the thus determined positional relationship.

More specifically, the automatic determination of the offset is achieved as follows. The offset in the i-th frame is the coordinates $(x_e, y_e)$ of the left upper corner of the cut-out region for the i-th frame, in the coordinate system which has the origin at the position of the left upper corner of the overall expanded image storage area. The coordinates $(x_e, y_e)$ indicative of the offset in the i-th frame is expressed as $(Sx_i, Sy_i)$. The amount of translation (vector), necessary for bringing the pattern on the expanded image of the first frame into alignment with the same pattern on the expanded image of the i-th frame, is expressed by $(\Delta Sx_i, \Delta Sy_i)$.

Step S74 determines the offset $(Sx_i, Sy_i)$ for the expanded image in the i-th frame by computing the following equation:

$$(Sx_i, Sy_i) = (Sx_1, Sy_1) + (\Delta Sx_i, \Delta Sy_i)$$

The process then advances to Step S75 which determines whether the variable "i" has become equal to N. If the answer is "NO", i.e., if the variable "i" is still smaller than N, Step S76 is executed to increment the variable "i" by 1 (one) followed by execution of Step S74 again. Thus, Steps S74 to S76 are repeatedly executed until Step S75 determines that the variable "i" has become equal to N. Determining in Step S75 that the variable "i" is equal to N means that offsets have been determined through pattern matching, for all of the second to N-th frames. The process then advances to Step S77 in which the variable "i" is set to 1, followed by execution of Step S78.

In Step S78, the paint processor 18 performs extraction of cut-out region for the i-th frame from the overall expanded image storage area. More specifically, the paint processor 18 cuts out a region whose upper left corner is positioned at coordinates $(Sx_1, Sy_1)$ and whose width and height are respectively $L_{W1}$ and $L_{Hi}$, as shown in Segment (C) of FIG. 51. As will be seen from segment (B) of FIG. 51, the width and height $L_{W1}$ and $L_{Hi}$ are those of expanded image in the i-th frame.

Step S78 further causes the paint processor 18 to write the content of the cut-out region into the expanded image (Segment (B) of FIG. 51) of the i-th frame.

The operation performed in Step S78 will be described in more detail. The pixel value (stored value) of a point $(x_e, y_e)$ in the overall expanded image storage area is expressed as $D(x_e, y_e)$. A function, which is "1" where the pixel value $D(x_e, y_e)$ is not "0" and "0" where the pixel value $D(x_e, y_e)$ is 0, is expressed by $\alpha(x_e, y_e)$. The result of writing of the content carried by the cut-out region onto the pixel $(x_e, y_e)$ of the expanded image of three-dimensional object shown in the i-th frame is represented by $C_i'(x_e, y_e)$ The paint processor 18 then determines, in accordance with the following equation (44), the expanded image $C_i'(x_e, y_e)$ in which the content of the cut-out region has been written.

$$C_1'(x_e, y_e) = \alpha(x_e + Sx_i, y_e + Sy_i) D(x_e + Sx_i, y_e + Sy_i) + (1 - \alpha(x_e + Sx_i, y_e + Sy_i)) C_i(x_e, y_e) \quad (44)$$

In the equation (44) shown above, the coordinate $x_e$ ranges from 0 to $L_{Wi}$, while $y_e$ ranges from 0 to $L_{Hi}$.

As a result of this processing, the expanded image of the surface of the three-dimensional object contained in the i-th frame as shown in Segment (A) of FIG. 51 is worked or retouched into an expanded image shown in Segment (D) of FIG. 51. It will be seen that the content of the cur-out region (demarcated by broken line in Segment (C) of FIG. 51) has been written in this expanded image.

The process then advances to Step S79 in which the image transform processor 20 performs the following operation. Based on the same function Mψ as that used in the copying processing on the i-th frame, the image transform processor 20 writes into the buffer of interest (image buffer which stores two-dimensional image data of the i-th frame) the pixel value $C_i'(x_e, y_e)$ of the point $(x_e, y_e)$ on the retouched expanded image (Segment (D) of FIG. 51) contained in the first frame which now carries the content of the cut-out region, as the pixel value $B_i'(x_p, y_p)$ of the corresponding point $(x_p, y_p)$ on the projected image in the i-th frame, whereby the retouched expanded image for the i-th frame is transformed into a projected image for the i-th frame, with the content of the cut-out region written therein, as shown in Segment (E) of FIG. 51. Thus, a projected image transformed from the retouched expanded image for the i-th frame is pasted to the i-th frame.

The process then advances to Step S80 which determines whether the variable "i" has become equal to N. If the answer is "NO", i.e., if the variable "i" is still smaller than N, the process proceeds to Step S81 which increments the variable "i" by 1 (one). The process then returns to Step S78. Thus, Steps S78 to S81 are repeatedly executed until Step S80 determines that the variable "i" has become equal to N. Determining in Step S80 that the variable "i" has reached N means that transformation from the retouched expanded image into the projected image has been finished on all the first to N-th frames. The whole process is finished accordingly.

Thus, in accordance with the present invention, an overall expanded image storage area is secured so as to be able to store the entirety of the expanded image of a surface of a three-dimensional object whose image is to be processed. Content rendered by the user is written in this overall expanded image storage area, and at least part of this area is extracted as a cut-out region for each of the frames. Expanded image in each frame is then retouched in accordance with the content of the cut-out region, whereby a desired moving picture is obtained without requiring the user to take a labor of conducting retouching such as rendering characters separately on expanded images in all the frames.

A description will now be given of a medium which installs on a computer a program implementing the above-described series of processings so as to enable the computer to execute the program.

Figure 52A:
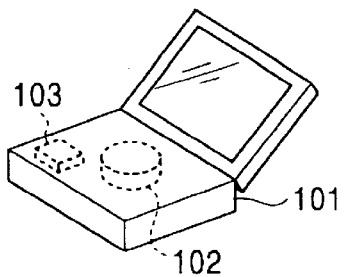
FIG. 52 is an illustration of various types of medium usable as the medium in accordance with the present invention.

As shown in FIG. 52A, the program may be provided to the user by being installed in a hard disk 102 as a storage medium built in a computer 101. This hard disk 102 corresponds to, for example, the external storage unit 7 shown in FIG. 3.

Figure 52B:
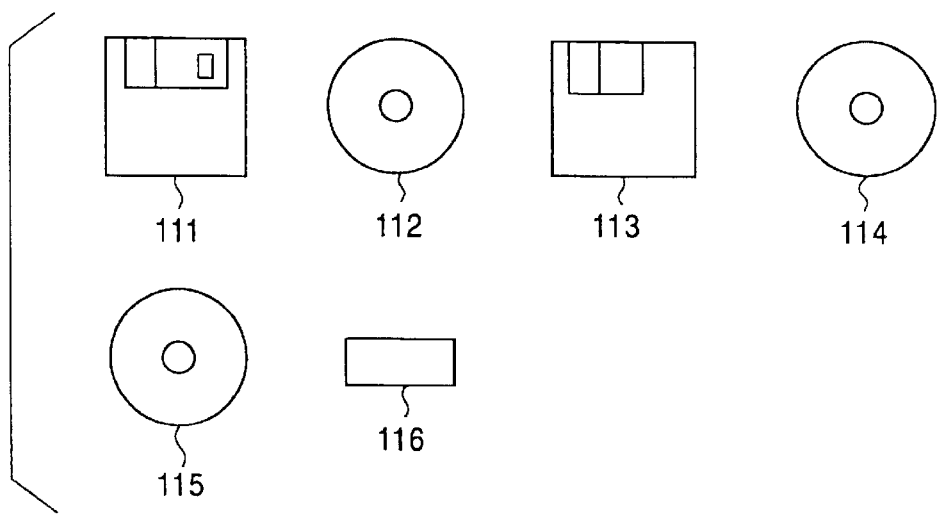
Figure 52C:
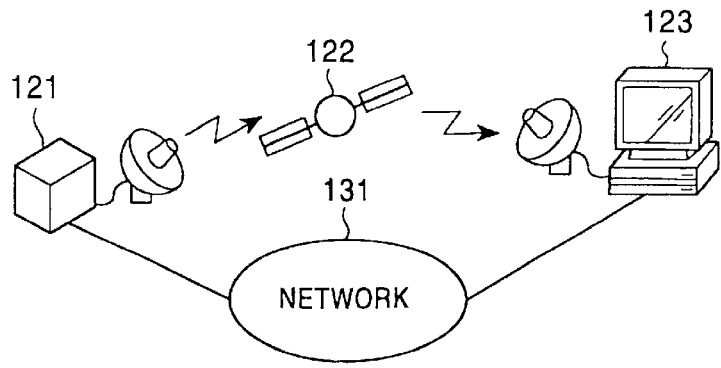

Alternatively, the program may be supplied in the form of package software by being temporarily or permanently stored in a recording medium such as, for example, a floppy disk 111, a CD-ROM (Compact Disc Read Only Memory) 112, MO (Magneto-optical) disk 113, a DVD (Digital Versatile Disc)114, a magnetic disc 115, or a semiconductor memory 116, as shown in FIG. 52B.

The program also may be supplied by means of radio waves from a download site 121 to a computer 123 via a satellite 122, or may be transferred to the computer 123 through a network 131 such as a LAN (Local Area Network) or the internet, so as to be stored in a hard disk incorporated in the computer 123.

All such means for providing the program are within the scope of the medium of the present invention.

It is also to be understood that the steps that describe the program to be provided by the medium of the invention need not strictly follow the sequence that is shown in the flowchart. For instance, some of these steps may be executed in parallel or individually, e.g., by parallel processing or object-oriented processing.

In the foregoing description, the image processing apparatus shown in FIG. 4 is implemented by causing the arithmetic circuit 1 shown in FIG. 3 to execute the application program stored in the external storage unit 7. This, however, is not exclusive and the image processing apparatus may be implemented by hardware that has functions of the blocks shown in FIG. 4.

As will be understood from the foregoing description, the image processing apparatus and method, as well as the medium, of the present invention offer the following advantages. According to the invention, a correlation expression, that determines the correlation between a projected image of a surface of a three-dimensional object in a moving picture and an expanded image which is obtained by developing the projected image into two-dimensional image, is determined based on shape information and a characteristic point. The projected image of the three-dimensional object in the moving picture is transformed into the expanded image in accordance with the correlation expression. A retouching operation such as an editorial work is then effected on the expanded image. The worked expanded image is transformed back to the original projected image based on the above-mentioned correlation expression, whereby a projected image of a three-dimensional object carrying the result of the work is obtained. It is therefore possible to easily effect a three-dimensional retouching such as an editorial work on a moving picture which is presented by two-dimensional images.

Although the invention has been described through its specific forms, it is to be understood that the described embodiments are only illustrative and various other changes and modifications may be imparted thereto without departing from the spirit and scope of the present invention which is limited solely by the appended claims.

What is claimed is:

1. An image processing apparatus for processing a two-dimensional moving picture, comprising:
    operating means operable to enable designation of shape information concerning the shape of a surface that forms part of a three-dimensional object displayed in the moving picture and designation of a characteristic point which is located on said moving picture;
    computing means for determining, based on the shape information and the characteristic point, a correlation equation expressing the correlation between a projected image which is obtained by projecting said surface constituting part of the three-dimensional object and an expanded image which is obtained by developing said surface into two-dimensional plane;
    first transforming means for transforming, based on said correlation equation, the three-dimensional projected image of said surface in said moving picture into the two-dimensional expanded image;
    storing means for storing said expanded image;
    retouching means for effecting retouching on said expanded image stored in said storing means; and
    second transforming means for transforming, based on said correlation equation, the two-dimensional retouched expanded image to a three-dimensional retouched projected image in said moving picture.

2. An image processing apparatus according to claim 1, wherein said computing means determines a function $M\psi$ as said correlation equation, where $\psi$ represents a function for copying said expanded image onto said surface constituting part of the three-dimensional object on a three-dimensional space and M represents a function for projecting said three-dimensional object onto said screen to form said projected image.

3. An image processing apparatus according to claim 1, further comprising:
    securing means for securing an overall expanded image storage area capable of storing an expanded image which is obtained by developing the entire part of said surface constituting said three-dimensional object;
    rendering means for rendering in said overall expanded image storage area; and
    cut-out means for cutting out at least a region of said overall expanded image storage area and outputting the resultant cut-out region;
    wherein said retouching means effects the retouching on said expanded image stored in said storage means, based on the content of said cut-out region.

4. An image processing apparatus according to claim 3, further comprising:
    positional correlation computing means for computing the positional correlation between a first expanded image which is the image of the surface constituting part of the three-dimensional object displayed on a first frame that constitutes the moving picture image and a second expanded image which is the image of the surface constituting part of the three-dimensional object displayed on a second frame that constitutes the moving picture image;
    wherein said cut-out means, after cutting out of said cut-out region to be used for the retouching of said first expanded image, cuts out a cut-out region which is to be used in the retouching of said second expanded image, based on said positional correlation between said first and second expanded images.

5. An image processing method for processing a two-dimensional moving picture, comprising the steps of:
    preparing operating means operable to enable designation of shape information concerning the shape of a surface that forms part of a three-dimensional object displayed in the moving picture and designation of a characteristic point which is located on said moving picture;
    computing, in response to the designation of the shape information and the characteristic point by said operating means, a correlation equation expressing the correlation between a projected image which is obtained by projecting said surface constituting part of the three-dimensional object and an expanded image which is obtained by developing said surface into two-dimensional plane, based on the shape information and the characteristic point;
    executing first transformation for transforming, based on said correlation equation, the three-dimensional projected image of said surface in said moving picture into the two-dimensional expanded image;

storing said expanded image;

retouching said expanded image stored in the storing step; and executing a second transformation for transforming, based on said correlation equation, the retouched two-dimensional expanded image to a three-dimensional retouched projected image in said moving picture.

6. An image processing method according to claim 5, wherein the computing step determines a function $M\psi$ as said correlation equation, where $\psi$ represents a function for copying said expanded image onto said surface constituting part of the three-dimensional object on a three-dimensional space and M represents a function for projecting said three-dimensional object onto said screen to form said projected image.

7. An image processing method according to claim 5, further comprising the steps of:

securing an overall expanded image storage area capable of storing an expanded image which is obtained by developing the entire part of said surface constituting said three-dimensional object;

rendering in said overall expanded image storage area; and cutting out at least a region of said overall expanded image storage area and outputting the resultant cut-out region;

wherein the retouching step effects the retouching on said expanded image stored in the storing step, based on the content of said cut-out region.

8. An image processing method according to claim 7, further comprising:

computing the positional correlation between a first expanded image which is the image of the surface constituting part of the three-dimensional object displayed on a first frame that constitutes the moving picture image and a second expanded image which is the image of the surface constituting part of the three-dimensional object displayed on a second frame that constitutes the moving picture image;

wherein the cutting-out step cuts out, after cutting out of said cut-out region to be used for the retouching of said first expanded image, a cut-out region which is to be used in the retouching of said second expanded image, based on said positional correlation between said first and second expanded images.

9. A computer readable for enabling a computer to execute a computer program for conducting image processing on a two-dimensional moving picture, said program comprising the steps of:

computing, in response to designation of shape information concerning the shape of a surface that forms part of a three-dimensional object displayed in the moving picture and designation of a characteristic point which is located on said moving picture, the designation being performed through operation of operating means that enables designation of the shape information and the characteristic point, a correlation equation expressing the correlation between a projected image which is obtained by projecting said surface constituting part of the three-dimensional object and an expanded image which is obtained by developing said surface into two-dimensional plane, based on the shape information and the characteristic point;

executing first transformation for transforming, based on said correlation equation, the three-dimensional projected image of said surface in said moving picture into the two-dimensional expanded image;

storing said expanded image;

retouching said expanded image stored in the storing step; and executing a second transformation for transforming, based on said correlation equation, the retouched two-dimensional expanded image to a three-dimensional retouched projected image in said moving picture.

10. A computer readable according to claim 9, wherein the computing step determines a function $M\psi$ as said correlation equation, where $\psi$ represents a function for copying said expanded image onto said surface constituting part of the three-dimensional object on a three-dimensional space and M represents a function for projecting said three-dimensional object onto said screen to form said projected image.

11. A computer readable according to claim 9, wherein said program further comprises the steps of:

securing an overall expanded image storage area capable of storing an expanded image which is obtained by developing the entire part of said surface constituting said three-dimensional object;

rendering in said overall expanded image storage area; and cutting out at least a region of said overall expanded image storage area and outputting the resultant cut-out region;

wherein the retouching step effects the retouching on said expanded image stored in the storing step, based on the content of said cut-out region.

12. A computer readable according to claim 11, wherein said program further comprises:

computing the positional correlation between a first expanded image which is the image of the surface constituting part of the three-dimensional object displayed on a first frame that constitutes the moving picture image and a second expanded image which is the image of the surface constituting part of the three-dimensional object displayed on a second frame that constitutes the moving picture image;

wherein the cutting-out step cuts out, after cutting out of said cut-out region to be used for the retouching of said first expanded image, a cut-out region which is to be used in the retouching of said second expanded image, based on said positional correlation between said first and second expanded images.

* * * * *